(12) United States Patent
Liu et al.

(10) Patent No.: US 12,413,699 B2
(45) Date of Patent: Sep. 9, 2025

(54) NEAR-EYE DISPLAY MODULE, I-TYPE COMPOSITE DISPLAY MODULE, II-TYPE COMPOSITE DISPLAY MODULE, AND III-TYPE COMPOSITE DISPLAY MODULE BASED ON PIXEL-BLOCK-APERTURE STRUCTURES

(71) Applicant: SUN YAT-SEN UNIVERSITY, Guangdong (CN)

(72) Inventors: Lilin Liu, Guangdong (CN); Dongdong Teng, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 624 days.

(21) Appl. No.: 17/832,717

(22) Filed: Jun. 6, 2022

(65) Prior Publication Data
US 2022/0311993 A1    Sep. 29, 2022

Related U.S. Application Data

(63) Continuation of application No. PCT/CN2019/126813, filed on Dec. 20, 2019.

(30) Foreign Application Priority Data

Dec. 6, 2019    (CN) .......................... 201911243039.5

(51) Int. Cl.
*G02B 30/52*   (2020.01)
*H04N 13/339*  (2018.01)
(Continued)

(52) U.S. Cl.
CPC .......... *H04N 13/344* (2018.05); *G02B 30/52* (2020.01); *H04N 13/339* (2018.05); *H04N 13/363* (2018.05); *H04N 13/398* (2018.05)

(58) Field of Classification Search
CPC .. H04N 13/344; H04N 13/339; H04N 13/363; H04N 13/398; G02B 30/52
See application file for complete search history.

(56) References Cited

U.S. PATENT DOCUMENTS

| 2019/0204600 A1 | 7/2019 | Ha et al. |
| 2022/0174263 A1 | 6/2022 | Teng et al. |
| 2024/0272431 A1* | 8/2024 | Futterer .............. G02B 6/0016 |

FOREIGN PATENT DOCUMENTS

| CN | 103376551 | 10/2013 |
| CN | 104104934 | 10/2014 |
| (Continued) |

OTHER PUBLICATIONS

CN 205450447 U machine translation (Year: 2016).*
(Continued)

*Primary Examiner* — James A Dudek
(74) *Attorney, Agent, or Firm* — JCIPRNET

(57) ABSTRACT

The invention discloses a near-eye display module based on pixel-block-aperture structures, which includes more than one pixel-block-aperture structures. The divergence angle and propagation direction of the light beam from a pixel is specially modulated, and the light beams from pixels of adjacent pixel-block-aperture structures are endowed with different orthogonal characteristics, to guarantee the light beam from a pixel transmitting to the viewer's pupil only through corresponding aperture(s) for Maxwellian View or one-pupil-multi-view display. The arrangement of multiple pixel-block-aperture structures makes a large field of view (FOV) realizable, and the orthogonal-characteristics design can suppress the crosstalk between adjacent pixel-block-aperture structures effectively.

34 Claims, 40 Drawing Sheets

(51) Int. Cl.
*H04N 13/344* (2018.01)
*H04N 13/363* (2018.01)
*H04N 13/398* (2018.01)

(56) References Cited

FOREIGN PATENT DOCUMENTS

| CN | 205450447 | 8/2016 |
| CN | 106873170 | 6/2017 |
| CN | 207318860 | 5/2018 |
| KR | 20190010095 | 1/2019 |
| WO | 2017186020 | 11/2017 |

OTHER PUBLICATIONS

"International Search Report (Form PCT/ISA/210) of PCT/CN2019/126813", mailed on Sep. 2, 2020, with English translation thereof, pp. 1-4.

* cited by examiner

NEAR-EYE DISPLAY MODULE, I-TYPE COMPOSITE DISPLAY MODULE, II-TYPE COMPOSITE DISPLAY MODULE, AND III-TYPE COMPOSITE DISPLAY MODULE BASED ON PIXEL-BLOCK-APERTURE STRUCTURES

CROSS-REFERENCE TO RELATED APPLICATION

This application is a continuation of international application of PCT application serial no. PCT/CN2019/126813, filed on Dec. 20, 2019, which claims the priority benefit of China application no. 201911243039.5 filed on Dec. 6, 2019. The entirety of each of the above-mentioned patent applications is hereby incorporated by reference herein and made a part of this specification.

TECHNICAL FIELD

The invention relates to the technical field of three-dimensional display, and more particularly, to a near-eye display module based on pixel-block-aperture structures.

BACKGROUND

As a potential next-generation mobile terminal platform, the three-dimensional display system including VR/AR is a hot spot in the display field at present, and has extremely broad application prospects. However, most of existing three-dimensional displays are based on the conventional stereoscopic technology. Employing two eyepieces for two eyes of a viewer, two different perspective views are projected to two pupils of the viewer, respectively. Then through the intersection of two eyes' visual directions, 3D depth is perceived by the viewer's brain. During this process, an eye's focus should keep being fixed at the pixels or their images for clear perspective views, which results in the inconsistency between the focusing distance and the converging distance, often called as Vergence-Accommodation Conflict (VAC conflict) problem. The VAC conflict induces visual discomforts to the viewer, especially in the case of near-eye displays. It is the bottleneck problem that hinders the popularization and application of 3D display.

Researchers are working hard to settle the VAC problem along multiple technical approaches. Maxwellian view (US2019/0204600, AUGMENTED REALITY OPTICS SYSTEM WITH PINPOINT MIRROR) and one-pupil-multi-view (PCTCN2017080874, THREE-DIMENSIONAL DISPLAY SYSTEM BASED ON DIVISION MULTIPLEXING OF VIEWER'S ENTRANCE-PUPIL AND DISPLAY METHOD) are two of them capable of being applied to near-eye display. The former takes an aperture smaller than the viewer's pupil as a window for each eye, confining the light intensity gradient of the perceived light beams by the small size of the aperture. Thus focusing of the eye gets free from the pixels or their images, and the intercoupling between binocular convergence and monocular accommodation drags the eye's focus to the converging depth, resulting in VAC-free display. However, small aperture induces a small field of view (FOV) when only one aperture is employed. For a larger FOV, multiple apertures are often employed, with different apertures corresponding to different display zones of the display screen, respectively. However, in this case, light from a display zone often reaches to the pupil through non-corresponding apertures as crosstalk noise. The later, one-pupil-multi-view display, projects two or more perspective views with different viewpoints to a pupil of the viewer. For a displayed point, two or more passing-through light beams from the perceived perspective views superimpose into a spatial light spot. When the superimposed light spots are more attractive to the viewer's focusing than the pixels or theirs images, the viewer's eye will be dragged to focus at the displayed superimposed light spots naturally. Thus, for a displayed point, two or more passing-through light beams should be perceived by an eye through different segments of its pupil. That is to say, a light beam from a displayed point covers an area smaller than the pupil's size at least along one direction. When this kind of small footprint of a light beam on the pupil gets implemented by physical aperture near to the eye, a problem of small FOV gets confronted by the display too. As described in PCT/CN2017/080874, the introduction of multiple apertures of timing characteristics can enlarge the FOV. But the degree of timing multiplexing is severely limited by the frame rate of the on-shelf display devices, which is not enough for a large enough FOV.

SUMMARY

The present invention is designed for a near-eye display module based on pixel-block-aperture structures, which is simply called as display module. Two such display modules can function as two eyepieces for two eyes of a viewer, to build a head-mounted VR or AR system. In the proposed display module, multiple pixel-block-aperture structures are aligned for a large FOV, different orthogonal characteristics are endowed to adjacent pixel-block-aperture structures for crosstalk suppression. Then following the display technology route of Maxwell view or one-pupil-multi-view, a VAC-free display with large FOV can get implemented.

The invention provides a near-eye display module based on pixel-block-aperture structures, comprising:

M pixel-block-aperture structures, each of which being constructed by mutually corresponded a pixel block, an aperture, a modulation component, an orthogonality generating component and an orthogonality detecting component, wherein a positive integer M≥2;

wherein, a pixel block is composed of pixels for optical information loading, and a pixel array is composed of the pixels of all pixel blocks of the M pixel-block-aperture structures; an aperture array is composed of all apertures of M pixel-block-aperture structures on an aperture surface; a modulation component is composed of modulation elements, which correspond to pixels of a corresponding pixel block in a one-to-one manner, to guide the light beam from a pixel to a corresponding aperture with a confined diverging angle; an orthogonality detecting component is attached to a corresponding aperture, for only allowing light of corresponding orthogonal characteristic passable, but blocking light of other non-corresponding orthogonal characteristic; the orthogonality generating component of each block-aperture structures is attached to a corresponding pixel block, endowing pass-through light with orthogonal characteristic same to that of a corresponding orthogonality detecting component;

a control device, which loads optical information onto a pixel at a time-point, with the optical information being the projecting information of a 3D scene to be displayed at the time-point along a line connecting the pixel and its corresponding aperture;

said near-eye display module based on pixel-block-aperture structures is configured that the N orthogonality detecting components of adjacent N pixel-block-aperture structures are with N kinds of orthogonal characteristics respectively, with the apertures attached by orthogonality generating components of a same orthogonal characteristic taken as apertures of a same kind, wherein an integer M≥N≥2, and the light beam from a pixel is modulated by a corresponding modulation element, to guarantee its light distribution covers the corresponding aperture, but misses the non-corresponding apertures of the same kind.

Further, the near-eye display module further comprises a projection device, which projects an enlarged virtual image of the pixel array to a projection surface, with the virtual image called as a pixel-array image;

wherein, optical information loaded onto a pixel at a time-point is the projecting information of a 3D scene to be displayed at the time-point along a line connecting the virtual image of the pixel and its corresponding aperture, with the virtual image of a pixel called as a pixel image, and light beam from a pixel can be equivalently seen as being from its virtual image on the projection surface;

Further, the pixel-block-aperture structure further comprises a baffle, which blocks the light in the non-aperture zone.

Further, the near-eye display module further comprises a relay device for guiding light from the pixel array to a corresponding pupil of a viewer;

wherein, the modulation element makes light from a corresponding pixel miss non-corresponding apertures of the same kind.

Further, a pixel-block-aperture structure further comprises a light splitting device, which is attached to the corresponding pixel block and guides light from G groups of pixels of the pixel block to G zones, respectively, wherein G≥2, and, G apertures covered by a corresponding orthogonality detecting component are placed in the G zones, respectively, with a pixel taking the aperture to which the light from the pixel is guided as the corresponding aperture, and the other (G−1) apertures as the non-corresponding apertures of a same kind.

Further, a size of the aperture is smaller than that of a viewer's pupil.

Further, a viewer's pupil perceives light beams through at least 2M apertures, and a size of the aperture is smaller than that of a viewer's pupil along their arrangement direction.

Further, light beam from a pixel missing a non-corresponding aperture refers to that the transmission light intensity of the light beam through the non-corresponding aperture is less than 10% of that through the corresponding aperture.

Further, an aperture can be transmission-type or reflection-type.

Further, the aperture has a phase modulation function for projecting an image of the corresponding pixel block which is named as an equivalent pixel block, and coverage angles of all the equivalent pixel blocks with respect to a point around the sub-apertures splice together seamlessly.

Further, all equivalent pixel blocks are divided into two or more groups, and for each group of equivalent pixel blocks, the coverage angles of the group of equivalent pixel blocks with respect to a point around the sub-apertures splice together seamlessly.

Further, the orthogonal characteristics are two linear polarizations with mutually perpendicular polarization directions, or two circular polarizations of left circular polarization and right left circular polarization, or timing characteristics being activated at different time-points, or combination of linear polarizations and timing characteristics, or combination of circular polarizations and timing characteristics;

wherein, timing characteristics get implemented by a light-valve array, whose light valves are attached to the apertures in a one-to-one manner, for activating the aperture by turning on a corresponding light valve, and the function of an orthogonality generating device gets implemented by the control device, activating corresponding pixels by loading corresponding optical information when the aperture gets turned on.

Further, the projection device is an optical device with adjustable focal length;

wherein, the projection device is driven by the control device to generate multiple projection surfaces to different depths sequentially, with a pixel getting refreshed by projection optical information of the 3D scene to be displayed along the line connecting its virtual image and corresponding aperture synchronously;

or, the convergence depth of the viewer is real-time tracked by an external auxiliary device, and the projection device projects a projection surface to the convergence depth driven under the control device synchronously, with a pixel getting refreshed by projection optical information of the 3D scene to be displayed along the line connecting its virtual image and corresponding aperture.

Further, the projection device is a liquid crystal lens with adjustable focal length, or an assembly of multiple liquid crystal sheets;

wherein, the assembly produces different focal lengths by activating different liquid crystal sheets or different combinations of the liquid crystal sheets.

Further, the relay device is a light-deflection device, to deflect the propagation direction of incident light beams.

Further, the relay device is a beam-path-folding structure for a thin structure.

Further, the relay device is an optical wave-guide device.

Further, the near-eye display module further comprises a compensation device inserted between the relay device and the external environment, for neutralizing the impact of the relay device on the light from the external environment.

Further, each aperture is replaced by J sub-apertures respectively, wherein an integer J≥2;

said near-eye display module based on the pixel-block-aperture structures is configured that, at one time-point of J time-points in a time-period δt, only one sub-aperture corresponding to each replaced aperture is turned on, with a pixel taking the turned-on sub-aperture of its replaced corresponding aperture as the corresponding sub-aperture at the time-point, and at J time-points in a time-period, J sub-apertures of a replaced aperture are turned on sequentially;

wherein, at each time-point, a corresponding pixel gets refreshed by the projection information of the 3D scene to be displayed along the line connecting the virtual image of the pixel and its corresponding sub-aperture.

Further, a size of the sub-aperture is smaller than that of the viewer's pupil.

Further, a viewer's pupil perceives light beams through at least 2M sub-apertures, and a size of the sub-aperture is smaller than a diameter of the viewer's pupil along their arrangement direction.

Further, wherein the sub-aperture has phase modulation function for projecting a virtual image of the corresponding pixel block, wherein the virtual image of the corresponding pixel block is named as equivalent pixel block, and at a time-point the coverage angles of equivalent pixel blocks with respect to a point around the sub-apertures splice together seamlessly.

Further, each sub-aperture of each pixel-block-aperture structure has phase modulation function to image corresponding pixel block to different depth positions.

The present application also provides another solution as below.

An I-type composite display module based on pixel-block-aperture structures, comprising K near-eye display modules based on the pixel-block-aperture structures as mentioned above, with the K pixel-array images overlapped into a projection area on the projection surface, wherein an integer K≥2;

wherein, K near-eye display modules based on pixel-block-aperture structures function as K element modules.

Further, a size of the aperture is smaller than that of the viewer's pupil.

Further, a viewer's pupil perceives light beams through at least 2M apertures, and a size of the aperture is smaller than the diameter of the viewer's pupil along the arrangement direction of the apertures.

Further, each aperture is replaced by J sub-apertures respectively, wherein an integer J≥2;
said I-type composite display module based on pixel-block-aperture structures is configured that, at one time-point of J time-points in a time-period δt, only one sub-aperture corresponding to each replaced aperture is turned on, with a pixel taking the turned-on sub-aperture of its replaced corresponding aperture as the corresponding sub-aperture at the time-point, and at J time-points of a time-period, J sub-apertures of a replaced aperture are turned on sequentially;
wherein, at each time-point, a corresponding pixel gets refreshed by the projection information of the 3D scene to be displayed along the line connecting the virtual image of the pixel and the corresponding sub-aperture.

Further, each sub-aperture of each pixel-block-aperture structure has a phase modulation function for imaging a corresponding pixel block to a corresponding depth position.

The present application also provides another solution as below.

An II-type composite display module based on pixel-block-aperture structures, comprising K near-eye display modules based on the pixel-block-aperture structures as mentioned above, with the K pixel-array images splicing together, wherein an integer K≥2;

wherein, K near-eye display modules based on the pixel-block-aperture structures function as K element modules.

Further, an aperture is replaced by J sub-apertures, wherein an integer J≥2;
said II-type composite display module based on the pixel-block-aperture structures is configured that, at one time-point of J time-points in a time-period δt, only one sub-aperture corresponding to each replaced aperture is turned on, with the pixel taking the turned-on sub-aperture of the replaced corresponding aperture as corresponding sub-aperture at the time-point, and at J time-points in a time-period, J sub-aperture of a replaced aperture are turned on sequentially;

wherein, at each time-point, a corresponding pixel gets refreshed by the projection information of the 3D scene to be displayed along the line connecting the virtual image of the pixel and the corresponding sub-aperture.

The present application also provides another solution as below.

An III-type composite display module based on pixel-block-aperture structures, which comprises K near-eye display modules based on the pixel-block-aperture structures as mentioned above, with the K pixel-array images positioning at different depths, respectively, where in an integer K≥2;

wherein, K near-eye display modules based on the pixel-block-aperture structures function as K element modules.

Further, an aperture is replaced by J sub-apertures, wherein an integer J≥2;
said III-type composite display module based on pixel-block-aperture structures is configured that, at one time-point of J time-points in a time-period δt, only one sub-aperture of each replaced aperture is turned on, with a pixel taking the turned-on sub-aperture of its replaced corresponding aperture as the corresponding sub-aperture at the time-point, and at J time-points of a time-period, J sub-apertures of a replaced aperture are turned on sequentially;
wherein, at each time-point, a corresponding pixel gets refreshed by the projection information of the 3D scene to be displayed along the line connecting the virtual image of the pixel and the corresponding sub-aperture.

Further, an aperture is replaced by a backlight structure correspondingly;
wherein, a backlight structure projects light of orthogonal characteristic which can be modulated by the corresponding pixel block, but be blocked by the pixel blocks of orthogonal characteristics different to that of the corresponding pixel block,
and on a plane near the pupil, the light from a backlight structure covers a region same to the region covered by the light from the corresponding pixel block through the replaced aperture.

Further, a sub-aperture is replaced by a backlight structure correspondingly;
wherein, a backlight structure projects light of orthogonal characteristic which can be modulated by the corresponding pixel block, but be blocked by the pixel blocks of orthogonal characteristics different to that of the corresponding pixel block,
and on a plane near the pupil, the light from a backlight structure covers a region same to the region covered by the light from the corresponding pixel block through the replaced sub-aperture.

Compared with existing near-eye 3D display, the merits of the present invention are listed as follow.

This invention designs pixel-block-aperture structures, which project light beams to the viewer's eye only through corresponding small size apertures. Multiple such pixel-block-aperture structures constitute a display module for Maxwellian view display or one-pupil-multi-view display, which is free from VAC-conflict. In the proposed display module, multiple pixel-block-aperture structures are aligned for a large FOV, different orthogonal characteristics are endowed to adjacent pixel-block-aperture structures for crosstalk suppression.

BRIEF DESCRIPTION OF DRAWINGS

FIG. 20 shows a beam-path-folding structure allowing light from external ambient passing through.

DETAILED DESCRIPTION

Figure 1:
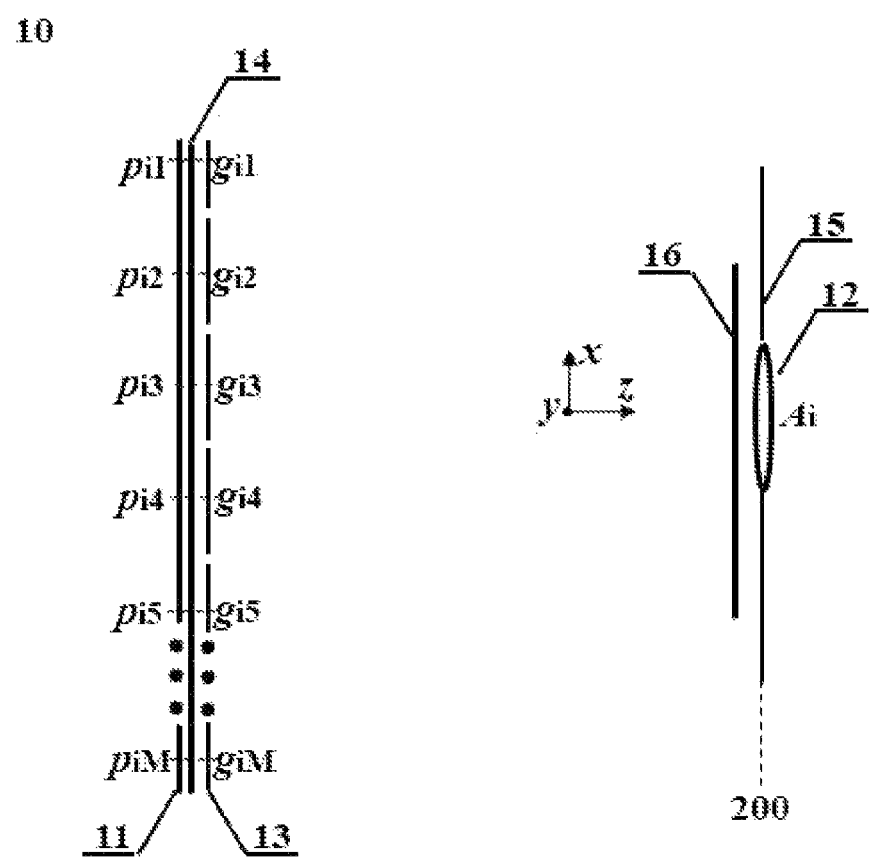
FIG. 1 shows an optical structure of a pixel-block-aperture structure with transmission-type apertures.

The drawings are only for illustrative purposes, and should not be construed as limitations on the present application. In order to better illustrate this embodiment, some components of the drawings may be omitted, enlarged or reduced, and do not represent the size of the actual product. As far as people are concerned, it is understandable that some well-known structures, repetitive structures in the drawings and related descriptions may be omitted. The invention designs a kind of pixel-block-aperture structures with characteristics that light beams from a pixel block are designed to only transmit through corresponding aperture(s) of small size. Multiple such pixel-block-aperture structures constitute a near-eye display module for FOV-enlarged Maxwellian view or one-pupil-multi-view display, with adjacent pixel-block-aperture structures being endowed with different orthogonal characteristics for effective crosstalk suppression. Such near-eye display module based on pixel-block-aperture structures is abbreviated as a display module in the present application. Two display modules work as two eye-pieces of 3D display systems such as head-mounted VR/AR. The technical solution of the present invention will be further described below with reference to the accompanying drawings and embodiments.

Embodiment 1

The optical structure of a pixel-block-aperture structure 10 is shown in FIG. 1, which includes a pixel block 11, an aperture 12, a modulation component 13, an orthogonality generating component 14, an orthogonality detecting component 16, and a baffle 15. Different components of a same pixel-block-aperture structure 10 correspond to each other. The pixel block 11 is composed of pixels, such as pixels $p_{i1}$, $P_{i2}$, $p_{i3}$, $p_{i4}$, $p_{i5}$, ... in FIG. 1. Each pixel gets refreshed with optical information by a control device 40. The aperture 12 allows incident light to pass through under the turned-on state. The orthogonality detecting component 16 is attached to the corresponding aperture 12, to allow only light with corresponding orthogonal characteristic passing through, but block light with anyone of other N−1 orthogonal characteristics. In the present application, taking the function of the orthogonality detecting component 16 into consideration, it is equivalently described that an aperture only permits light of corresponding characteristic passing through. Here, an integer N≥2. For example, linear polarizations with mutually perpendicular polarization directions can be taken as N=2 orthogonal characteristics, circular polarizations of left circular polarization and right circular polarization can be taken as N=2 orthogonal characteristics, sequential activating of N≥2 apertures at N≥2 time-points can be taken as N≥2 orthogonal characteristics. The orthogonality generating component 14 is attached to the corresponding pixel block 11, to make its pixels project light of orthogonal characteristic capable passing through the corresponding aperture 12. The baffle 15 is placed on the aperture surface 200 containing the aperture 12 for blocking light in the non-aperture area. A modulation component 13 consists of modulation elements. These modulation elements correspond to pixels of the corresponding pixel block 11 in a one-to-one manner, to guide the light beam from a pixel to a corresponding aperture 12 with a confined diverging angle and along a specific direction. As shown in FIG. 1, the modulation elements $g_{i1}$, $g_{i2}$, $g_{i3}$, $g_{i4}$, $g_{i5}$, . . . correspond to the pixels $p_{i1}$, $p_{i2}$, $p_{i3}$, $p_{i4}$, $p_{i5}$, . . . , respectively. A modulation element modulates the diverging angle and propagation direction of the light beam from a corresponding pixel. Optimally, an aperture 12 is placed parallel to the corresponding pixel block 11. In FIG. 1, the aperture 12 being parallel to the x-y plane should be drawn as a line. For denoting its shape more directly, the aperture 12 is drawn as an ellipse in FIG. 1.

Figure 2:
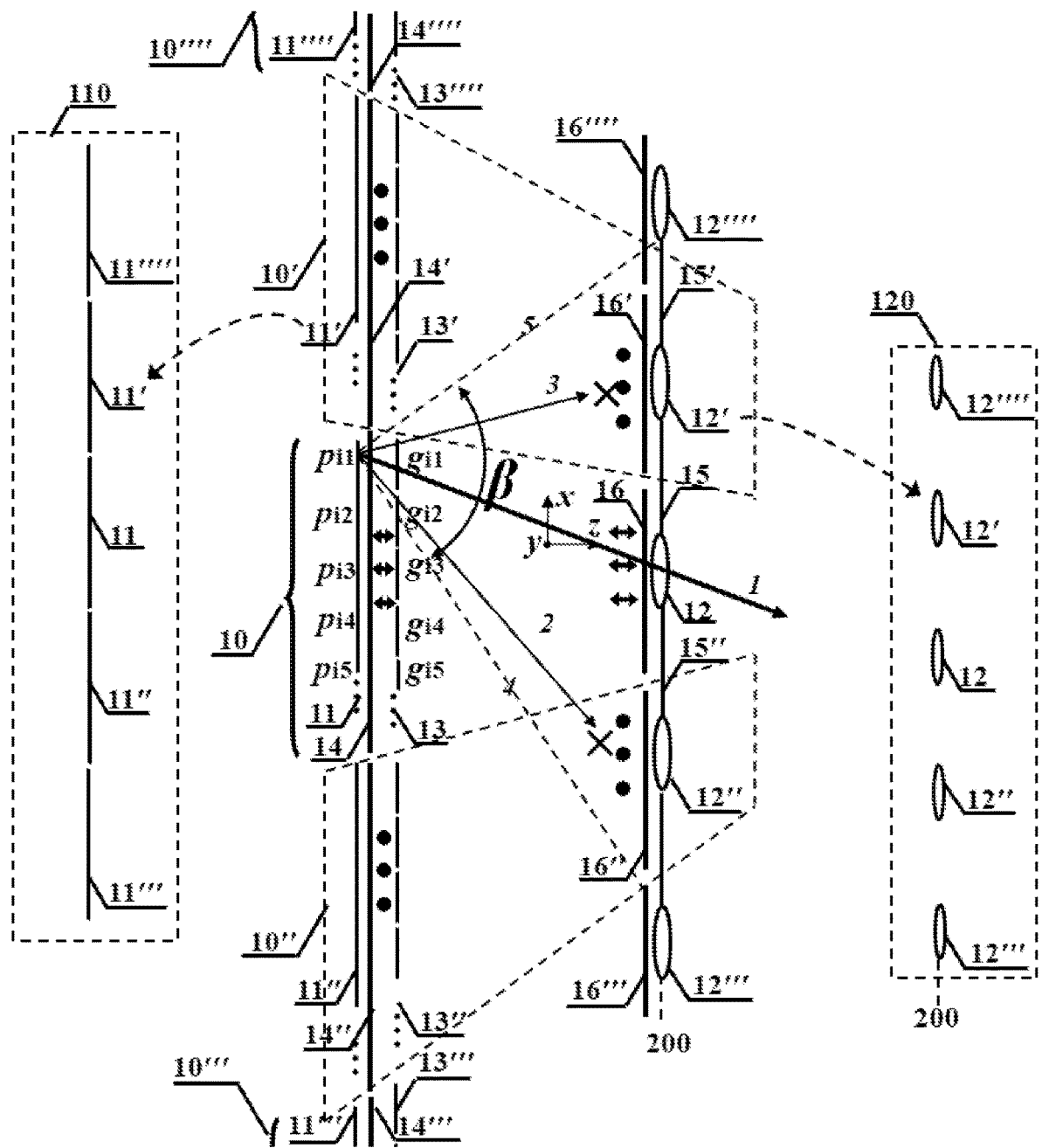
FIG. 2 shows the schematic diagram of a display module in which a pixel block projects light only through the corresponding aperture.

M pixel-block-aperture structures are aligned side by side in FIG. 2, here M=5 is taken as an example. The complete structures of three pixel-block-aperture structures 10, 10', 10" are shown in the FIG. 2. For clarity, the other two pixel-block-aperture structures 10''', 10'''' are only partially drawn. Their apertures 12, 12', 12", 12''', 12'''' constitute an aperture array 120 at the aperture surface 200, and the corresponding pixel blocks 11, 11', 11", 11''', 11'''' constitute a pixel array 110. Among all the M=5 pixel-block-aperture structures, the orthogonality detecting components of adjacent N pixel-block-aperture structures are designed with N different orthogonal characteristics, respectively, wherein the orthogonality detecting components of adjacent N pixel-block-aperture structures corresponding to the N different orthogonal characteristics in a one-to-one manner. An orthogonality detecting component only allows light of corresponding orthogonal characteristic passing through, but blocks light of anyone of other (N−1) orthogonal characteristics. FIG. 2 takes N=2 as example, concretely linear polarization along the horizontal x-direction and the linear polarization along the vertical y-direction, respectively. They are denoted as " ↔ " light and "•" light in the present application, respectively. In FIG. 2, the generating and detecting of the " ↔ " light and "•" light can get implemented by physical polarizers. Of course, the light emitted from each pixel can have the corresponding polarization state. Concretely, light from the pixel blocks 11' and 11" propagates forward as "•" light after passing through their orthogonality generating components 14' and 14" respectively, and their corresponding orthogonality detecting components 16' and 16" permit "•" light passing through, but block " ↔ " light. Light from the pixel blocks 11, 11''' and 11'''' propagates forward as " ↔ " light after passing through their orthogonality generating components 14, 14''' and 14'''' respectively, and their corresponding orthogonality detecting components 16, 16''' and 16'''' permit " ↔ " light passing through, but block "•" light. Thus, an aperture attached by corresponding orthogonality detecting component permits light from corresponding pixel block passing through, but blocks light from adjacent N−1=1 pixel block from both sides. More concretely, the light from pixels of pixel block 10, such as that from the pixel $p_{i1}$, can pass through the corresponding aperture 12 which is denoted as light beam 1 in FIG. 2. But the light from the pixel $p_{i1}$ is blocked by apertures 12' and 12", which is denoted as light beam 2 and light beam 3. Obviously, an aperture itself is transparent at the turned-on state. But taking the function of corresponding orthogonality detecting component into consideration, it is equivalently described that an aperture only permits light of corresponding characteristic passing through. Sentences such as "light of an orthogonal characteristic can pass through an aperture", "light of an orthogonal characteristic cannot pass through an aperture", "an aperture allows light of an orthogonal characteristic passing through", "an aperture does not allow light of an orthogonal characteristic passing through" are often used in the following segment of the present application.

Figure 3:
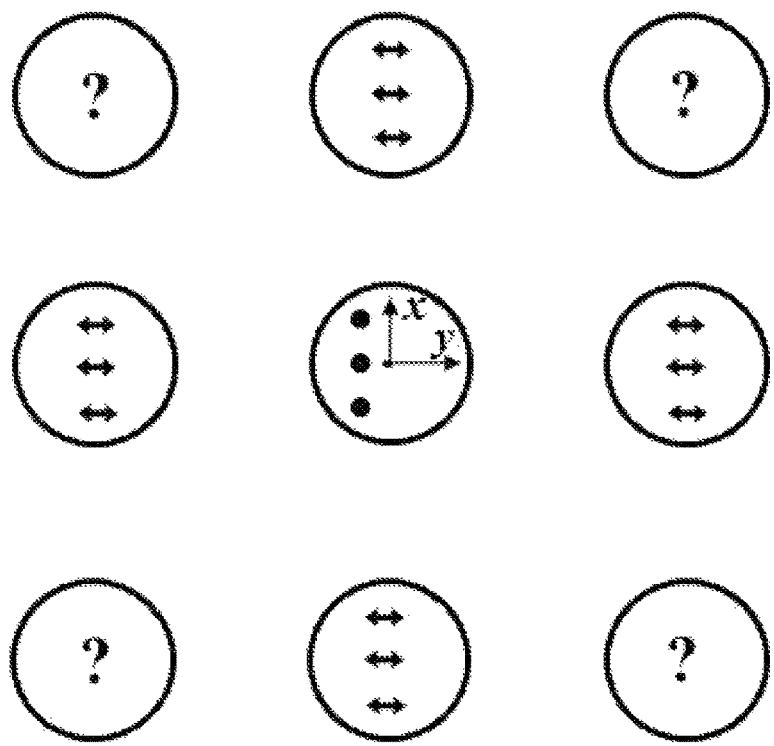
FIG. 3 shows the orthogonal characteristics designing of a two-dimensional arranged aperture array.
Figure 4:
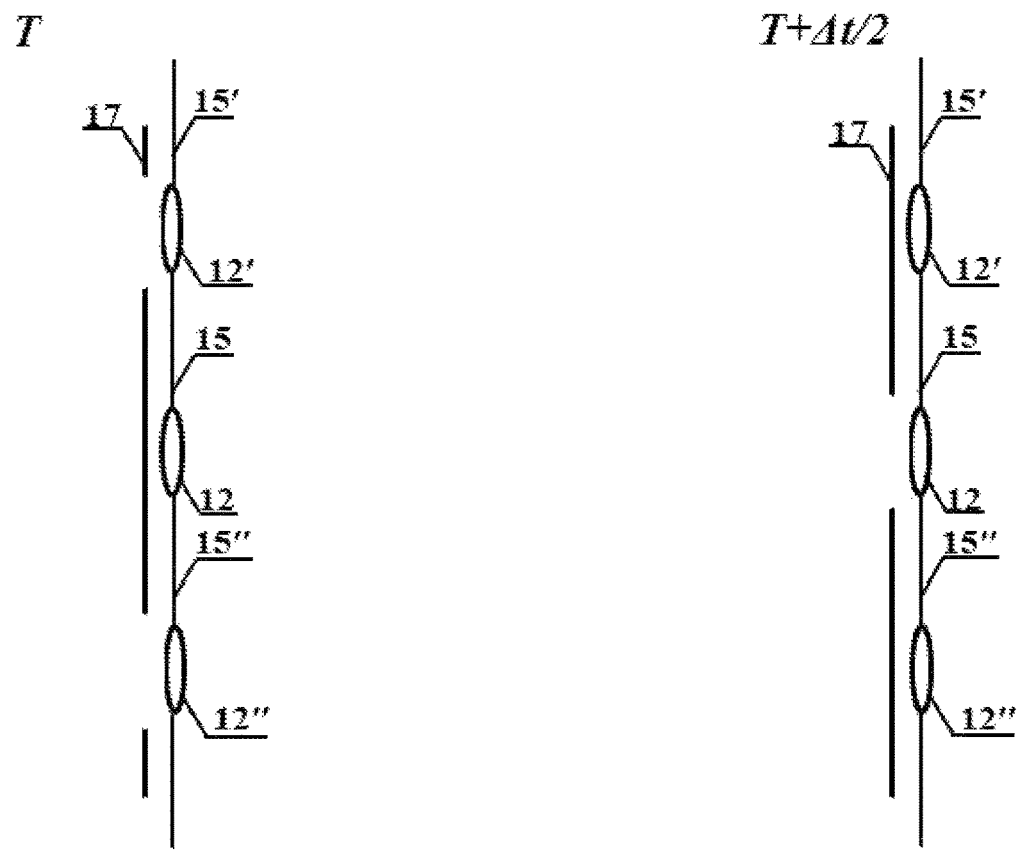
FIG. 4 shows apertures of timing characteristics.

In FIG. 2, M=5 pixel-block-aperture structures are arranged along one-dimensional x-direction. This arrangement can be extended to two-dimensional directions. However, the difference lies in that when pixel-block-aperture structures are arranged along two-dimensional directions, the number of apertures adjacent to an aperture changes from 2 (in the case of one-dimensional arrangement) to more, such as 8 apertures adjacent to the center aperture shown in FIG. 3. With only linear polarization along the horizontal x-direction and linear polarization along the vertical y-direction as the orthogonal characteristics, for an aperture, light from those pixel blocks adjacent to its corresponding pixel blocks cannot be designed to be all blocked by this aperture. Such as FIG. 3, when the apertures denoted by "?" correspond to orthogonal characteristic " ↔ " adjacent two apertures along x-direction or along the y-direction may allow light of a same orthogonal characteristic passing through. When the apertures marked by "?" correspond to orthogonal characteristic "•", adjacent two apertures along a diagonal direction may allow light of a same orthogonal characteristic passing through. Thus, only N=2 available orthogonal characteristics cannot guarantee the requirement that an aperture blocks light from pixel blocks whose corresponding apertures being adjacent to this aperture. To solve this problem, the apertures marked by "?" need to be endowed with a third orthogonal characteristic, such as a timing orthogonal characteristic. FIG. 4 is drawn for explaining the timing orthogonal characteristics. A light-valve array 17 is attached to the aperture array 120, with its light valves corresponding to the apertures in a one-to-one manner. A light valve functions as the orthogonality detecting component to the corresponding aperture. At time-point t, the light valves corresponding to the apertures 12' and 12" get turned on, with the light valve corresponding to the aperture 12 being turned off. At time-point $t+\Delta t/N=t+\Delta t/2$, the apertures 12' and 12" get turned off, while the aperture 12 is turned on. At time-point t, the pixel blocks 11' and 11" corresponding to the turned-on apertures 12' and 12" get refreshed by corresponding optical information, with the pixel blocks 11 corresponding to the turned-off aperture 12 inactivated. Then, at this time-point, light from the pixel blocks 11' and 11" cannot pass through the non-corresponding aperture 12, and no light from the inactivated pixel block 11 reaches to the non-corresponding apertures 12' and 12". Similarly, at the time-point $t+\Delta t/N=t+\Delta t/2$, light from the pixel blocks 11 cannot pass through the non-corresponding aperture 12' and 12", and no light from the inactivated pixel block 11' and 11" reaches to the aperture 12. Thus, N=2 timing characteristics get implemented. The turning-on and turning-off of a light valve keep a period of time, called a time frame. The orthogonality generating component corresponding to an orthogonality detecting component can be implemented by a light valve, or by activating or inactivating the corresponding pixel block.

The design of different orthogonal characteristics to adjacent N orthogonality detecting components can make an aperture blocking light from N−1 non-corresponding pixel blocks of N−1 adjacent pixel-block-aperture structures. However, when the number M of pixel-block-aperture structures is greater than the number N of adopted orthogonal characteristics, there exist apertures of a same orthogonal characteristic in the display module, which allow light from non-corresponding pixel block(s) passing through. As shown in FIG. 2, the apertures 12' and 12" both allow "•" light passing through, the apertures 12, 12''' and 12'''' all allow " ↔ " light passing through. The apertures, attached by corresponding orthogonality detecting components and permitting light of a same characteristic passing through, are taken as apertures of a same kind. In FIG. 2, the apertures 12' and 12" are of a same kind, the apertures 12, 12''', and 12'''' are of another same kind. When the divergence angle of a beam light from a pixel is large, it can reach to a non-corresponding aperture belong to a same kind and pass through it as noise. As shown in FIG. 2, the light from the pixel block 11 can pass through the apertures 12''' and 12'''' of the same kind with " ↔ " as the corresponding orthogonal characteristic. For the timing characteristic, the apertures turned-on at a same time-point are of a same kind. For example, the apertures 12' and 12" in FIG. 4 are of a same kind, and the aperture 12 is of another kind. If the orthogonal characteristics are hybrid, for example, the hybrid orthogonal characteristics of the linear polarizations and the timing characteristics, the apertures of the same linear polarization and the same timing characteristic are of a same kind. Concretely, two apertures being turned on at a same time-point are not of a same kind if they are with different linear polarizations. It is unnecessary to consider the crosstalk of light beams passing through non-corresponding aperture(s) of a same kind, when the crosstalk does not reach to the observing zone for the pupil 50. Actually, due to different orthogonal characteristics between adjacent apertures, there exists an observing zone free from this kind of noise. The noise discussed above can not reach to this zone. When this zone is not large enough for a comfortable viewing experience, a modulation component 13 can be introduced into a pixel-block-aperture structure 10 for suppressing the noise discussed above. The modulation component 13 is composed of modulation elements, which correspond to pixels of a corresponding pixel block 11 in a one-to-one manner. A modulation element modulates the diverging angle or/and propagation direction of the light beam from the corresponding pixel. As exampled by FIG. 2, after being modulated by the corresponding modulation element $g_{i1}$, the projected light beam from pixel $p_{i1}$ points to the corresponding aperture 12 along the line 1, with no light intensity covering non-corresponding apertures 12" and 12'''' of the same kind, which defines a maximum transmission angle with an included angle β between dotted lines 4 and 5. The dotted lines 4 and 5 are the lines connecting pixel $p_{i1}$ and nearer marginal points of non-corresponding apertures 12" and 12''' of the same kind. Optimally, the line 1 is consistent with the principal ray of the projected light beam. It is noteworthy that "with no light intensity covering non-corresponding apertures of the same kind" does not mean a light intensity of 0. For the light beam from a pixel, after being modulated by the corresponding modulation element, when the transmitted light intensity through a non-corresponding aperture of the same kind is less than 10% of that through the corresponding aperture, the crosstalk will not bring severe effect on the display quality, and we take it as "with no light intensity covering non-corresponding apertures of the same kind" in the present application. Under this condition, the actual maximum transmission angle of the light beam from pixel $p_{i1}$ is larger than β, as shown in FIG. 2. Micro-gratings, micro-lenses, micro-prisms, and micro-apertures, et al., all can be taken as the physical device of a modulation element. Generally speaking, a pixel is rather small, the corresponding modulation element is also small. So, here "micro-" does not refer to a specific scale, but an abstract pronoun used to name the physical device of a modulation element. Taking a micro-aperture as an example, the change of its position relative to the corresponding pixel along arrangement direction of the pixels will change the propagation direction of the light from this corresponding pixel when it passes through this micro-aperture. And, different sizes of this micro-aperture will result in different transmission angles. The modulated light beam from a pixel may point to the corresponding aperture along a non-principal ray. The modulation component 13 can make the light beams from corresponding pixel block 11 propagate forward only through corresponding aperture. If only the propagation direction, or only the transmission angle needs to be modulated for guiding light from a pixel only passing through corresponding aperture, of course it belongs to the protection scope of the present application. Furthermore, the modulation components are not necessary when a noise-free observing zone for the pupil, which is resulted from the design of orthogonal-characteristics, is large enough for the pupil. Furthermore, the modulation element also can be integrated into corresponding pixel.

The baffles can be placed around corresponding apertures, such as the baffles 15, 15' and 15" in FIG. 4, to block the light in the non-aperture area.

Thus, a significant characteristic of the said M pixel-block-aperture structures lies in that, light from the pixel block 11 of a pixel-block-aperture structure 10 can propagate forward through the corresponding aperture 12, but be blocked by or pass at low transmittance through apertures of other pixel-block-aperture structures. The low transmittance here means that, the light from a pixel is with an actual transmittance to the non-corresponding aperture of a same kind in other pixel-block-aperture structures, but this transmittance is less than 10% of that to the aperture corresponding to this pixel. Said low transmittance is expressed as being blocked by non-corresponding apertures of the same kind in the present application.

Figure 5:
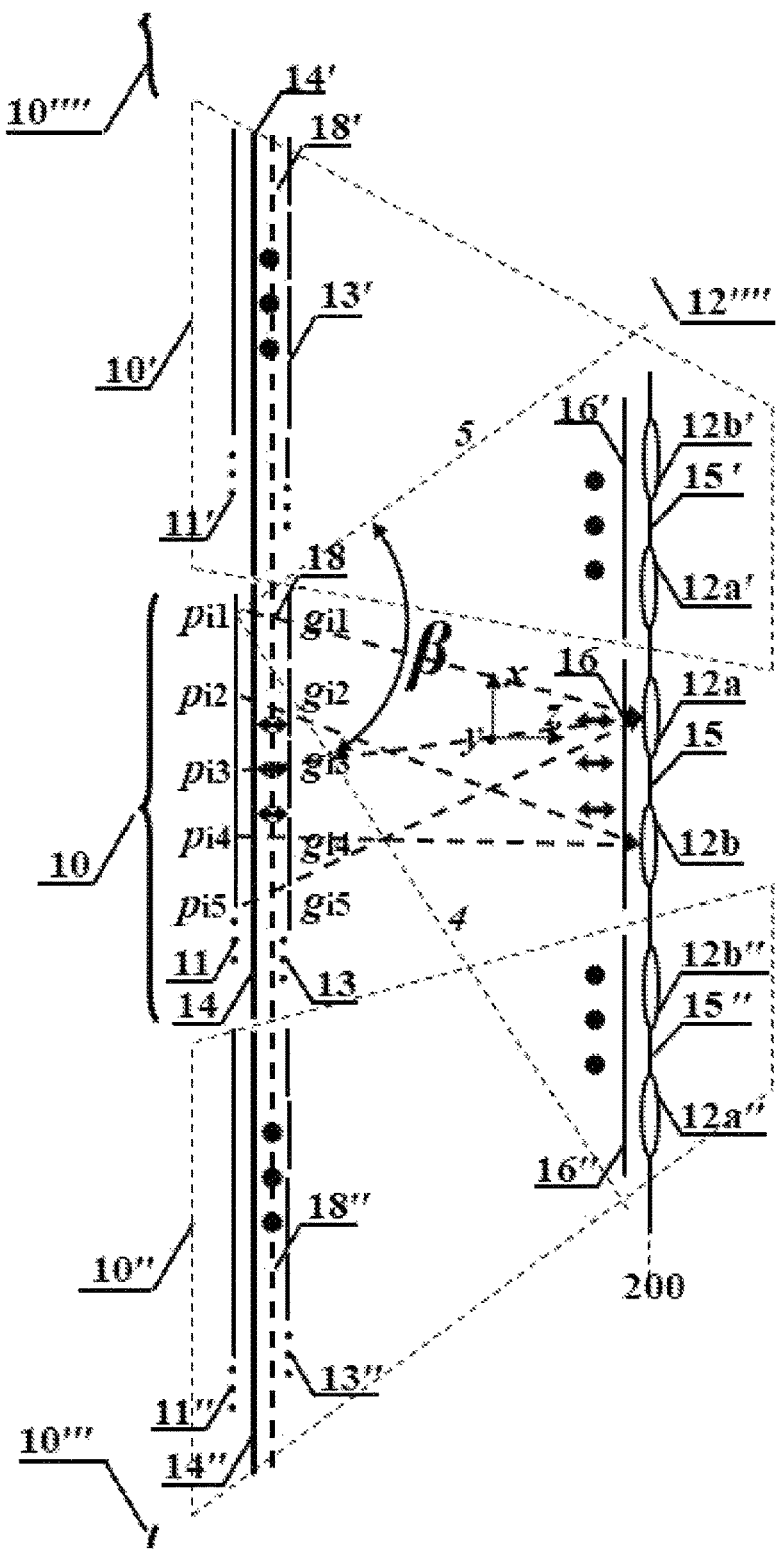
FIG. 5 shows an arrangement of pixel-block-aperture structures with light splitting devices.

A pixel-block-aperture structure can further include a light splitting device 18, As shown in FIG. 5, in a pixel-block-aperture structure 10, a light splitting device 18 consisting of grating periodic structures along one direction or two directions is attached to the pixel block 11. The light splitting device 18 guides light beams from G groups of pixels to G zones, respectively. One aperture is placed into each such zone. That is to say, a pixel-block-aperture structure 10 will be equipped with G apertures when a light splitting device 18 is introduced. Here, the integer G≥2. FIG. 5 takes a lenticular grating functioning as a light splitting device and G=2 as an example. Concretely, in the pixel-block-aperture structure 10, its light splitting device 18 guides the light beams from pixels $p_{i1}$, $p_{i3}$, $p_{i5}$, . . . to the zone containing an aperture 12a, guides light beams from pixels $p_{i2}$, $p_{i4}$, . . . to the zone containing an aperture 12b. The pixels $p_{i1}$, $p_{i3}$, $p_{i5}$, . . . corresponding to the aperture 12a constitute a pixel group, and the pixels $p_{i2}$, $p_{i4}$, . . . corresponding to the aperture 12b constitute another pixel group. The orthogonality detecting component 16 covers both apertures 12a and 12b. The apertures 12a and 12b are apertures of a same kind, and they are also the apertures corresponding to the pixel block 11. That is to say, the introduction of a light splitting device brings G corresponding apertures to a pixel block. But, there is one corresponding aperture for each pixel only, to which the light beam from this pixel is guided. The other (G−1) apertures of the pixel-block-aperture structure which includes this pixel, are also non-corresponding apertures of this pixel. The light splitting device 18 makes light from $p_{i1}$, $p_{i3}$, $p_{i5}$, . . . having no light intensity distribution around the non-corresponding aperture 12b, which belongs to the same kind as the corresponding aperture 12a. Similarly, the light splitting device 18 makes light from $p_{i2}$, $p_{i4}$, . . . having no light intensity distribution around the aperture 12a. The apertures 12a and 12b are placed adjacent to each other in FIG. 5. In fact, when a light splitting device 18 is employed, apertures of adjacent pixel-block-aperture structures can also be interlaced with each other. A light splitting device 18 can also be other optical element, such as a micro-structure array consisting of micro-structure elements. The micro-structure elements correspond to the pixel or sub-pixel of the pixel array 110 in a one-to-one manner, to guiding light beam from a pixel or sub-pixel to corresponding aperture.

In a pixel-block-aperture structure 10, the modulation component 13 and the orthogonality generating component 14 are both placed corresponding to the pixel block 11. Their spatial positions are interchangeable. The aperture 12 and the orthogonality detecting component 16 can be on a common plane, or with one in the front and the other one at the back. In the above FIG. 1, FIG. 2, FIG. 4, and FIG. 5, the pixel array 110 and the aperture array 120 are both shown on a planar plane. They can also locate on a non-planar plane, even a pixel blocks can be non-planar.

Figure 6:
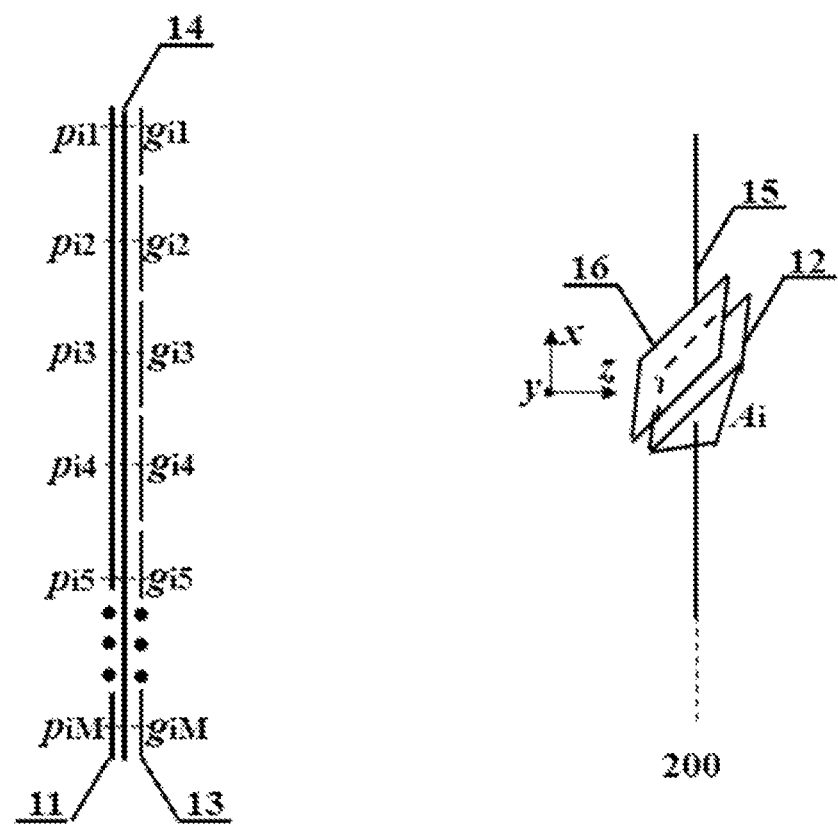
FIG. 6 shows a pixel-block-aperture structure with reflection-type apertures.

In above FIG. 1, FIG. 2, FIG. 4, and FIG. 5, the transmission-type apertures are taken as the examples. They also can be reflection-type apertures, such as the aperture 12 shown in FIG. 6.

Figure 7:
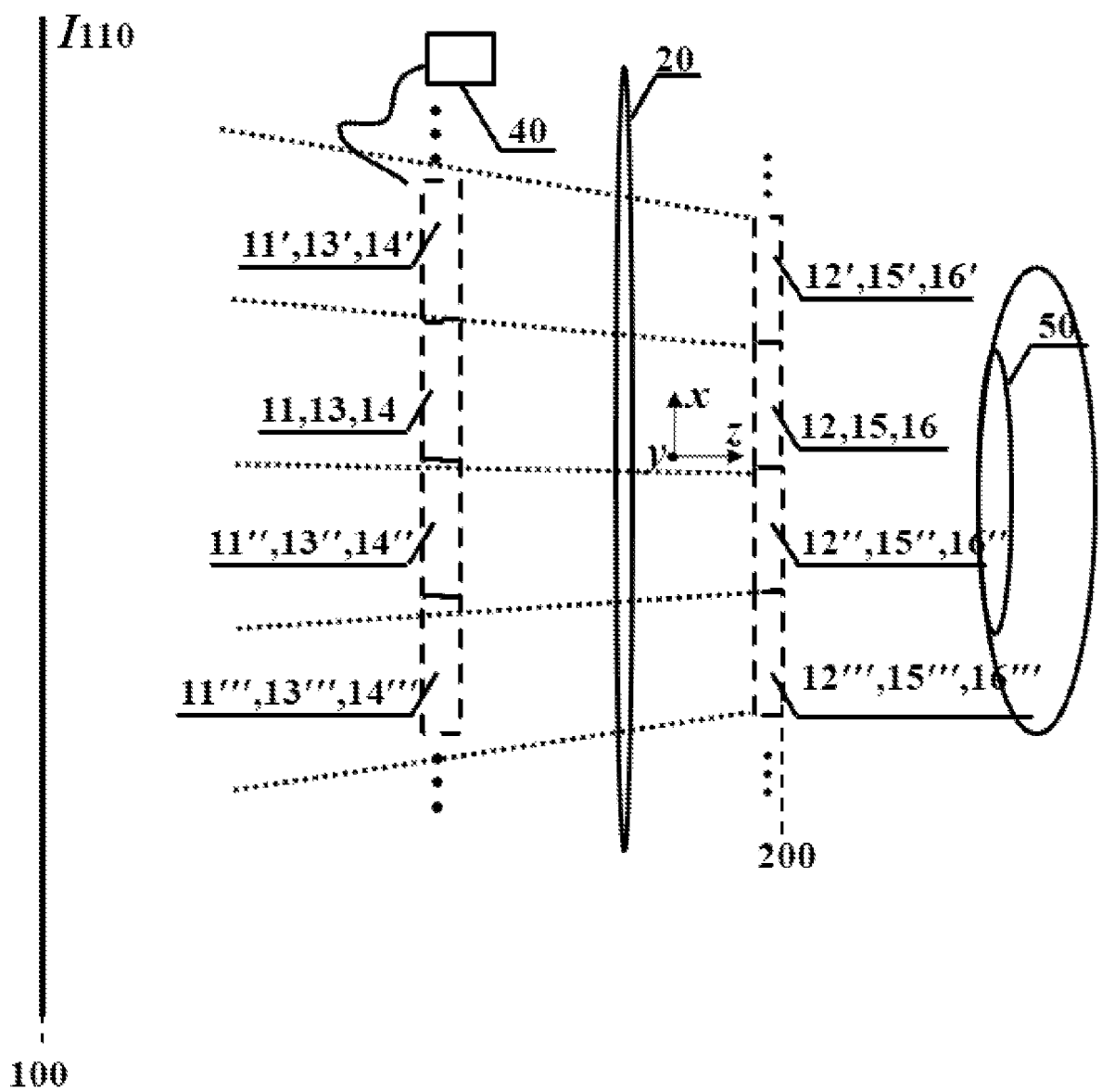
FIG. 7 shows an example of a display module with transmission-type apertures.
Figure 8:
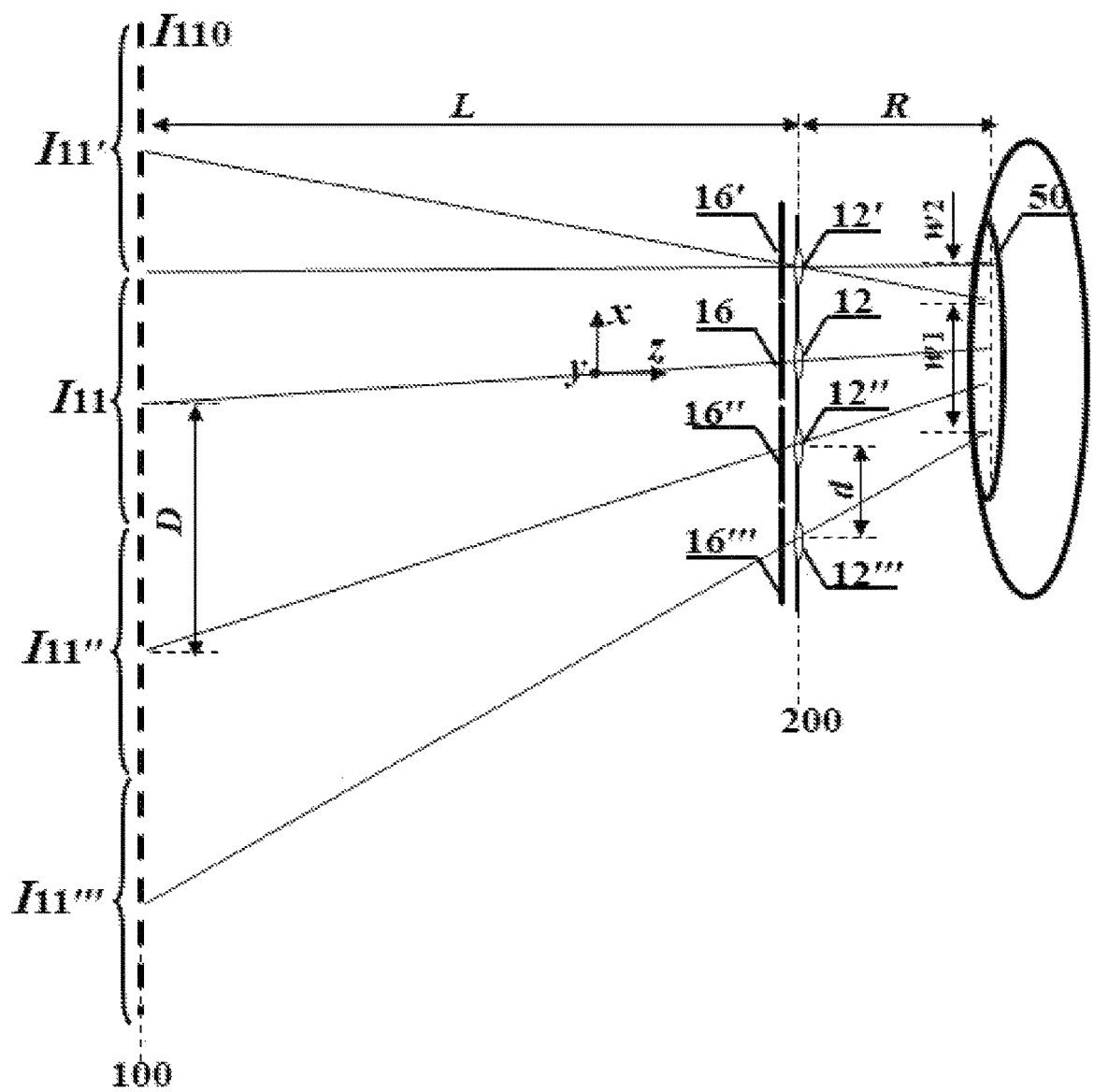
FIG. 8 shows a display module implementing Maxwellian view display.

Along the projection direction of the light from the pixel array 110, a projection device 20 is placed between the pixel array 110 and the aperture array 120, or in front of the aperture array 120, so to set up a near-eye display module based on pixel-block-aperture structures. In FIG. 7, a projection device 20 is placed between the pixel array 110 and the aperture array 120. M=4 pixel blocks are designed in this display module. For example, a pixel block 11', an aperture 12', a modulation component 13', an orthogonality generating component 14', a baffle 15', and an orthogonality detecting component 16' constitute a pixel-block-aperture structure 10'. The projection device 20 images the virtual image of a pixel onto the projection surface 100, to form a virtual image of this pixel block. The $I_{11}$, $I_{11'}$, $I_{11''}$, and $I_{11'''}$ shown in FIG. 8 are the virtual images of the pixel blocks 11, 11', 11'', 11''' in FIG. 7. The virtual images of the pixel blocks constitute a virtual image of the pixel array 110. Here, the projection device 20 is an imaging device, such as a lens, a group of lenses, a phase gratings or a phase plate. According to the object-image relationship, light from a pixel can equivalently be taken as from its virtual image, and light from a pixel block can equivalently be taken as from its virtual image.

Optimally, the virtual images of all the pixel blocks are arranged with an equal interval D, the apertures are aligned by an equal interval d along the arrangement direction, and the lines with each connecting the center of a pixel block and the center of the corresponding aperture intersect at a point $P_r$ (which is not shown in FIG. 8). When the viewer's pupil 50 can receive all light beams with each coming from a pixel and passing through the corresponding aperture, that is to say, the geometric relationship shown in FIG. 8 satisfies $$w_1 + 2w_2 \leq D_p \quad (1),$$

the pupil 50 can receive all the information from the pixel array 110. Here, $w_1$ is the coverage size on the pupil 50 of two lines with each connecting the center point of the virtual image of a marginal pixel block and the center point of the corresponding aperture. $w_2$ is the coverage size on the pupil 50 of two lines connecting two marginal points of a pixel block's virtual image with the center point of corresponding aperture. Here, $$w_1 = \text{abs}(Ld + Rd - RD)(M-1)/L \quad (2),$$

$$w_2 = RD/(2L) \quad (3).$$

where, abs ( ) is an absolute value function, R denotes the distance of the viewer's pupil 50 to the aperture surface 200, and L is the distance between the projection surface 100 and the aperture surface 200. The above formulas are deduced with the size of an aperture being ignored. In the above process, the lines with each connecting the center of a pixel block and the center of the corresponding aperture also can not intersect at a point.

In a Maxwellian view display, the light beam from a pixel has a small diverging angle within a certain depth range around this pixel or its image, which means a weak light intensity gradient along its propagation direction. Designing the size of an aperture smaller than that of the pupil 50, light beams from the virtual image of a pixel array 110, which is called as a pixel-array image, shown in FIG. 8, have small diverging angles when they reach to the pupil 50. Thus, with a pixel-block-aperture structure of FIG. 7 as an eyepiece, two such eyepieces for two eyes of a viewer build up a VAC-free VR or AR display system based on Maxwellian view technology. In this process, the binocular convergence drives the focus of an eye following the convergence distance, under the premise that a light beam of small diverging angle has weak traction to the focus. The control device 40 refreshes the pixel array 110 synchronously, with the optical information loaded on a pixel being the projecting information of the 3D scene to be displayed along the line connecting the virtual image of this pixel and its corresponding aperture 12.

In an above-mentioned display module, the modulation of the diverging angle and the propagation direction of the light beam from a pixel should take the projection device 20 into consideration. That is to say, a modulated light beam from a pixel should miss the non-corresponding apertures of the same kind in other pixel-block-aperture structures when the projection device exists. In the following part of the present application, when further components are inserted between the pixel array 110 and the aperture array 120, their effects on the diverging angle and the propagation direction of a light beam should be taken into consideration, too.

In FIG. 7 and FIG. 8, a light splitting device 18 can be introduced into a pixel-block-aperture structure 10. In such a pixel-block-aperture structure 10, the light splitting device 18 is attached to the corresponding pixel block 11, and guides light from G groups of pixels of this pixel block 11 to G zones, respectively. Here, the integer G≥2. The light beam from a pixel is guided to the aperture placed in the corresponding zone. That is to say, in a pixel-block-aperture structure 10, G apertures are placed in the G zone in a one-to-one manner, and pixels of different groups correspond to different apertures.

In a pixel-block-aperture structure 10 without a light splitting device 18, only one aperture exists. Under this condition, two display modules for two eyes of a viewer can implement Maxwellian view display, when the images on all the pixel blocks of a display module are perceived by the corresponding pupil through corresponding apertures. The introduction of the light splitting devices can bring more apertures to each light block-aperture structure, making one-pupil-more-view display implementable. As exampled by the pixel-block-aperture structure 10 with G=2 shown in FIG. 9, the pixel images ( . . . , $I_{pi1}$, $I_{pi2}$, $I_{pi3}$, $I_{pi4}$, $I_{pi5}$, $I_{pi6}$, . . . ) on the projection surface 100 constitute the virtual image $I_{11}$ of the pixel block 11. A light splitting device 18 guides the equivalent light beams from the pixel images . . . , $I_{pi1}$, $I_{pi3}$, $I_{pi5}$, $I_{pi7}$, $I_{pi9}$, . . . to an aperture 12a, and guides the equivalent light beams from the pixel images . . . , $I_{pi2}$, $I_{pi4}$, $I_{pi6}$, $I_{pi5}$, $I_{pi10}$, . . . to an aperture 12b. Among them, the corresponding pixels of the pixel images . . . , $I_{pi1}$, $I_{pi3}$, $I_{pi5}$, $I_{pi7}$, $I_{pi9}$, . . . come into a pixel sub-group, the corresponding pixels of the pixel images . . . , $I_{pi2}$, $I_{pi4}$, $I_{pi6}$, $I_{pi5}$, $I_{pi10}$, . . . come into another pixel sub-group.

When the interval between the apertures 12a and 12b is sufficiently small, the light beams form the G=2 pixel sub-groups enter the pupil 50 for one-pupil-multi-view display. Taking a displayed point P as example in FIG. 9, passing through this displayed point, light beams $I_{pi6}$P and $I_{pi7}$P from the pixels $p_{i6}$ and $p_{i7}$ of different pixel sub-groups enter the pupil 50 along different propagation directions, and overlap into a focusable displayed point. Here, the interval between adjacent apertures of a light block-aperture structure must be smaller than the diameter of the pupil 50. A larger value of G can make more passing-through light beams for a displayed point reach to a pupil 50, for simulating a cone-shaped beam from a corresponding real object point more naturally. In this case, along the arrangement direction of the apertures, the size of each aperture should be smaller than the diameter $D_p$ of the pupil 50. The apertures arranged along one-dimensional direction can take strip-type, with the scale along the direction perpendicular to the arrangement direction not necessary being smaller than $D_p$ anymore. Optimally, the center points $VP_{12a}$ of the aperture 12a in FIG. 9 is taken as the viewpoint for an image displayed by the corresponding pixel sub-group image, the center points $VP_{12b}$ of the aperture 12b 9 is taken as the viewpoint for an image displayed by the corresponding pixel sub-group image.

Figure 10:
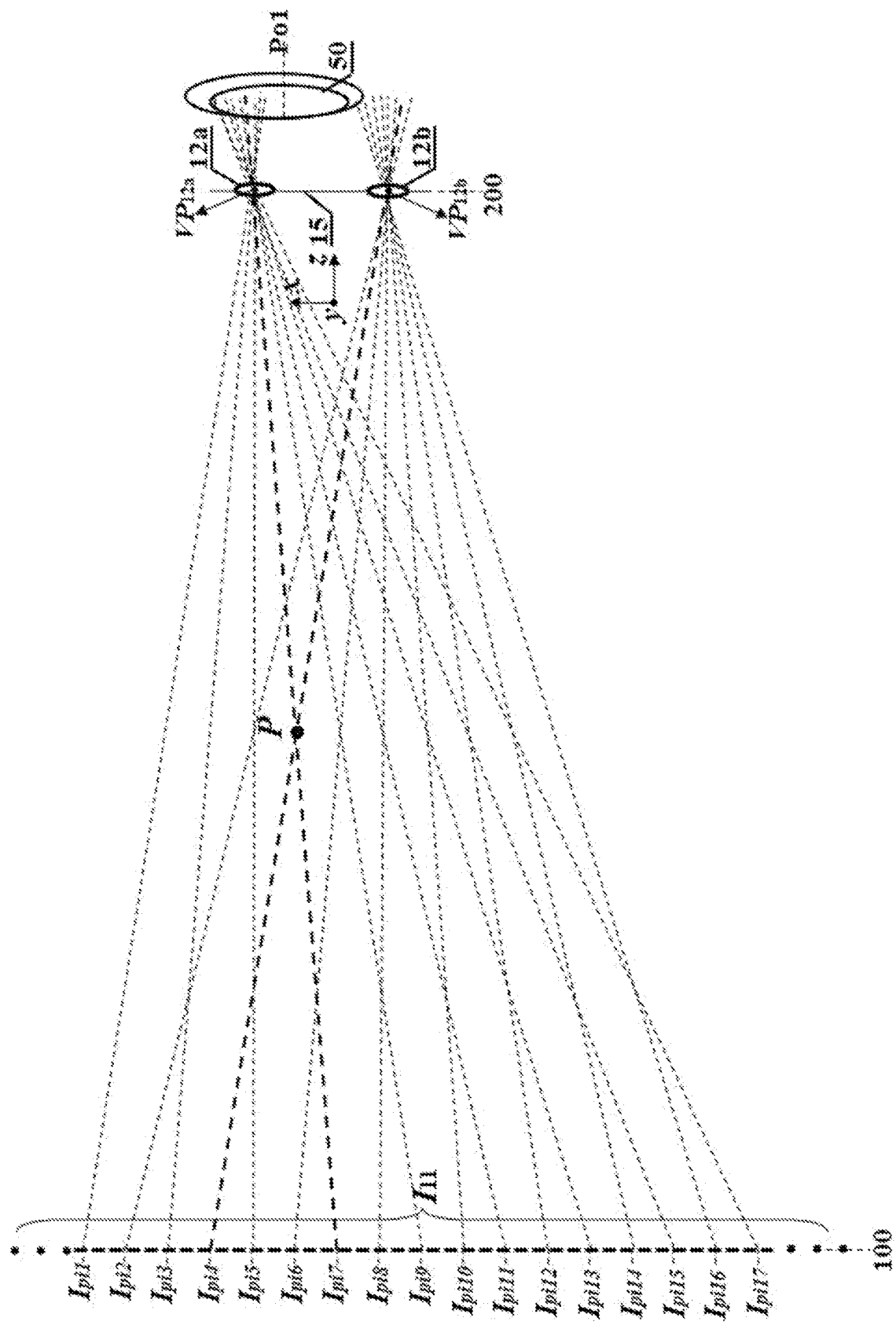
FIG. 10 illustrates the display principle of Maxwellian view display.
Figure 11:
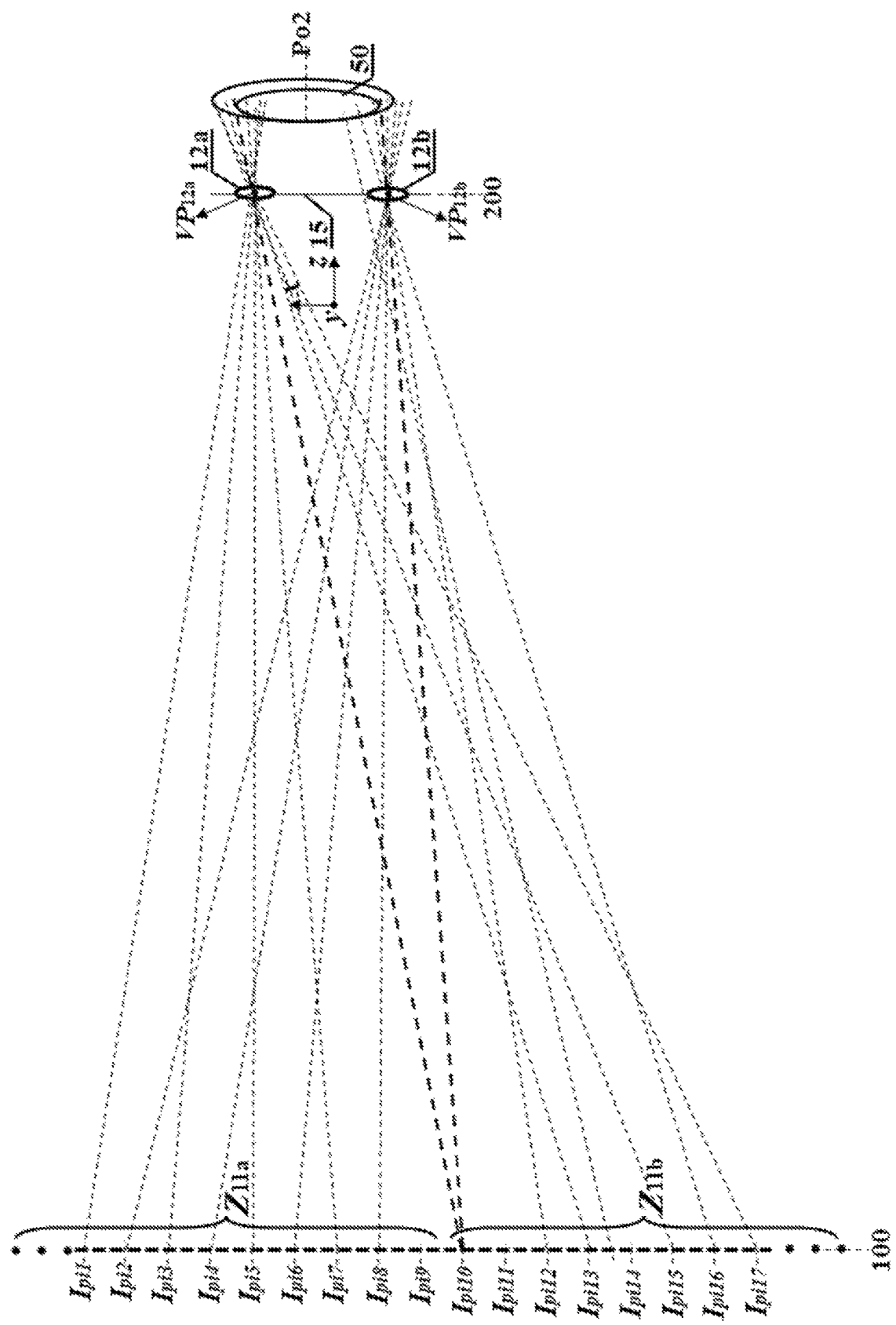
FIG. 11 shows the pixel sub-groups of a pixel block.

Differently, if the interval between the apertures 12a and 12b is not small enough, such as the case shown in FIG. 10, the pupil 50 at position Po1 only can perceive the light beams which pass through the aperture 12a. Through a displayed point P, only light beam $I_{pi7}$P reaches to the pupil 50. Under this condition, a Maxwellian view display gets implemented. With the pupil 50 moving to the position Po2 shown in FIG. 11, partial pixels (corresponding to the pixel image . . . , $I_{pi1}$, $I_{pi3}$, $I_{pi5}$, $I_{pi7}$, $I_{pi9}$ in the zone $Z_{11a}$) of a pixel sub-group corresponding to the aperture 12a and partial pixels (corresponding to the pixel image $I_{pi10}$, $I_{pi12}$, $I_{pi14}$, $I_{pi16}$, . . . in the zone $Z_{11b}$) of a pixel sub-group corresponding to the aperture 12b are visible. These two zones cover the whole image of the pixel block exactly, and these pixels splice together into a composite pixel sub-group. In FIG. 11, a sideline of the zone $Z_{11a}$ is a line connecting an edge point of the pupil 50 and the center point of the aperture 12a. For the pupil 50 at a position, if light beams from a whole composite pixel sub-group or a whole pixel sub-group can be perceived, at least a Maxwellian view display can get implemented. When more apertures are introduced into each pixel-block-aperture structure accompanying light splitting devices, a composite pixel sub-group can be constructed by pixels from more pixel sub-groups. Furthermore, when light beams from at least two composite pixel sub-groups without a common pixel, or at least a composite pixel sub-group and a pixel sub-group without a common pixel, or at least two pixel sub-groups without a common pixel, are perceived by each pupil of the viewer, one-pupil-multi-view display will get implemented.

Figure 9:
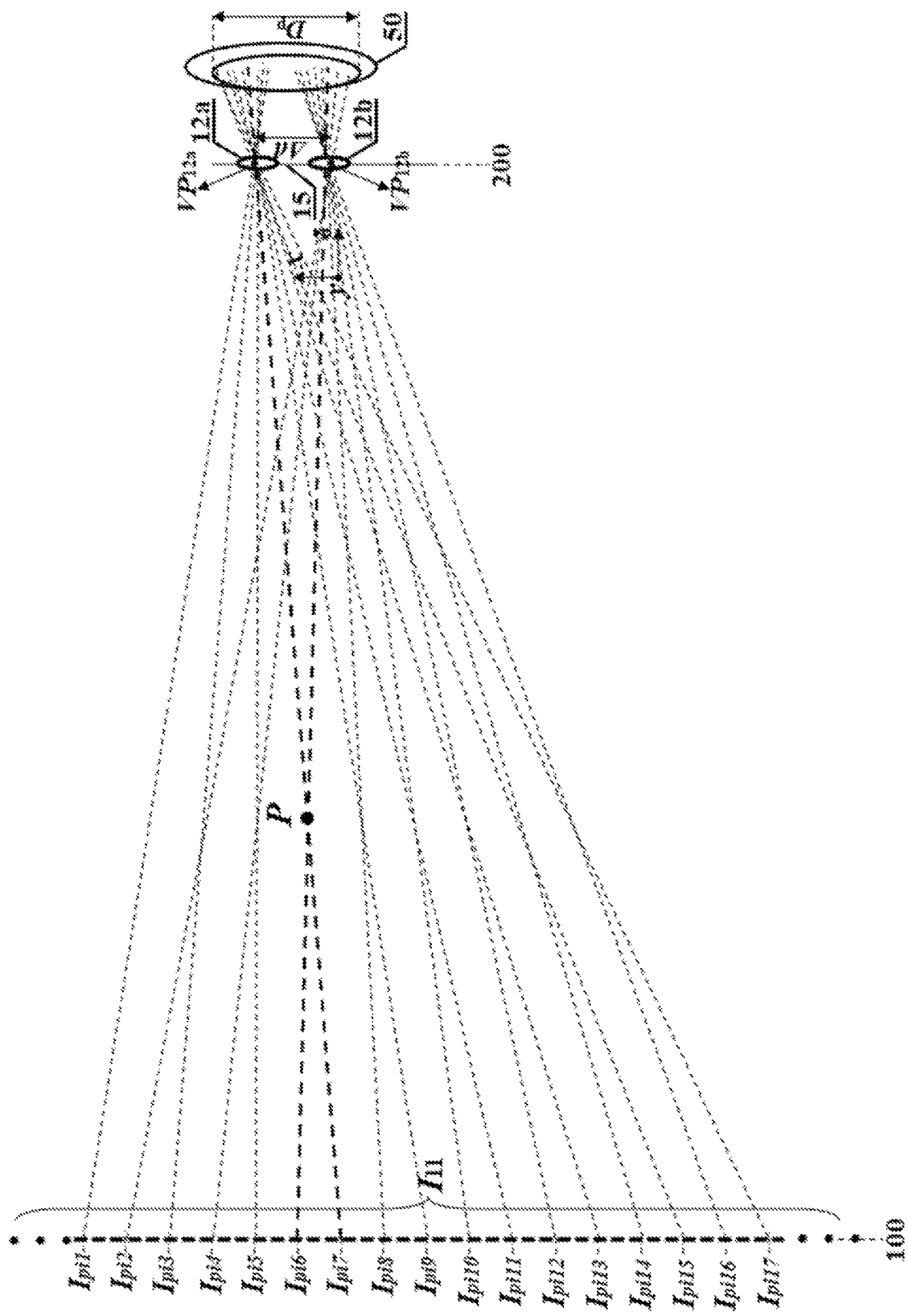
FIG. 9 illustrates the display principle of one-pupil-multi-view display.

FIGS. 9 to 11 illustrate how to achieve one-pupil-multi-view or Maxwellian view display by a pixel-block-aperture structure 10. In a near eye display module based on pixel-block-aperture structures, M pixel-block-aperture structures are arranged for display of a larger FOV. In any one of the M pixel-block-aperture structures, when more than one apertures are designed, light beams from at least two composite pixel sub-groups without a common pixel, or at least a composite pixel sub-group and a pixel sub-group without a common pixel, or at least two pixel sub-groups without a common pixel are perceived by the corresponding pupils, one-pupil-more-view display gets implemented. Under this condition, the size of an aperture can be smaller than the size of the pupil 50 along all directions, or only along a direction. The premise for one-pupil-multi-view display is described as follows: along an arrangement direction of the grating periodic structure, pixel images corresponding to the light beams perceived by a pupil 50 through at least 2M apertures can constitute at least two pixel-image sets. The characteristic of a pixel-image set lies in that, it has a field angle with respect to a point around the apertures covering the 3D scene to be displayed. Often, a pixel-image set includes P/G pixel images along an arrangement direction of the grating periodic structure, with P being the number of the pixels in the pixel array along this arrangement direction. Different pixel-image sets do not share a common pixel. For example, in FIG. 11, the pixel images . . . , $I_{pi1}$, $I_{pi3}$, $I_{pi5}$, $I_{pi7}$, $I_{pi9}$, and $I_{pi10}$, $I_{pi12}$, $I_{pi14}$, $I_{pi16}$, . . . constitute a pixel-image set. When the apertures are arranged along two-dimensional directions, the formation of a pixel-image set is based on the similar rule. If pixel images corresponding to the light beams perceived by a pupil can constitute just one complete pixel-image set, the display gets implemented by Maxwellian view. Under this condition, the size of an aperture is required to be smaller than the size of the pupil 50. There exists a situation that for some displayed points more than one passing-through light beams enter into the pupil 50, but for the other displayed points only one passing-through light beam enters into the pupil 50. In this case, the display principles of the one-pupil-multi-view and the Maxwellian view coexist. That is to say, partial spots are displayed based on Maxwellian view, and the other spots based on one-pupil-multi-view. Furthermore, P/G may not be an integer. In this case, the used value of P/G may be an integer near to the actual value of P/G.

According to above discussions about FIG. 9, no matter whether a light splitting device is introduced or not, a same method keeps valid for information loading of a pixel: a pixel is refreshed by the projection information of the 3D scene to be displayed along the line connecting the virtual image of this pixel and its corresponding aperture.

Figure 12:
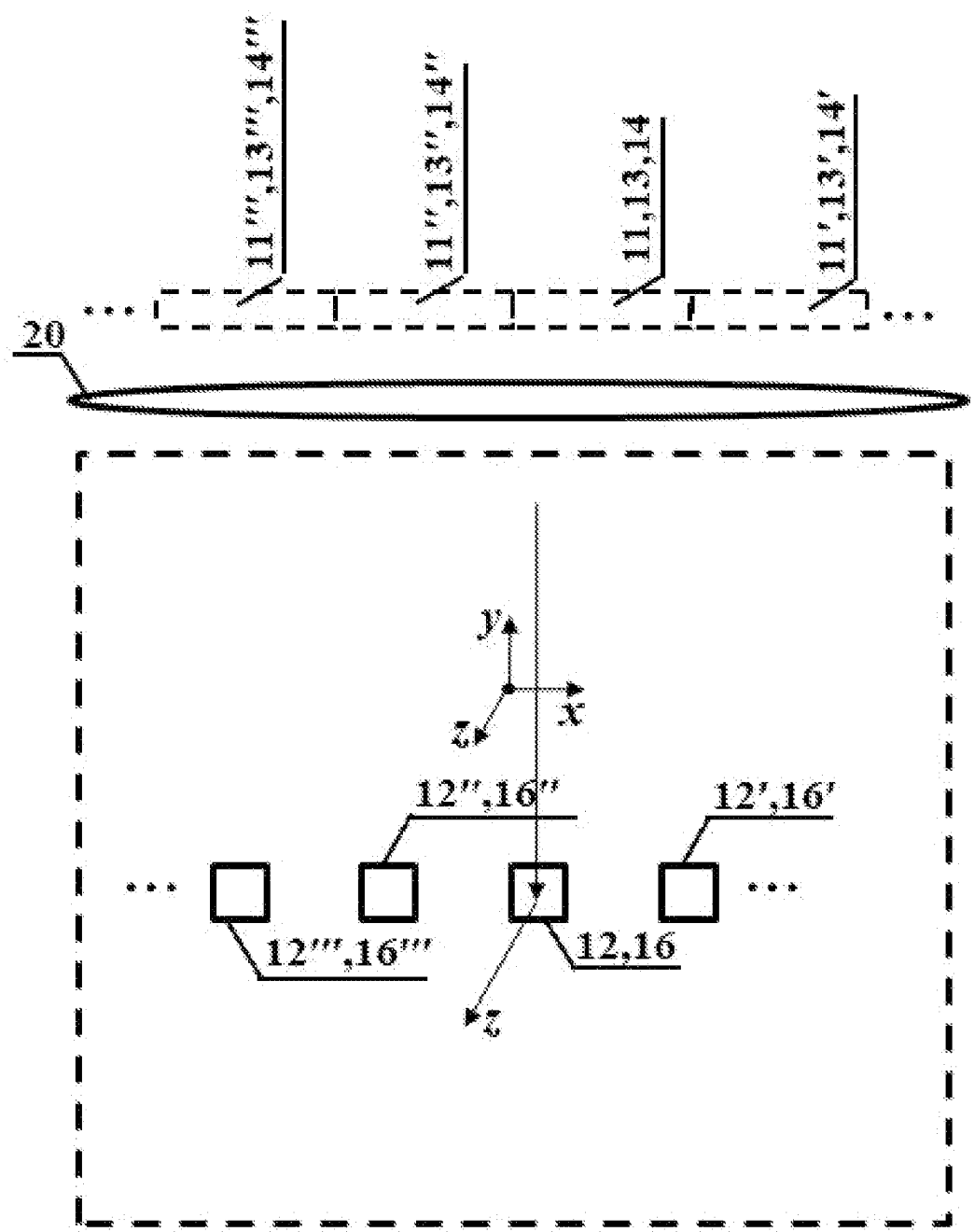
FIG. 12 shows an example of a display module with reflection-type apertures.

FIG. 12 shows an optical structure of a display module with transmission-type apertures. The external ambient light may pass through the non-aperture region of the aperture surface 200, when the baffle 15 is discarded. In the optical structure shown in FIG. 7 and FIG. 12, the light from the pixel array 110 can transmit to the aperture array 120 in the air or in other medium, such as optical glass.

Figure 13:
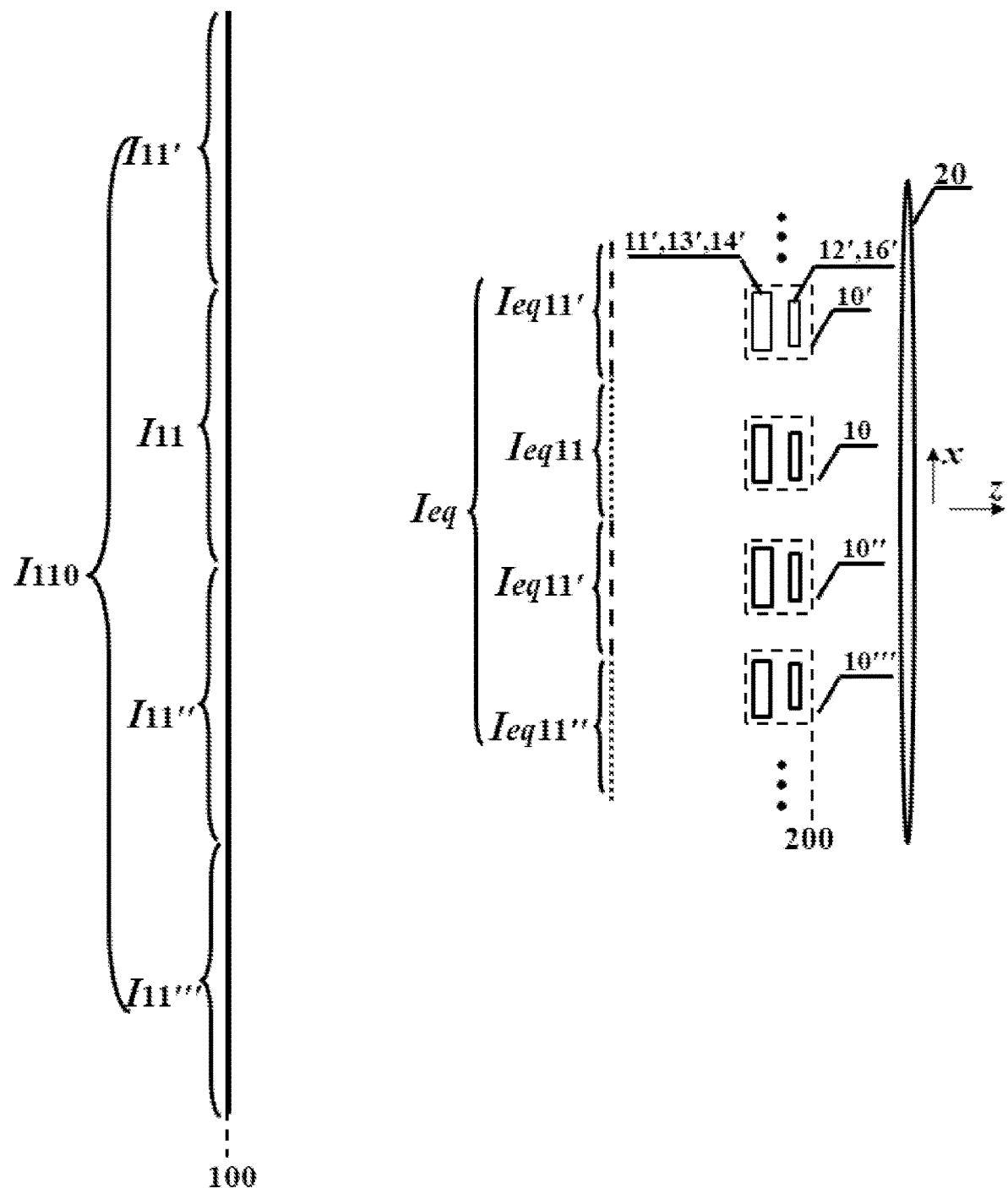
FIG. 13 is a display module with equivalent pixel blocks.

An aperture 12 shown above further can have a phase modulation function, imaging the corresponding pixel block 11. The image of a pixel block imaged by an aperture is called an equivalent pixel block. The coverage angles of M equivalent pixel blocks, which are from the M pixel-block-aperture structures respectively, with respect to a point around the apertures splice together seamlessly. As shown in FIG. 13, $I_{eq11'}$, $I_{eq11}$, $I_{eq11''}$, and $I_{eq11'''}$ are the equivalent pixel blocks corresponding to the pixel blocks 11', 11, 11", and 11''', respectively. The apertures 12', 12, 12", 12''' are with corresponding modulation functions, respectively. In FIG. 13, $I_{eq11'}$, $I_{eq11}$, $I_{eq11''}$, and $I_{eq11'''}$ splice together by end to end into an equivalent display surface $I_{eq}$. They may also splice together with some overlap into an equivalent display surface $I_{eq}$. The said "splice together seamlessly" refers to a splicing with an angular interval not larger than the coverage angle of an interval between pixel images of a pixel group or a pixel sub-group. Then, the projection device 20 images the equivalent display surface $I_{eq}$ again, to generate a pixel-array image $I_{110}$ on the projection surface 100. The loading information of a pixel is also the projection information of the 3D scene to be displayed along the line connecting its pixel image on the projection surface 100 and the corresponding aperture. Different apertures can be designed to project corresponding equivalent pixel blocks to different depths, respectively. This condition keeps requiring that the coverage angles of all the equivalent pixel blocks with respect to a point around the apertures splice seamlessly. The advantage of designing equivalent pixel blocks lies in that, a spatial interval between pixel blocks of adjacent pixel-block-aperture structures is allowed. In the embodiments without using equivalent pixel blocks, the pixel blocks have to be arranged adjacent to each other seamlessly, which often are different parts of a display screen. The spatial interval between adjacent pixel blocks, which results from the usage of the equivalent pixel blocks, also can help to decrease the crosstalk between apertures of adjacent pixel-block-aperture structures, even completely avoid this kind of crosstalk to make the modulation component 13, or the modulation component 13, the orthogonality generating component 14 and the orthogonality detecting component 16 non-necessary any more. Furthermore, the spatial interval between adjacent pixel blocks allows the baffle 15 to extend toward the pixel array 110 along the mid-planes between adjacent pixel-block-aperture structures. The extended baffle 15 can block the crosstalk between adjacent pixel-block-aperture structures, making the modulation component 13, or the modulation component 13, the orthogonality generating component 14 and the orthogonality detecting component 16 non-necessary any more. Another advantage of using equivalent pixel blocks lies in that, when the number of the pixel-block-aperture structures of a display module is high enough, all the pixel-block-aperture structures can be divided into two or more groups. Anyone of these groups has a seamless coverage angle with respect to a point around the apertures, and said seamless coverage angle covers the 3D scene to be displayed. Thus, these groups can carry out one-pupil-multi-view display or Maxwellian view display, even with different groups for displaying around different depths.

When a light splitting device 18 is introduced into a pixel-block-aperture structure 10, its multiple apertures can have corresponding phase modulation functions, respectively. Under this condition, different pixel sub-groups of the pixel block 11 are imaged by a corresponding aperture as different equivalent pixel blocks, respectively.

Figure 14:
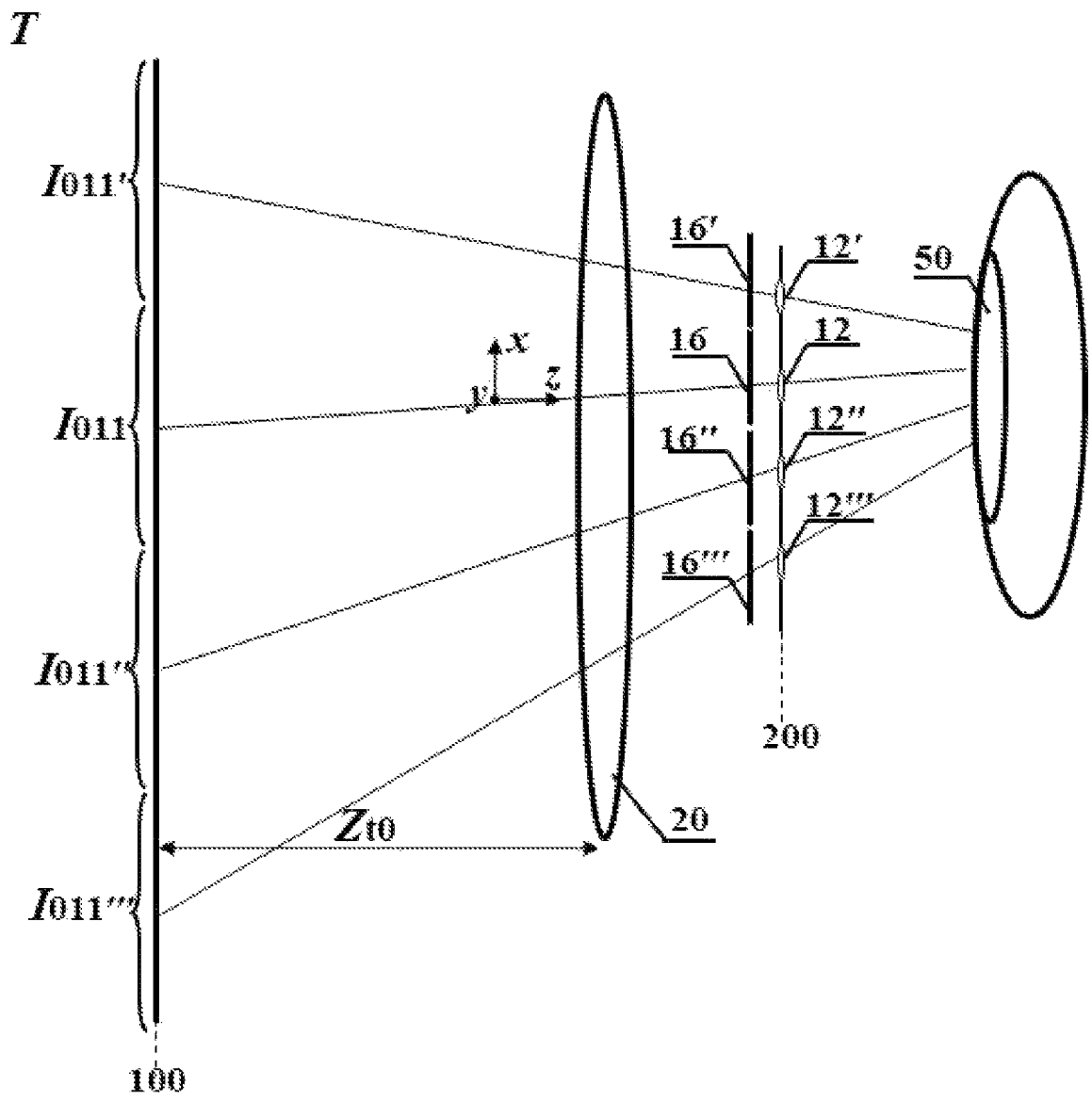
FIG. 14 shows a projection surface 100 projected by a projection device with an adjustable focus.
Figure 15:
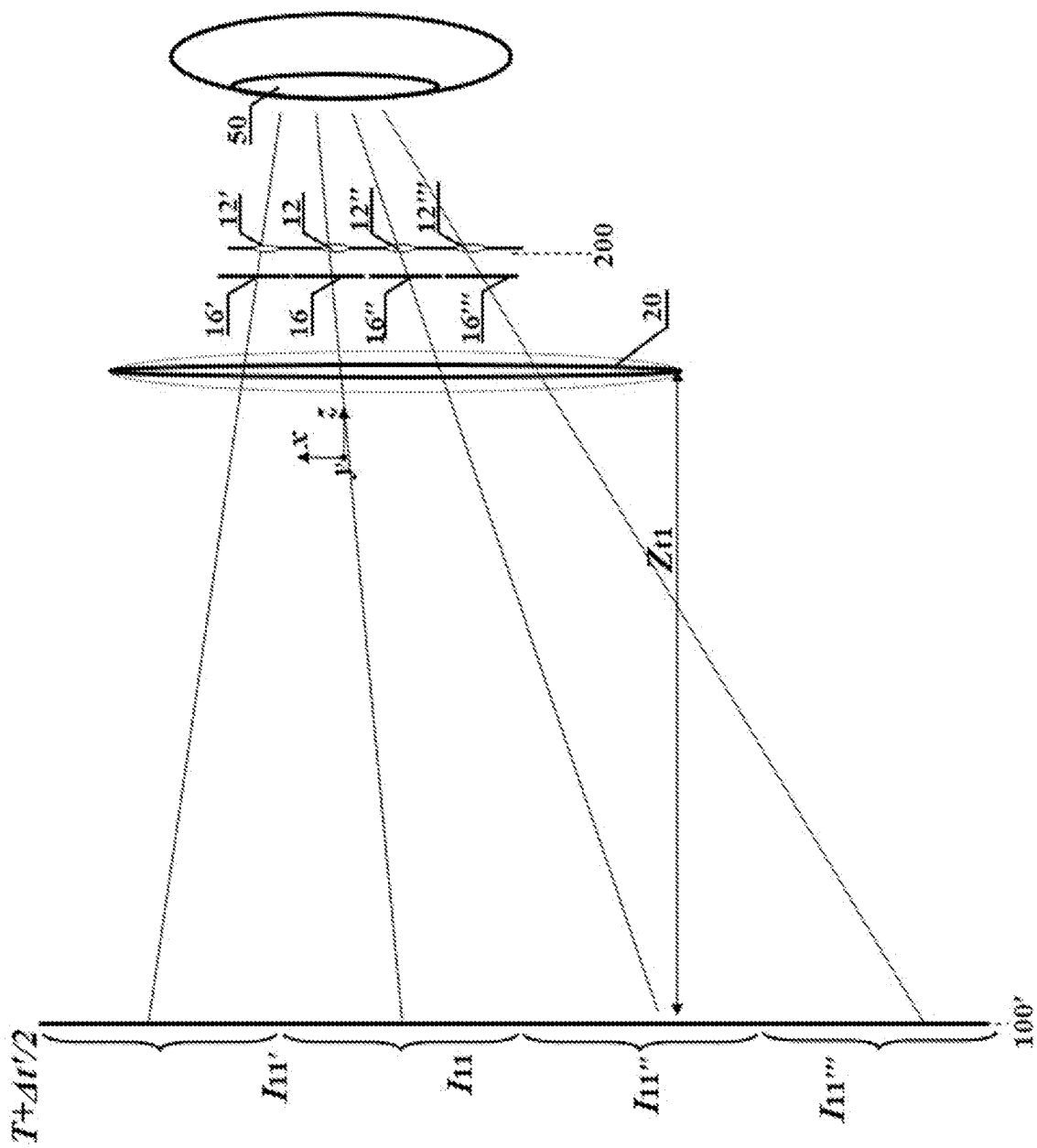
FIG. 15 shows another projection surface 100' projected by a projection device with an adjustable focus.

A small light intensity gradient along the propagation direction of a light beam gets implemented by a corresponding small sized aperture or sub-aperture in above VAC-free Maxwellian view display. But the depth range of a small light intensity gradient is always limited. The projection device 20 also can be designed with an adjustable focus, such as a liquid lens whose focus can be changed by the control device 40. Then, at different time-points of a time-period, the projection device 20 projects the image of the pixel array 110 to different depths sequentially for a larger depth of field. As exampled in FIG. 14 and FIG. 15, at two time-points of a time-period T–T+Δt', the pixel array is imaged to the projection surfaces 100 and 100', respectively. With Maxwellian view display getting implemented around the projection surfaces 100 and 100' at these two time-points, respectively, a Maxwellian view display with a larger depth of field will get implemented based on the persistence of vision, when this process is repeated in each time-period. In addition, when the viewer's convergence distance is real-time tracked by an auxiliary device, the control device 40 can drive the projection device 20 to image the pixel array to the tracked convergence distance synchronously, thus the viewer's focus keeps following the convergence distance without timing multiplexing in a 3D display. These processes are compatible with and can be introduced into one-pupil-multi-view display.

A projection device 20 of an adjustable focus also can be a composite liquid crystal lens formed by stacking multiple liquid crystal sheets, which produces different focal lengths by activating different liquid crystal sheets or different combinations of the liquid crystal sheets.

Figure 16:
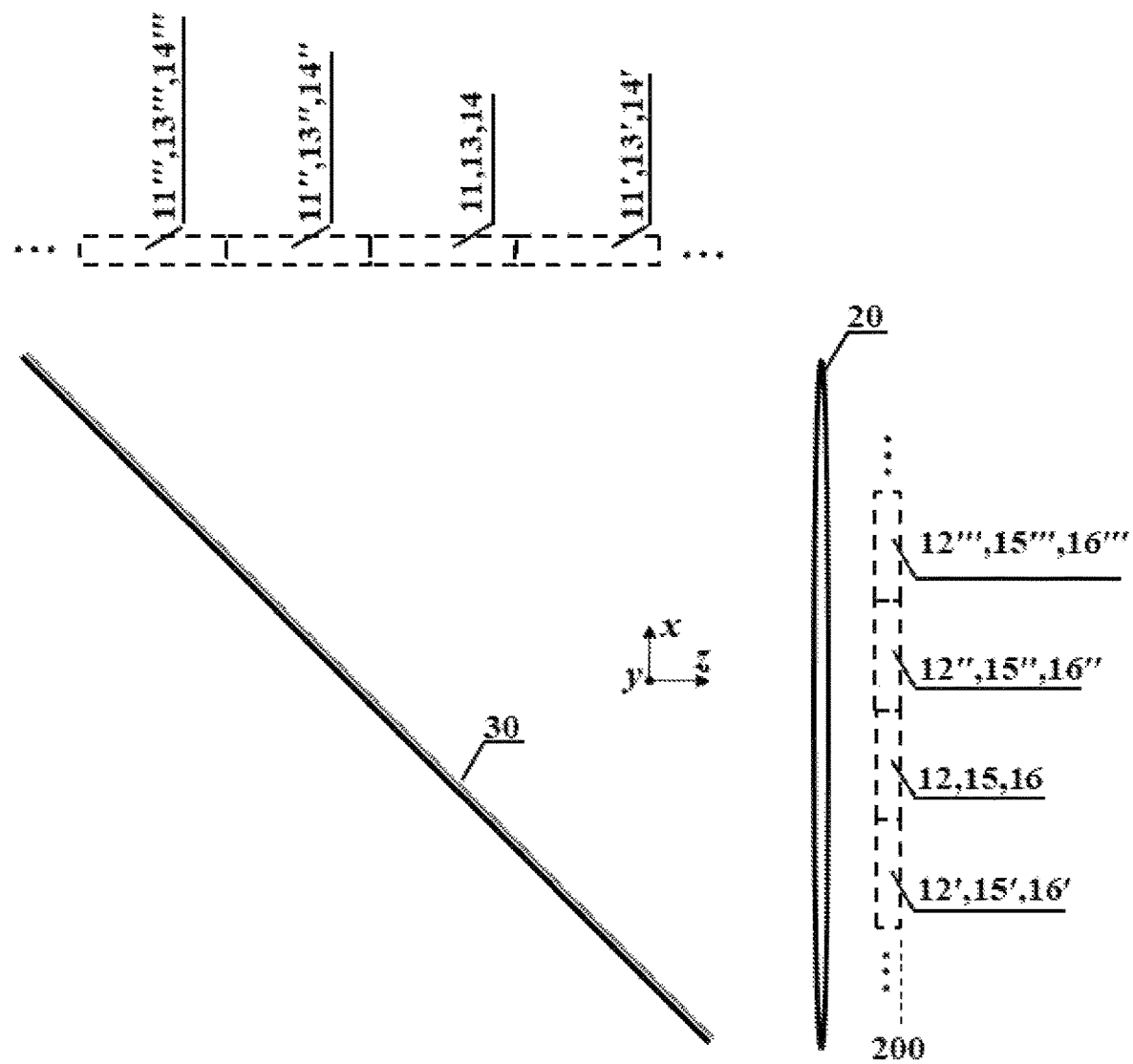
FIG. 16 shows a display module with a mirror or a semi-transparent mirror working as the relay device.
Figure 17:
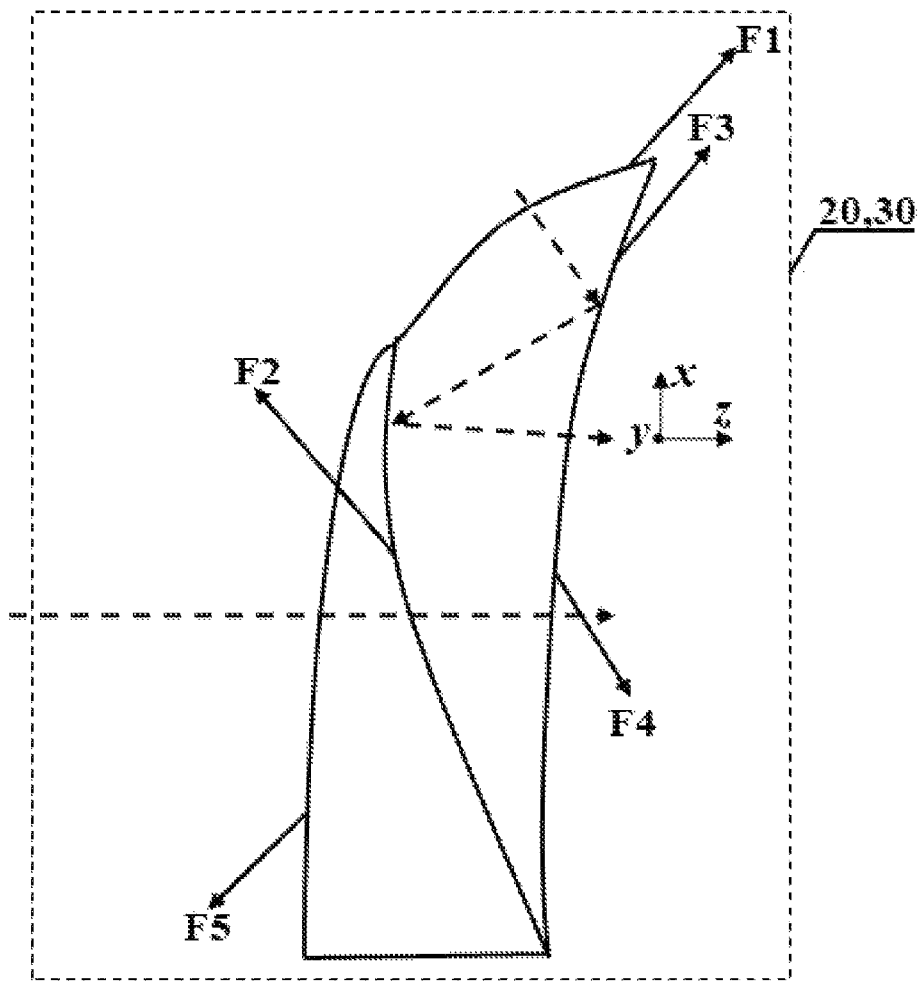
FIG. 17 is a free-form surface device working as the relay device.
Figure 18:
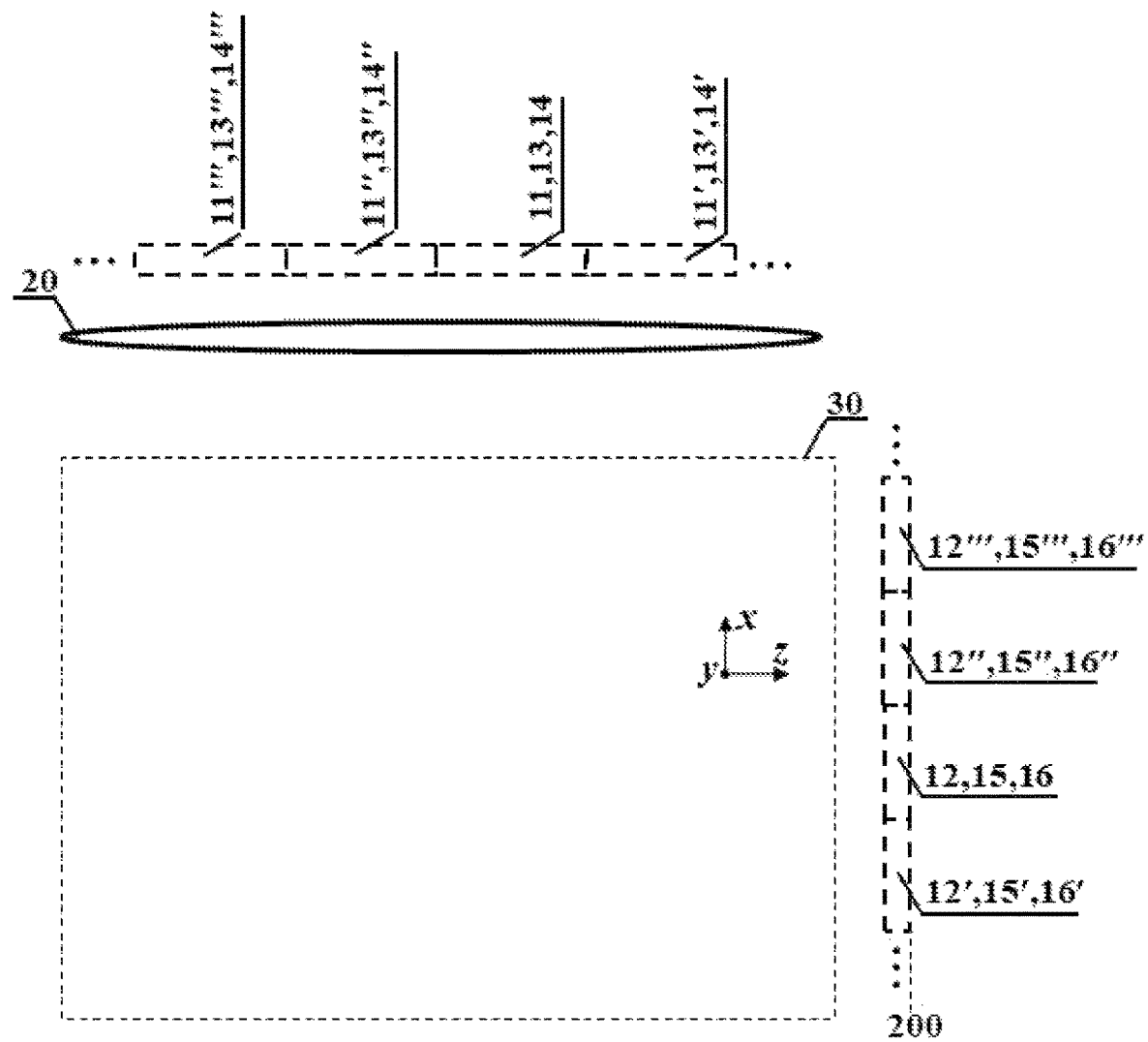
FIG. 18 shows another spatial relationship between the projection device and relay device.

In the optical structure of a near-eye display module based on pixel-block-aperture structures discussed above, as shown in FIG. 7, a relay device 30 can be inserted between the pixel array 110 and the pupil 50. The relay device 30 is designed not only for guiding light from the pixel array 110 to the pupil 50, but also thinning the display module, or allowing external ambient light be perceived by the pupil 50. A relay device 30 can take the deflection devices commonly used by conventional VR/AR system, such as a mirror or a semi-transparent mirror shown in FIG. 16, or a free-form surface device shown in FIG. 17. In FIG. 17, the curved surface F1 is a transmissive surface, the curved surface F3 is a reflective surface, the curved surface F2 is a semi-transparent surface, and the curved surface F4 is a transmissive surface. Among them, the curved surfaces F1, F3, F2, and F4 jointly play the function of imaging the corresponding pixel array 110, and replacing the projection device 20. Actually, different components of a display module can be integrated into a physical device. For example, the aperture array 120 and the baffle 15 of FIG. 2 can be implemented by a liquid crystal sheet with light transmission zones as the apertures and the opaque region as the baffle. Another example, the function of a modulation component 13 can also be implemented by a corresponding pixel block 11 with the light beam from a pixel of this pixel block having pre-designed diverging angle and propagation direction. The curved surface F5 is a compensation surface, eliminating the influence of the curved surfaces F2 and F4 on the incident light from the external environment. Along the projection direction of the light, the position of the relay device 30 is flexible. In FIG. 18, it locates between the projection device 20 and the aperture array 120.

Figure 19:
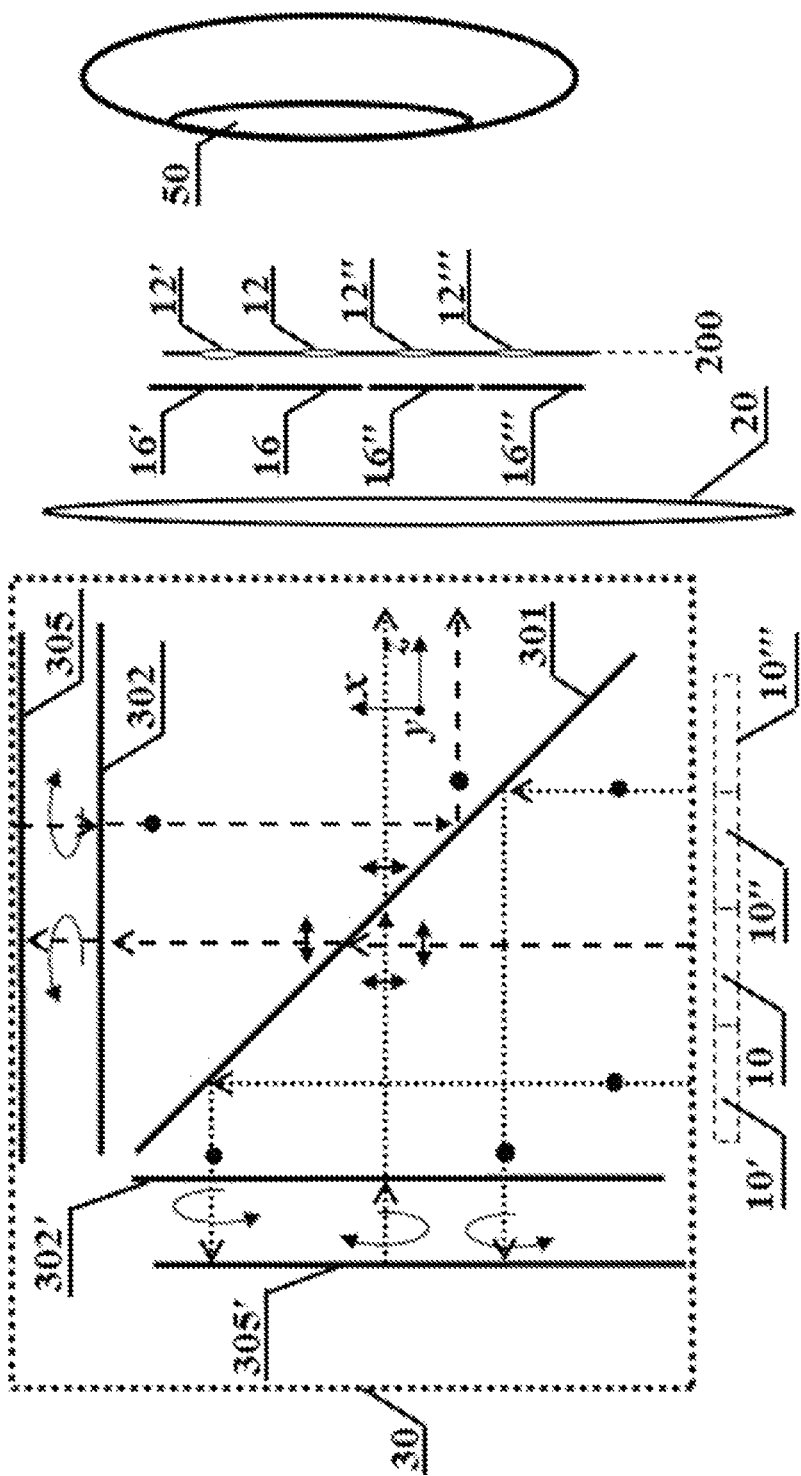
FIG. 19 shows a display module with a beam-path-folding structure functioning as the relay device.
Figure 20:
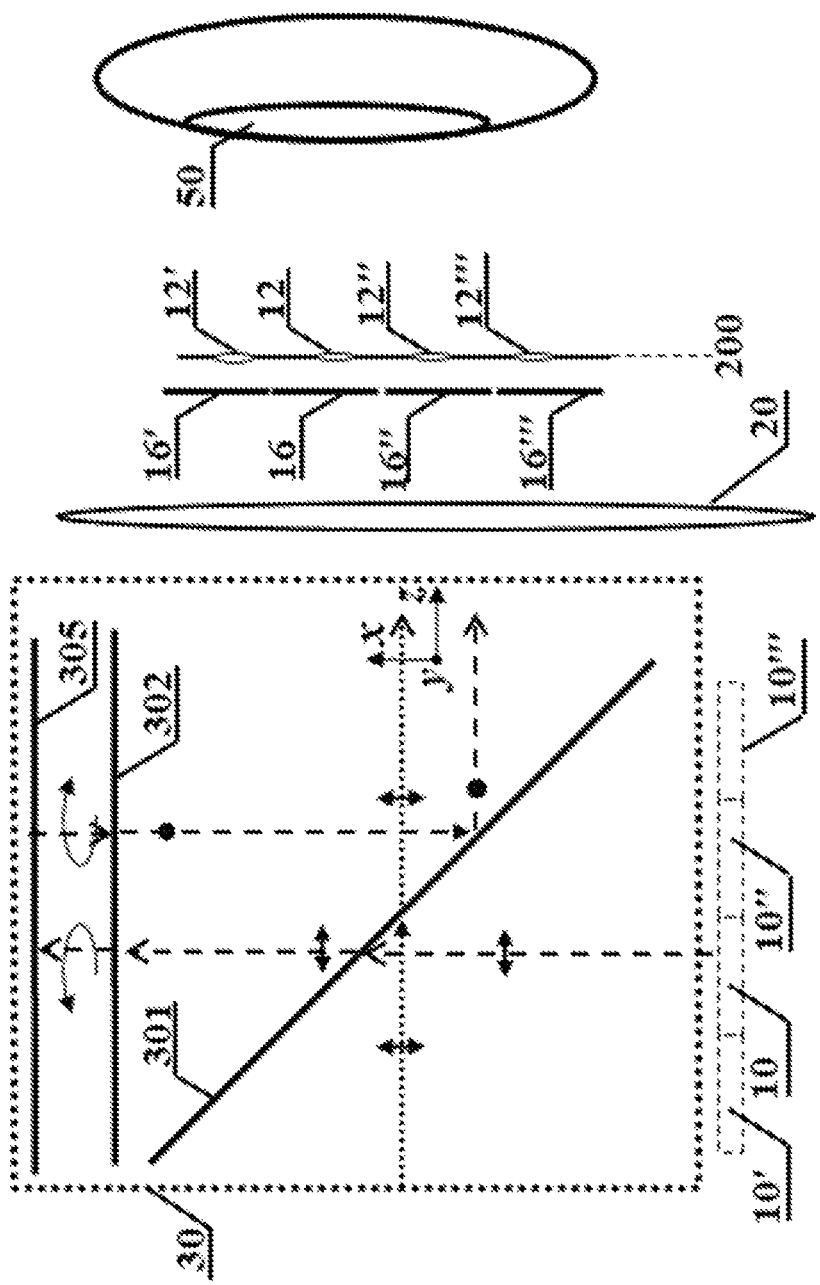

The relay device 30 also can be a beam-path-folding structure for thinning the display module. FIG. 19 shows a beam-path-folding structure, which comprises an optional-reflecting-transmitting device 301, two modulation sheet 302,302', and two reflectors 305,305'. The optional-reflecting-transmitting device 301 reflects light of a kind of characteristic and transmits light of another kind of characteristic, which are named as reflection characteristic and transmission characteristic, respectively. The light of transmission characteristic from the pixel array 110, for example the "↔" light in FIG. 19, passes through the optional-reflecting-transmitting device 301; then goes through the modulation sheet 302 and gets reflected by the reflector 305; the reflected light passes through the modulation sheet 302 again, the "↔" light of transmission characteristic changes into light of reflection characteristic by twice modulations of the modulation sheet 302, and ultimately propagates to the observing zone for the pupil 50 by deflecting of the optional-reflecting-transmitting device 301. The light of reflection characteristic from the pixel array 110 is reflected by the optional-reflecting-transmitting device 301, then passes through the modulation sheet 302' twice by the help of the reflection sheet 305', converting into light of transmission characteristic; and ultimately propagates to the observing zone for the pupil through the optional-reflecting-transmitting device 301. A polarization beam splitter is taken as the optional-reflecting-transmitting device 301, and the modulation sheet 302 is a quarter wave plate in FIG. 19. The beam-path-folding-type relay device 30 shown in FIG. 19 also works for pixel-block-aperture structures of other orthogonal characteristics, such as timing characteristics, as shown in FIG. 20. Under the condition shown in FIG. 20, "↔" light from external ambient light reaches to the pupil 50 for AR display.

Figure 21:
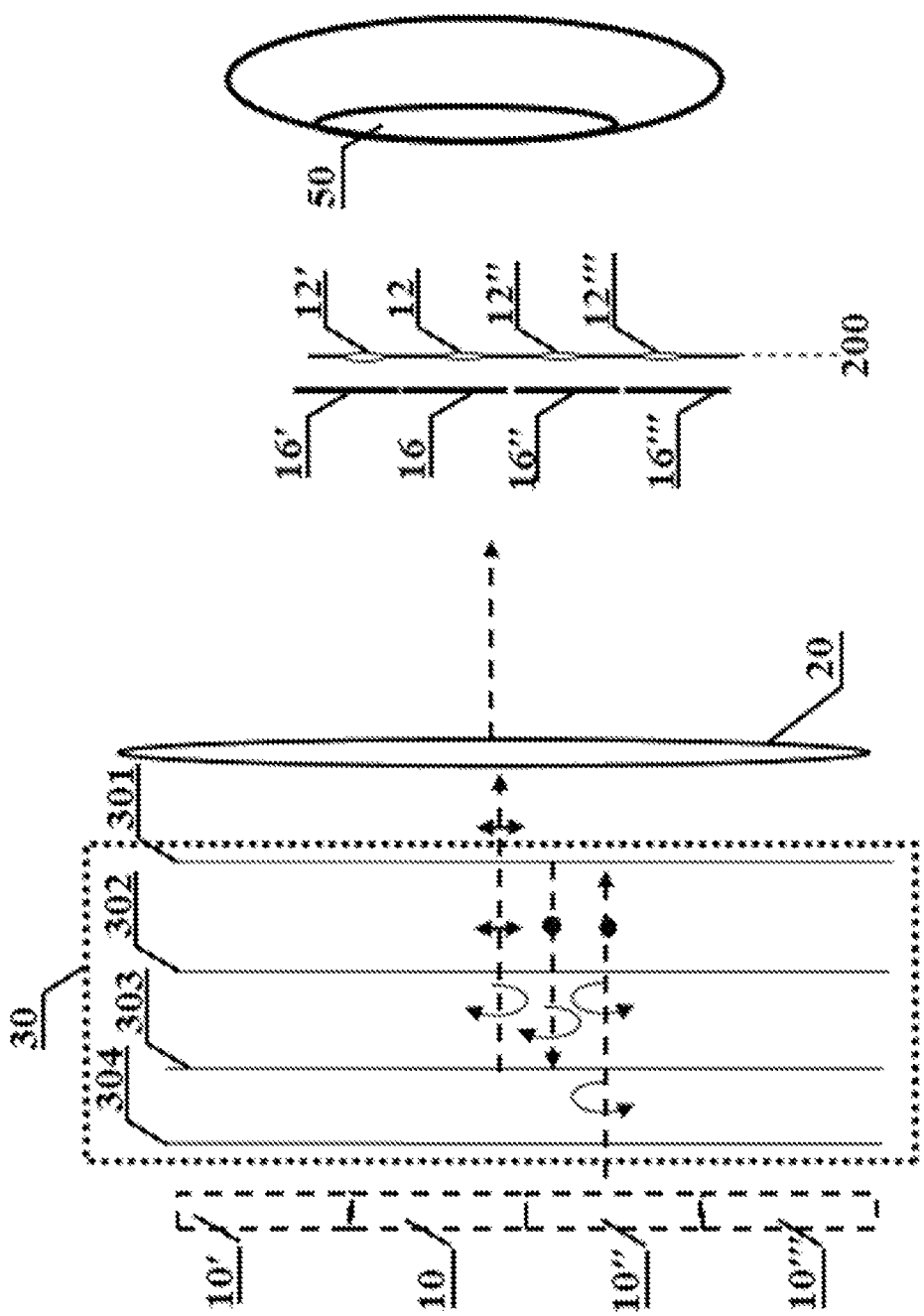
FIG. 21 shows another beam-path-folding structure.

FIG. 21 shows another beam-path-folding-type relay device 30. The beam-path-folding structure includes an optional-reflecting-transmitting device 301, a modulation sheet 302, a semi-transparent-semi-reflective plate 303, and a polarization pre-modulator 304. The polarization pre-modulator 304 modulates the optical characteristics of the incident light, so to make it be deflected by the optional-reflecting-transmitting device 301 after passing through the semi-transparent-semi-reflective plate 303 and the modulation sheet 302; then the reflected light is reflected by the semi-transparent-semi-reflective plate 303 after passing through the modulation sheet 302 and passes through the modulation sheet 302 once again. Then the light of transmission characteristic ultimately propagates to the observing zone for the pupil 50 through the optional-reflecting-transmitting device 301.

Figure 22:
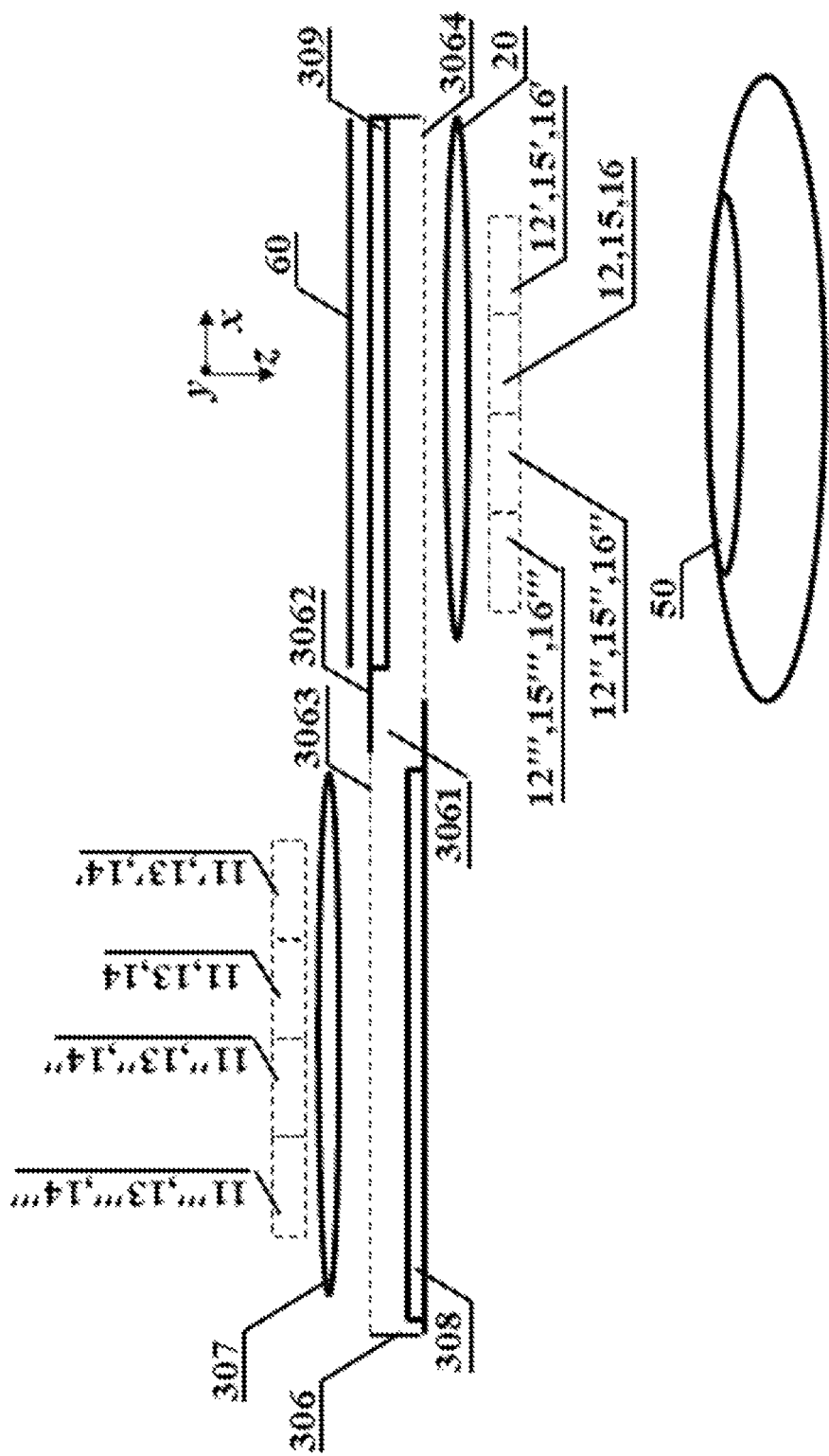
FIG. 22 shows a display module with an optical wave-guide device functioning as the relay device.

An optical wave-guide device commonly used in the traditional AR field can work as a wave-guide-type relay device 30 for obtaining a thin structure. FIG. 22 shows a display module with a wave-guide-type relay device 30. The wave-guide-type relay device 30 includes a wave-guide body 306, a modulating group 307, a coupling-in element 308, and a coupling-out element 309. The wave-guide body 306 consists of a wave-guide plate 3061, total-reflection surfaces 3062, an entrance pupil 3063, and an exit pupil 3064. The total-reflection surfaces 3062 guide light from the entrance pupil 3063 to the exit pupil 3064 through the wave-guide plate 3061 by total reflections; the modulating group 307 modulates the light beams from the pixel array 110 and guides them into the wave-guide plate 3061 through the entrance pupil 3063; the coupling-in element 308 guides incident light from the entrance pupil 3063 to propagate along the wave-guide plate 3061 under total-reflection condition; the coupling-out element 309 guides light propagating along the wave-guide plate 3061 to go out the wave-guide plate 3061 through the exit-pupil 3064. A compensation device 60 can be inserted between the wave-guide-type relay device 30 and the external environment, for neutralizing the impact of the wave-guide-type relay device 30 on the light from the external environment. The optical wave-guide body 306 can be a planar optical wave-guide or a curved optical wave-guide, and the coupling-in element 308 can be a microstructure grating etched into the optical wave-guide body 306 by a micromachining process, a holographic grating exposed in the optical wave-guide body 306, or mirrors coated onto the optical wave-guide body 306. After passing through the wave-guide-type relay device 30 and the projection device 20, the pixel array 110 is imaged to the projection surface 100, which locates at an infinite or a finite distance. And the light from the exit-pupil 3064, which is taken as light equivalently emitted by the pixel-array image, is guided to the observing zone for the pupil 50. Along the light transmission direction, the aperture array 120 is placed in front of the exit pupil 3064. When the virtual image of the pixel array 110 is projected to infinity, the function of the projection device 20 can be replaced by the modulating group 307 which transforms light beam from a pixel into a corresponding parallel light beam, the total-reflection surfaces 3062, and the viewer's eye jointly.

Figure 23:
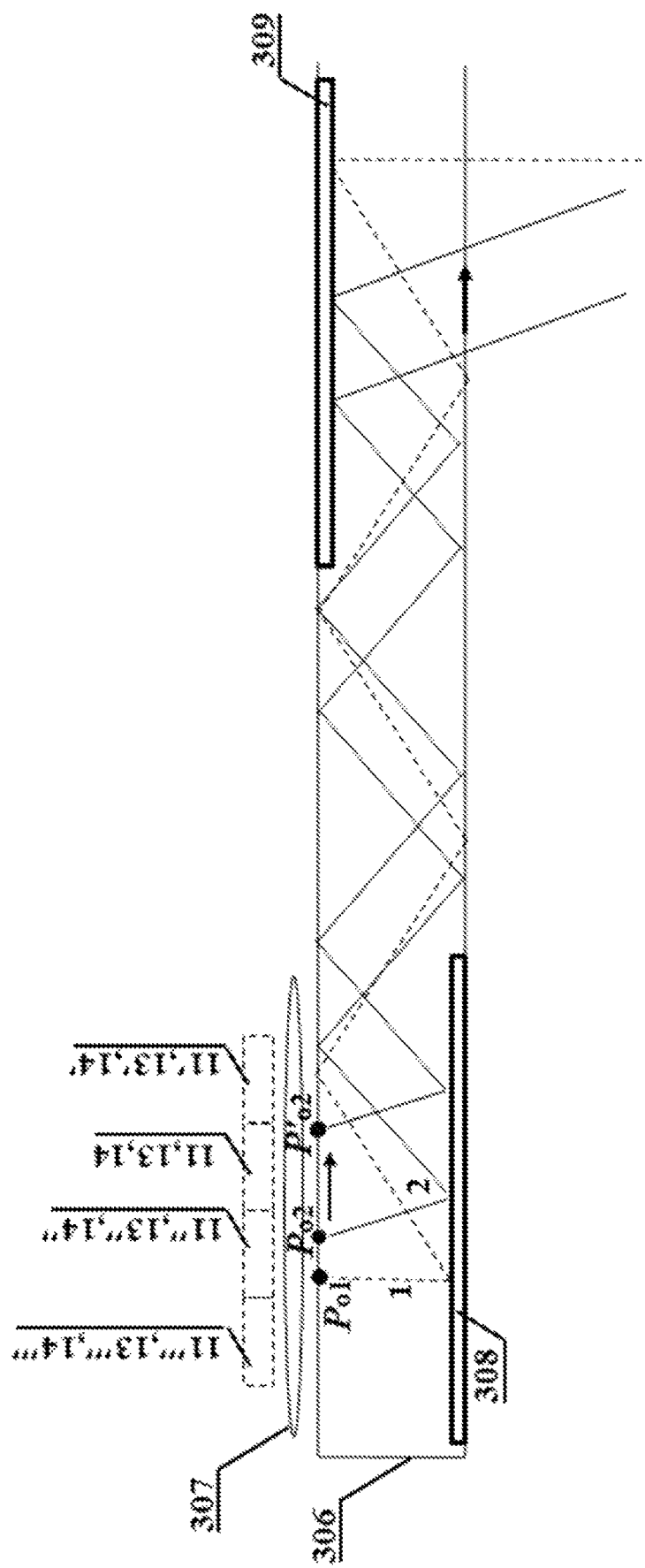
FIG. 23 shows the different exiting positions of light beams with different incident positions in an optical wave-guide device.

The display module shown by FIG. 22 requires the wave-guide-type relay device 30 to keep the orthogonal characteristic of the incident light being unaffected. For example, the wave-guide-type relay device 30 should have polarization preserving ability when linear polarizations are used as the orthogonal characteristics. The optical information refreshed by a pixel still is the projecting information of the 3D scene to be displayed along the line connecting the virtual image of this pixel and its corresponding aperture. In this process, light beam from a pixel also should miss a non-corresponding aperture of the same kind and of non-corresponding pixel-block-aperture structures. To guarantee this, the position and propagation direction of a light beam should be well designed. For example, influence of a modulation element and the modulation group 307 on the incident position and the spot size at the entrance pupil 3063 should be considered by ray tracing. FIG. 23 shows a concrete example. The light beams 1 and 2 from two pixels have their corresponding positions and propagation directions on the entrance pupil 3063, respectively, which determine their different positions and propagation directions at the exit pupil 3064. For a same pixel, the corresponding position and propagation direction at the exit pupil 3064 get changed when the corresponding position and incident direction at the entrance pupil 3063 changes. In FIG. 23, for the light beam from the pixel 2, when its incident position at the entrance pupil 3063 is translated from the point $P_{o2}$ to the point $P'_{o2}$, its projection position on the exit pupil 3064 changes accordingly.

In above processes, the light beam from a pixel can enter the wave-guide body 306 as a parallel light, or as a non-parallel light. The function of the projection device 20 can be integrated into the apertures, or replaced by the modulating group 307, the total reflection surface 3062, and a viewer's eyes jointly.

Figure 24:
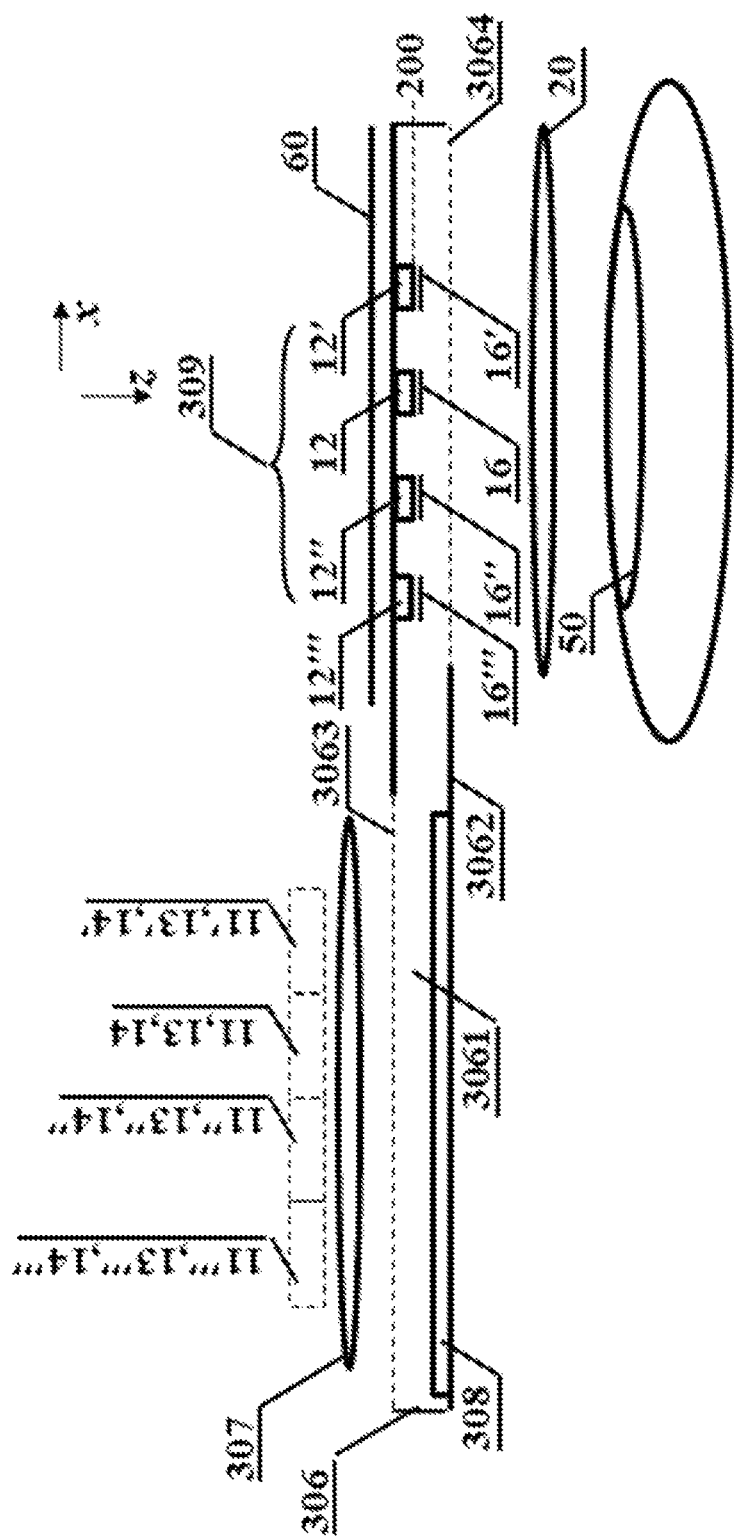
FIG. 24 shows an optical wave-guide device with the coupling-out element being constructed by multiple reflection-type coupling-out areas and the display module thereof.
Figure 25:
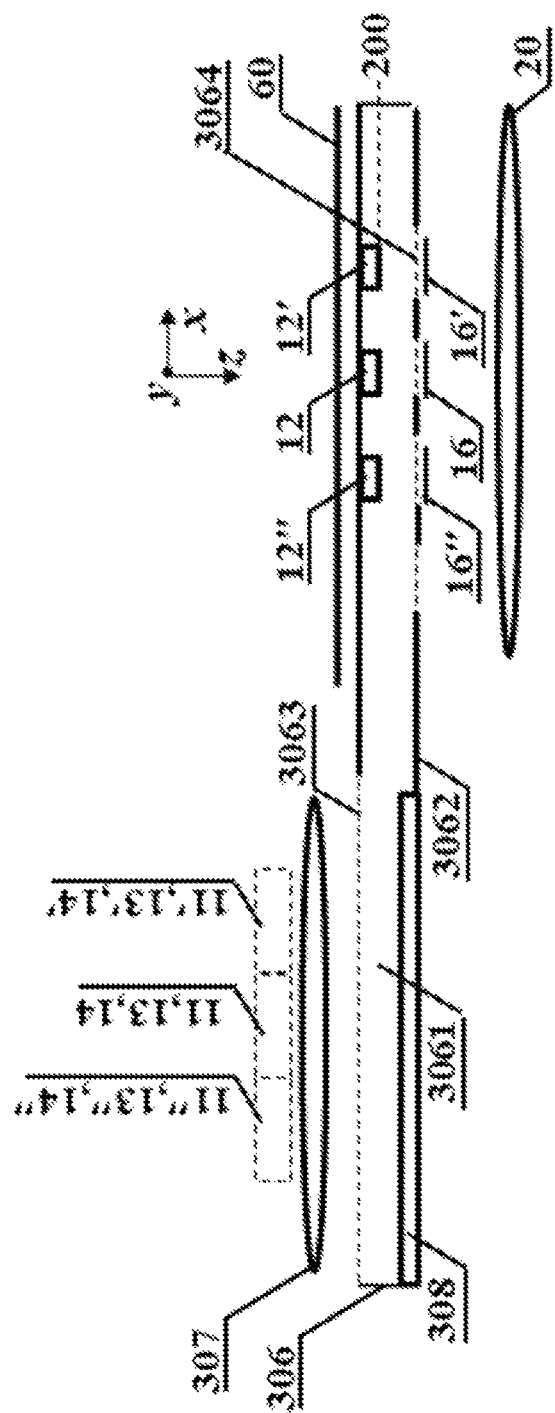
FIG. 25 shows another spatial position for the orthogonality detecting component in a display module, which adopts a wave-guide-type relay device with discrete distributed reflection-type coupling-out areas.

FIG. 24 shows a display module with a reflection-type aperture and a wave-guide-type relay device 30. The discrete distributed apertures 12, 12', 12" and 12''' jointly function as the coupling-out element 309. Corresponding orthogonality detecting components 16, 16', 16" and 16''' are attached to the apertures 12, 12', 12" and 12''' directly, or attached to the exit pupil 3064, as shown in FIG. 25.

In a display module with a wave-guide-type relay device 30, the apertures can also have corresponding modulation function, respectively.

Embodiment 2

Figure 26:
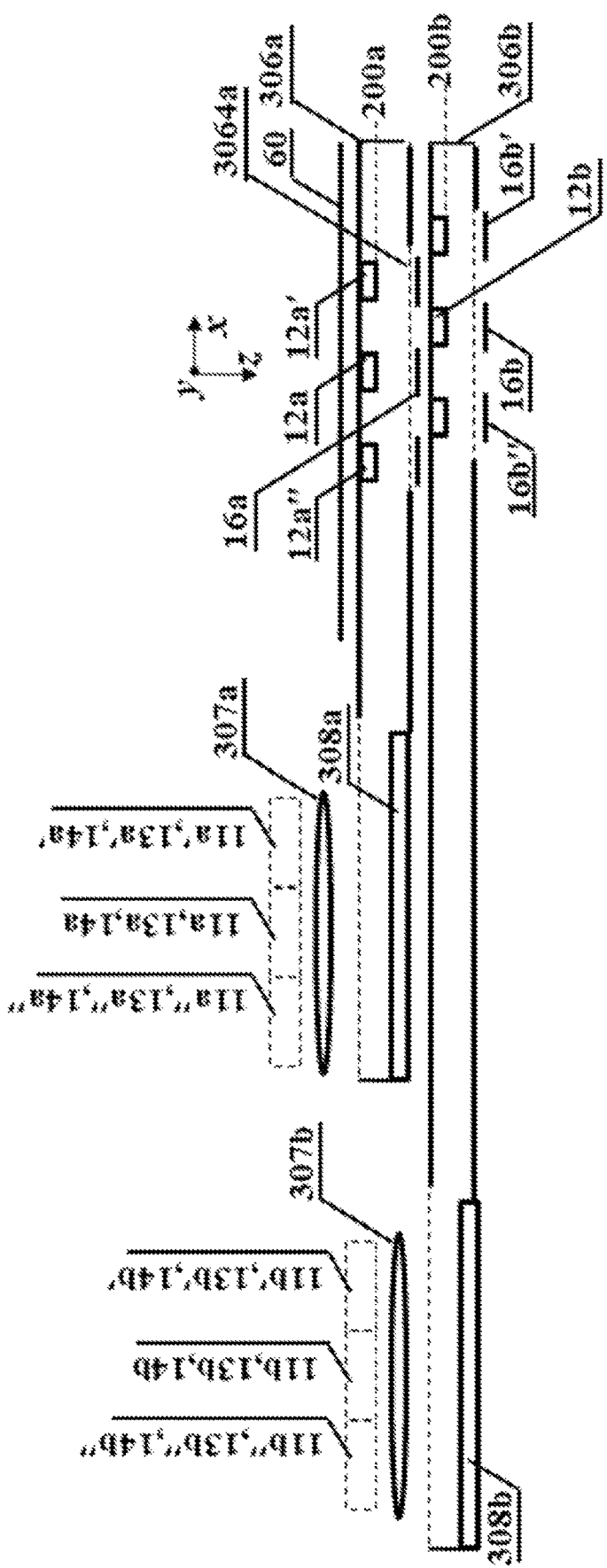
FIG. 26 shows an optical configuration of a composite display module.

Above discussed display module with a wave-guide-type relay device 30 can function as an element module. K such element modules stack up into a composite near-eye display module based on pixel-block-aperture structures, which is abbreviated as a composite display module. FIG. 26 takes K=2 element modules a and b as an example. The component is marked by subscripts a and b to denote their corresponding element module. For example, 308a is the coupling-in element of the element module a, 308b is the coupling-in element of the element module b.

When images of the pixel-arrays from different element modules splice together, we called the composite display module as an II-type composite display module. In the II-type composite display module, different element modules are aligned for a larger FOV. With a light splitting device 18 being introduced to each pixel-block-aperture structure and each aperture being smaller than the diameter $D_p$ of the pupil at least along an arrangement direction of the apertures, the one-pupil-multi-view display is expected. But the implementation of one-pupil-multi-view display further requires the aperture interval of a pixel-block-aperture structure be small enough, so to ensure a premise as follows: pixel images corresponding to the light beams perceived by the pupil 50 through at least 2M apertures can constitute at least two pixel-image sets. A pixel-image set has a field angle with respect to a point around the apertures covering the 3D scene to be displayed. Here, a pixel-image set often includes P/G pixel images along an arrangement direction of the grating periodic structure, with P being the number of pixels in all pixel arrays from different element modules along this arrangement direction. Different pixel-image sets do not share a pixel. When P/G is not an integer, the value of P/G can take an integer near to the actual value of P/G. If pixel images corresponding to the perceived light beams only can constitute one complete pixel-image set at most, Maxwellian view display gets implemented, or partial spots are displayed based on Maxwellian view and the other spots are displayed based on one-pupil-multi-view. Under this condition, the size of an aperture is required to be smaller than that of the pupil 50.

When the pixel-array images from different element modules overlap on the projection surface 100, we name the composite display module as an I-type composite display module. The apertures corresponding to different display modules are designed in staggered arrangement, for getting denser apertures or larger observing zone for the pupil 50. To implement one-pupil-multi-view display, an aperture should be smaller than the diameter $D_p$ of the pupil 50 at least along an arrangement direction of the apertures. At the same time, pixel images corresponding to the light beams perceived by the pupil 50 through at least 2M apertures can constitute at least two pixel-image sets. A pixel-image set has a field angle with respect to a point around the apertures covering the 3D scene to be displayed. Here, a pixel-image set often includes P/G' pixel images along an arrangement direction of the grating periodic structure, with the integer P being the pixel number of the pixel array in an element module along this arrangement direction. Integer G'=G when light splitting devices are adopted, else G'=1. Different pixel-image sets do not share a pixel. When P/G is not an integer, the value of P/G can take an integer near to the actual value of P/G. If pixel images corresponding to the perceived light beams only can constitute one complete pixel-image set at most, the display gets implemented based on the Maxwellian view, or partial spots based on Maxwellian view and the other spots based on one-pupil-multi-view. Under this condition, the size of an aperture is required to be smaller than the size of the pupil 50.

When images of the pixel-arrays from different element modules are projected to different depths for a larger depth of field, we name the composite display module as an III-type composite display module. Under this condition, overlapping of light beams equivalently from pixel-array images at different depths also can activate the one-pupil-multi-view display.

In a composite display module, an aperture with modulation function can project a corresponding pixel block to the corresponding depth, respectively. Different apertures image the corresponding pixel blocks to a same depth or different depths.

Figure 27:
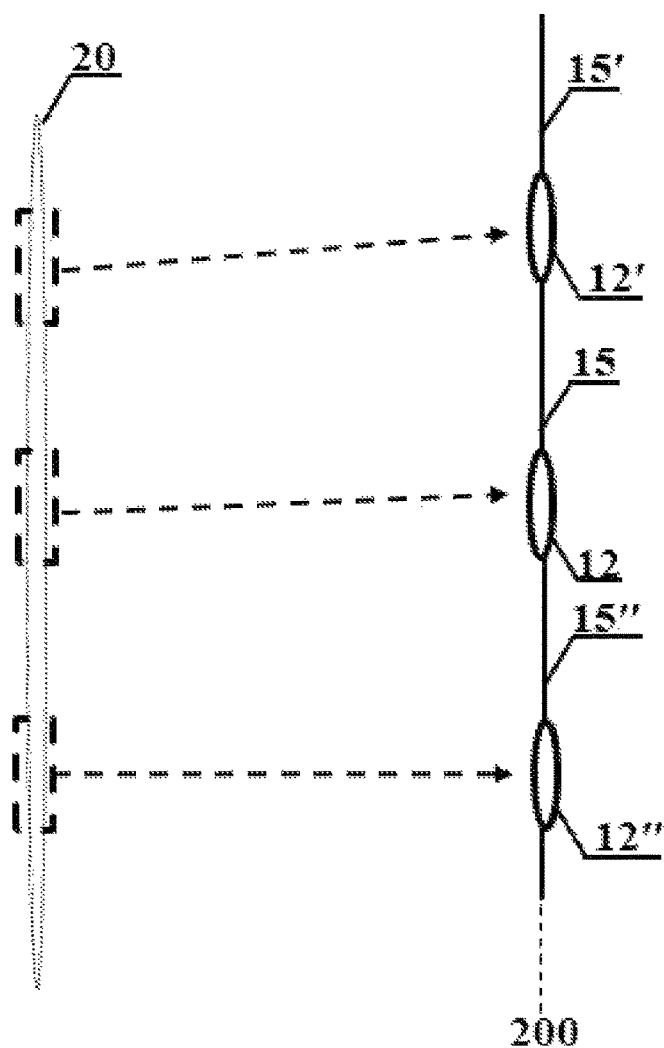
FIG. 27 shows a projection device which is integrated into the apertures.

The projection device 20 in above structures also can be composed of several discretely distributed substructures. For example, each substructure is cut from a common mother lens and has a same focal length, as shown in FIG. 27. These substructures are located at corresponding apertures respectively, for imaging corresponding pixel blocks. These discretely distributed substructures also can correspond to different focal lengths, so that the virtual images of different pixel blocks appear at corresponding depths, respectively. The modulation function of the discretely distributed substructure of the projection device 20 also can be compounded with the modulation function of the apertures themselves.

Embodiment 3

Figure 28:
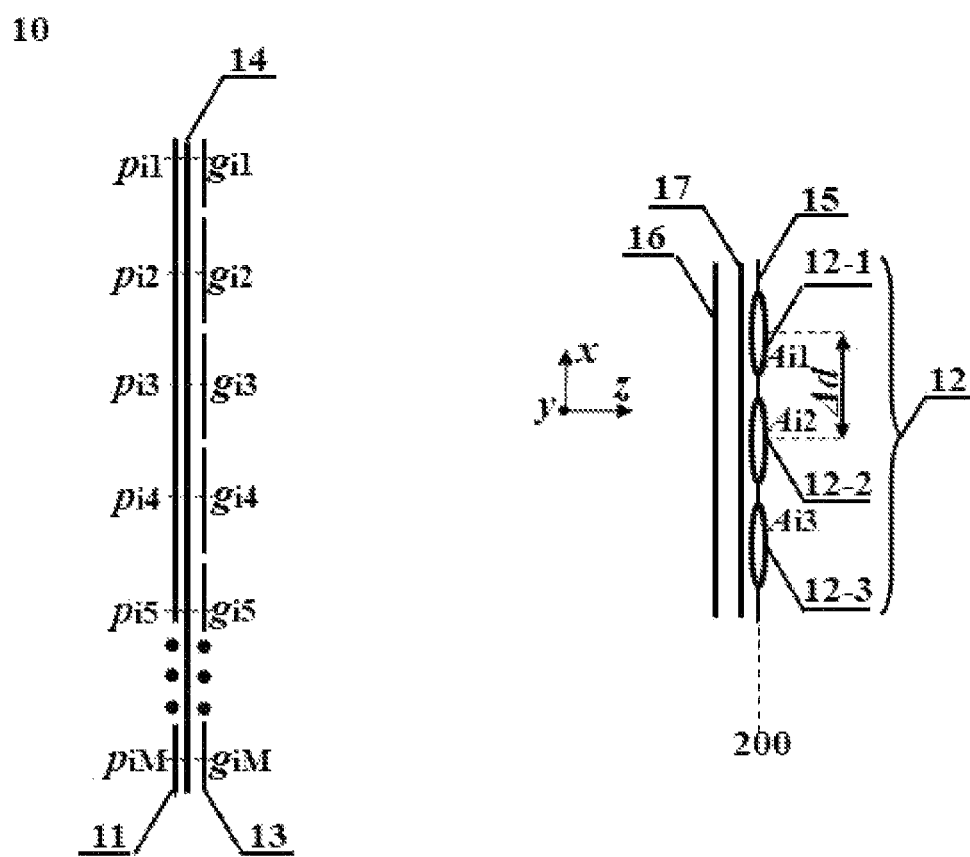
FIG. 28 shows a pixel-block-aperture structure with sub-apertures.

In above-mentioned display modules or composite display modules, an aperture can be replaced by J sub-apertures. Take a pixel-block-aperture structure 10 without a light splitting device 18 as an example, an aperture 12 is replaced by sub-apertures 12-1, . . . , 12-j, . . . , 12-J, as shown in FIG. 28. They are called J sub-apertures of the replaced aperture. Here, an integer J≥2, and an integer 2≤j≤J. FIG. 28 takes J=3 as example. At adjacent J=3 time-points with an interval δt/J=δt/3 of a time period, the J=3 sub-apertures 12-1, 12-2, and 12-3 get turned on sequentially, with only one sub-aperture being turned on at a time-point. At a time-point, the pixel block 12 and its pixels take the turned-on sub-aperture of the corresponding replaced aperture as the corresponding sub-aperture. This rule applies to all the pixel-block-aperture structures, with only one sub-aperture of each replaced aperture being turned on at a time-point. Such as the time-point T shown in FIG. 29, the pixels corresponding to the image $I_{11'}$ take the turned-on sub-aperture 12-1' as the corresponding sub-aperture, the pixels corresponding to the image $I_{11}$ take the turned-on sub-aperture 12-1 as the corresponding sub-aperture, and so on. At the time-point T+δt/3 shown in FIG. 30, the corresponding sub-aperture of the pixels corresponding to the image $I_{11'}$ changes to sub-aperture 12-2', the corresponding sub-aperture of the pixels corresponding to the image $I_{11}$ changes to sub-aperture 12-2, and so on.

M sub-apertures are turned on at a time-point, the control device 40 refreshing all pixels synchronously. The loaded optical information of a pixel is the projection information of the 3D scene to be displayed along the line connecting the virtual image of this pixel and the corresponding sub-aperture at this time-point. Thus, by the sub-apertures, the number of projected images offered by a display module or a composite display module gets increased based on persistence of vision. The turned-on or turned-off of a sub-aperture can get implemented by a corresponding light valve attached to this sub-aperture, under the control of the control device 40. The light valves for different sub-aperture constitute a light-valve array 17. When a light splitting device 18 is employed in each pixel-block-aperture structure, a pixel takes the turned-on sub-aperture to which the light from this pixel is guided by the light splitting device as the corresponding sub-aperture at a time-point.

For sub-apertures designed for one-pupil-multi-view display, the size of a sub-aperture is smaller than the diameter $D_p$ of the pupil 50 along at least an arrangement direction of the sub-apertures. At the same time, the sub-aperture interval of a pixel-block-aperture structure is small enough, so to ensure a premise as follows: pixel images corresponding to the light beams perceived by the pupil 50 can constitute at least two pixel-image sets. A pixel-image has a field angle with respect to a point around the sub-apertures covering the 3D scene to be displayed. Different pixel-image sets do not share a pixel at a same time-point. If pixel images corresponding to the perceived light beams only can construct at most one complete pixel-image set, Maxwellian view display get implemented, or partial spots based on Maxwellian view and the other spots based on one-pupil-multi-view. Under this condition, the size of a sub-aperture is required to be smaller than that of the pupil 50.

Figure 31:
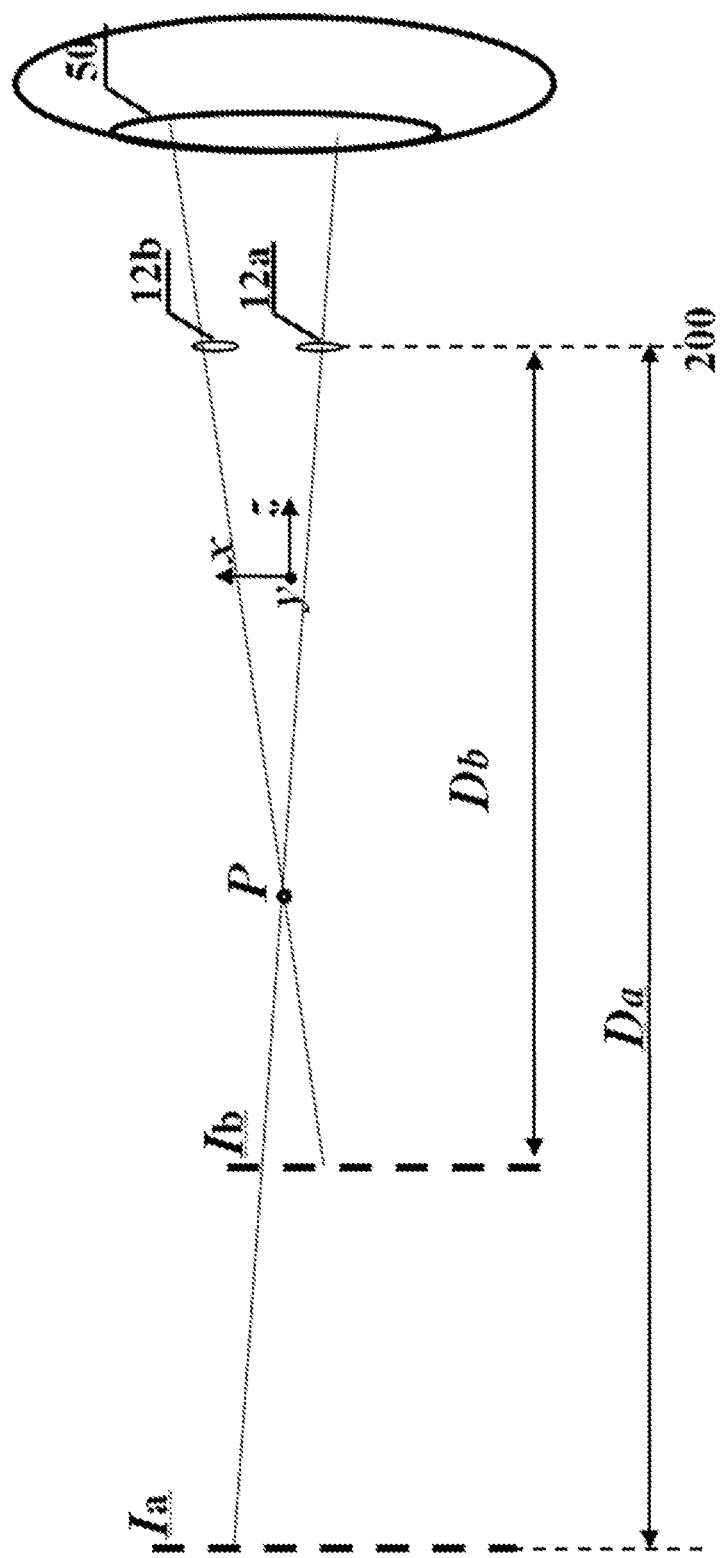
FIG. 31 shows a displayed point overlapped by light beams from pixels that are imaged to different depths.

Each sub-aperture can further be designed with a modulation function. When a sub-aperture with modulation function is turned on, the corresponding pixel block or pixel sub-group is imaged to a corresponding depth. The images of a pixel block or a pixel sub-group can be at different depths, images of different pixel blocks or pixel sub-groups can be at different depths. Under these conditions, the equivalent light beams from pixel images at different depths can overlap into displayed light spots. As shown in FIG. 31, a light beam equivalently coming from the pixel image at the depth $D_a$ and a light beam equivalently coming from the pixel image at the depth $D_b$ overlap into a displayed point P. They enter the pupil 50 through apertures or sub-apertures 12c and 12d, respectively. The $I_a$ and $I_b$ are virtual images of the corresponding pixel block(s) or corresponding pixel sub-group(s).

Figure 29:
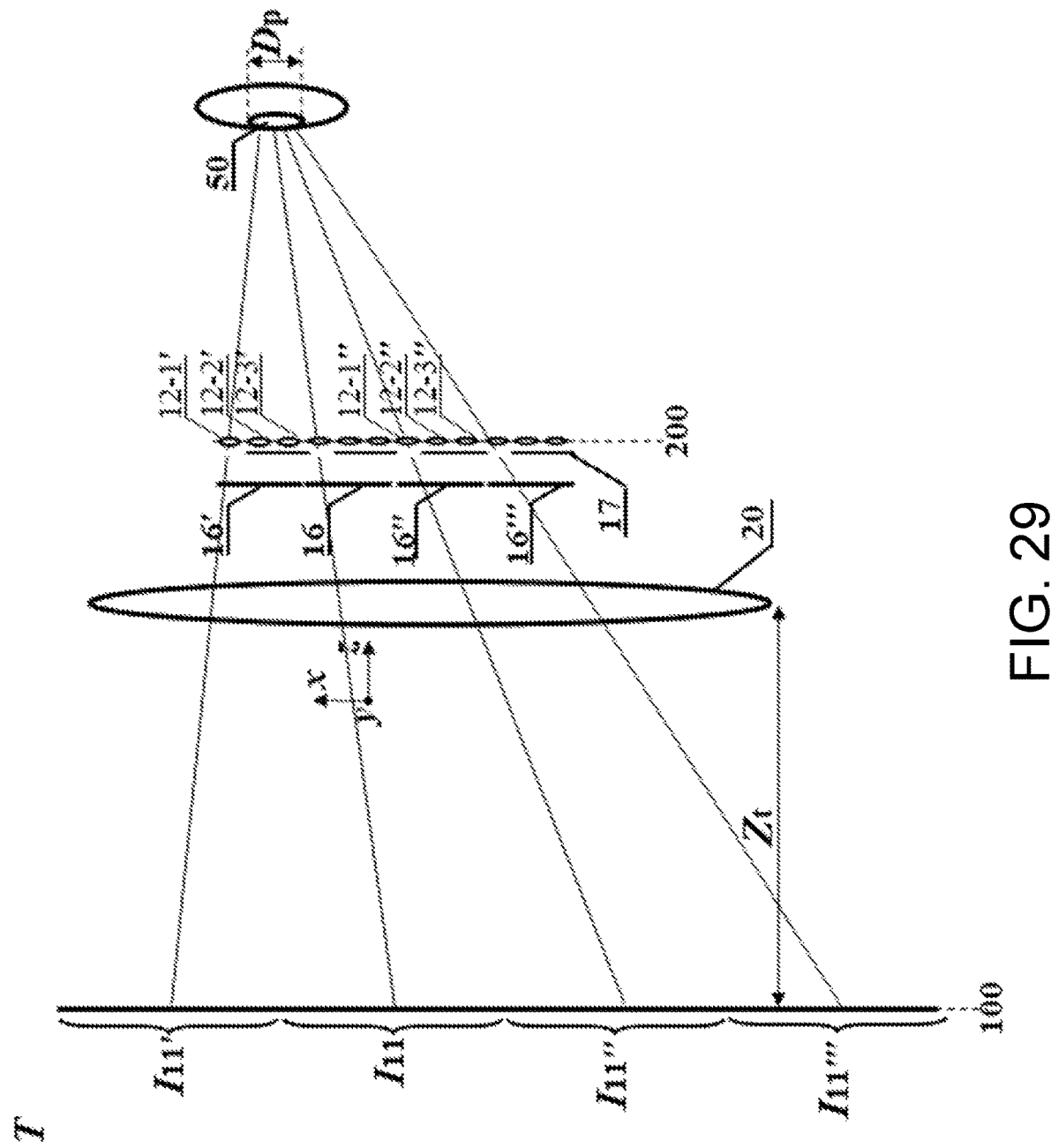
FIG. 29 shows the viewing zone for Maxwellian view display through a group of sub-aperture.
Figure 30:
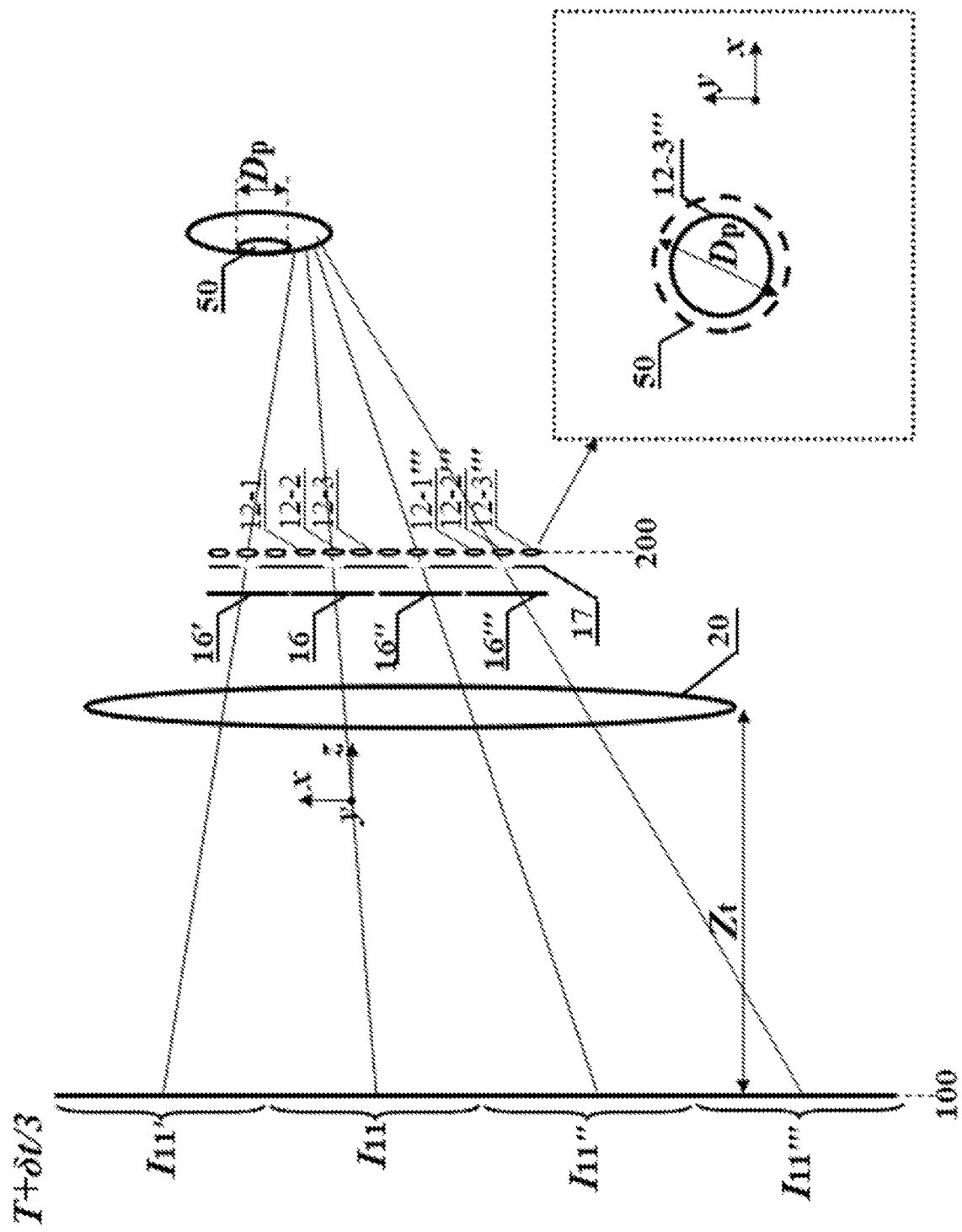
FIG. 30 shows another viewing zone for Maxwellian view display through another group of sub-apertures.

The introduction of sub-apertures can be designed to enlarge the observing zone for the pupil 50. For example, FIG. 29 shows turned-on sub-apertures 12-1, 12-1', 12-1", and 12-1''' at time-point t, and FIG. 30 shows turned-on sub-apertures 12-2, 12-2', 12-2", and 12-2''' at time-point t+δt. Obviously, the pupil 50 shown in FIG. 29 can perceive light beams from the pixel array consisting of four pixel blocks at time-point t, and miss the light beams at time-point t+δt. But if the pupil moves a little along the −x direction, the pupil 50 will perceive the light beams from the pixel-array image at time-point t+δt, but miss the light beams from the pixel-array image at time-point t. Thus the observing zone for the pupil 50 gets enlarged.

Figure 32:
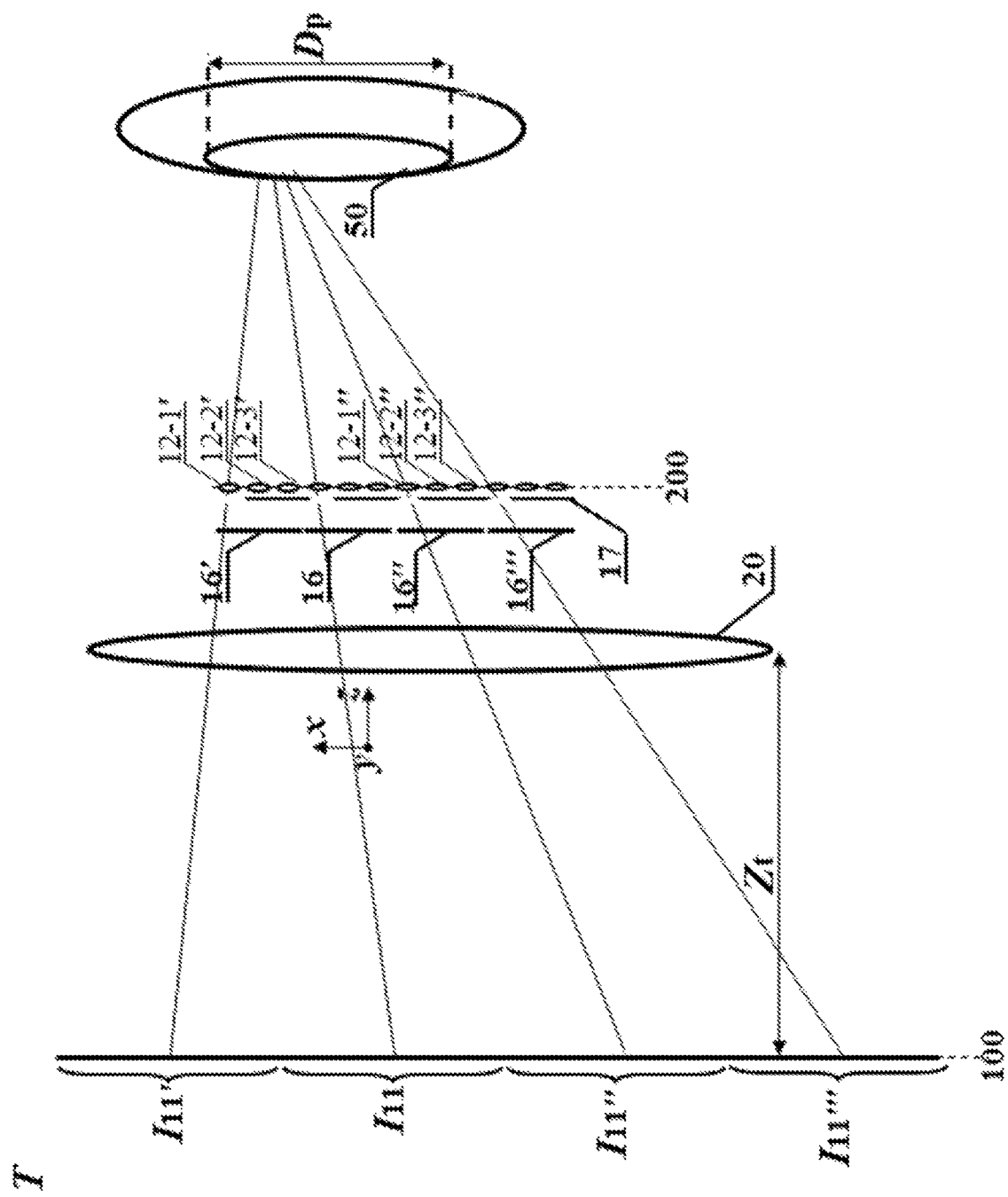
FIG. 32 shows a case of projecting a perspective view through a group of sub-apertures at a time-point for one-eye-multi-view display.
Figure 33:
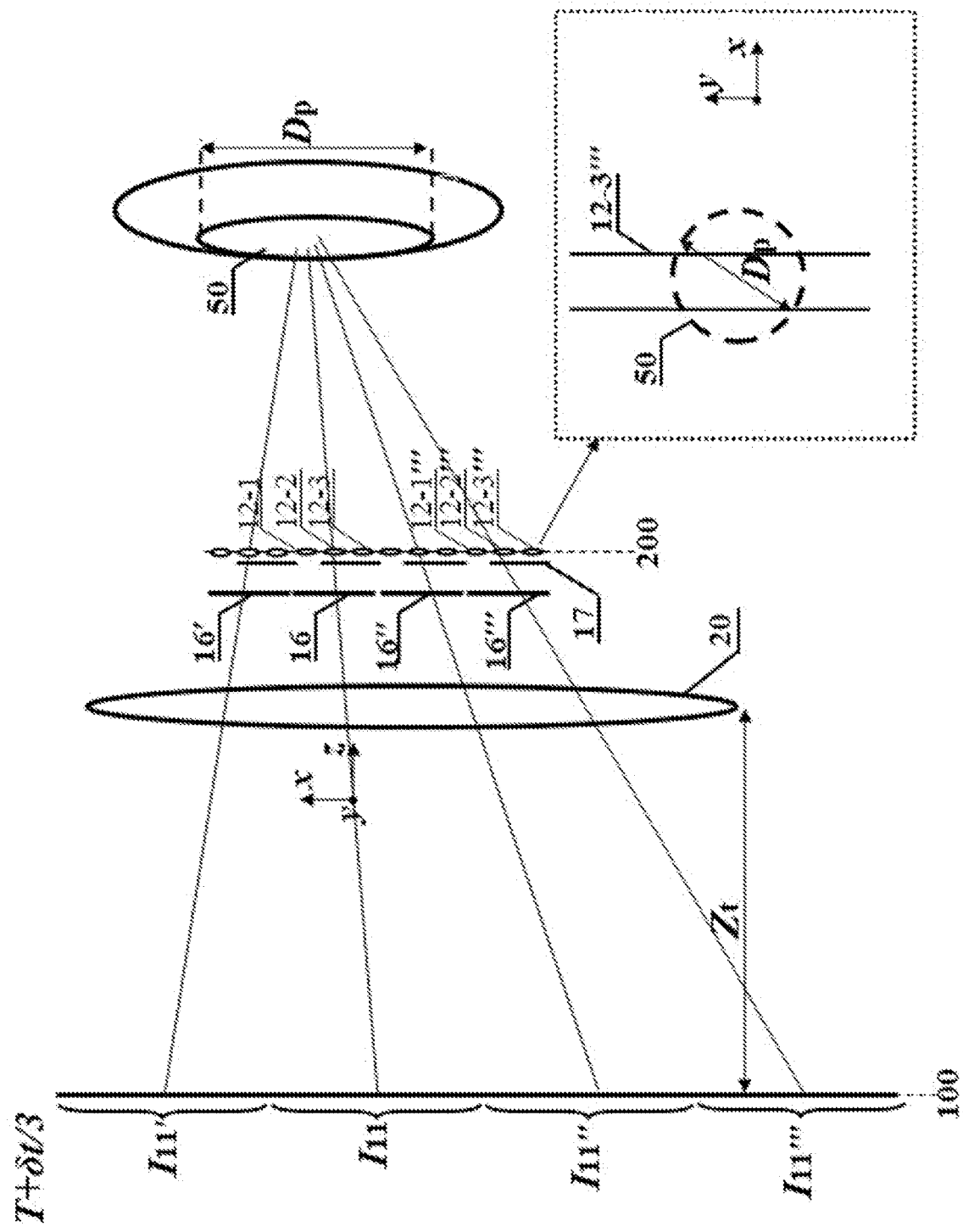
FIG. 33 shows another case of projecting another perspective view through another group of sub-apertures at another time-point for one-eye-multi-view display.
Figure 34:
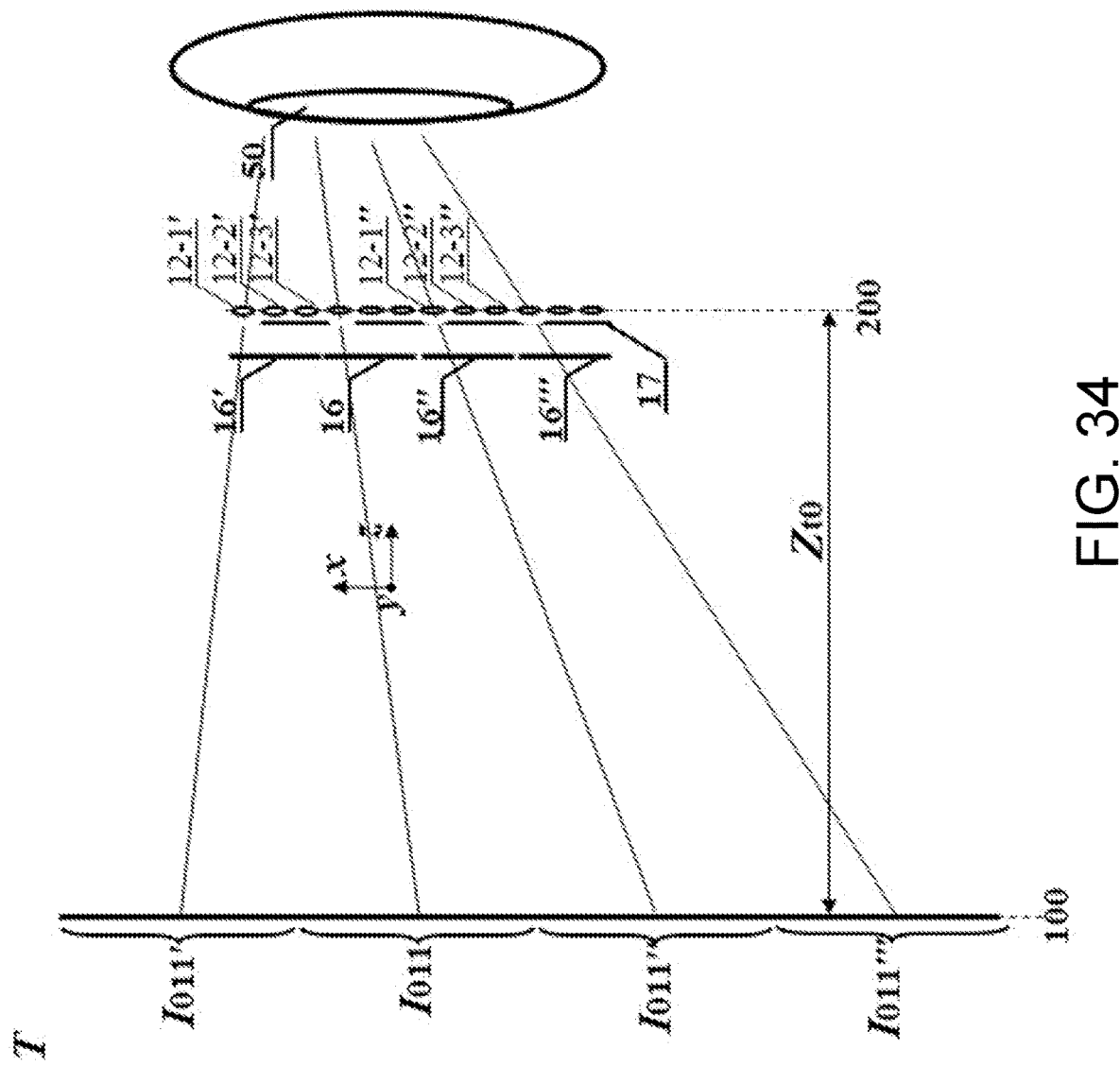
FIG. 34 shows a case of projecting a perspective view to a depth through a group of sub-apertures at a time-point.
Figure 35:
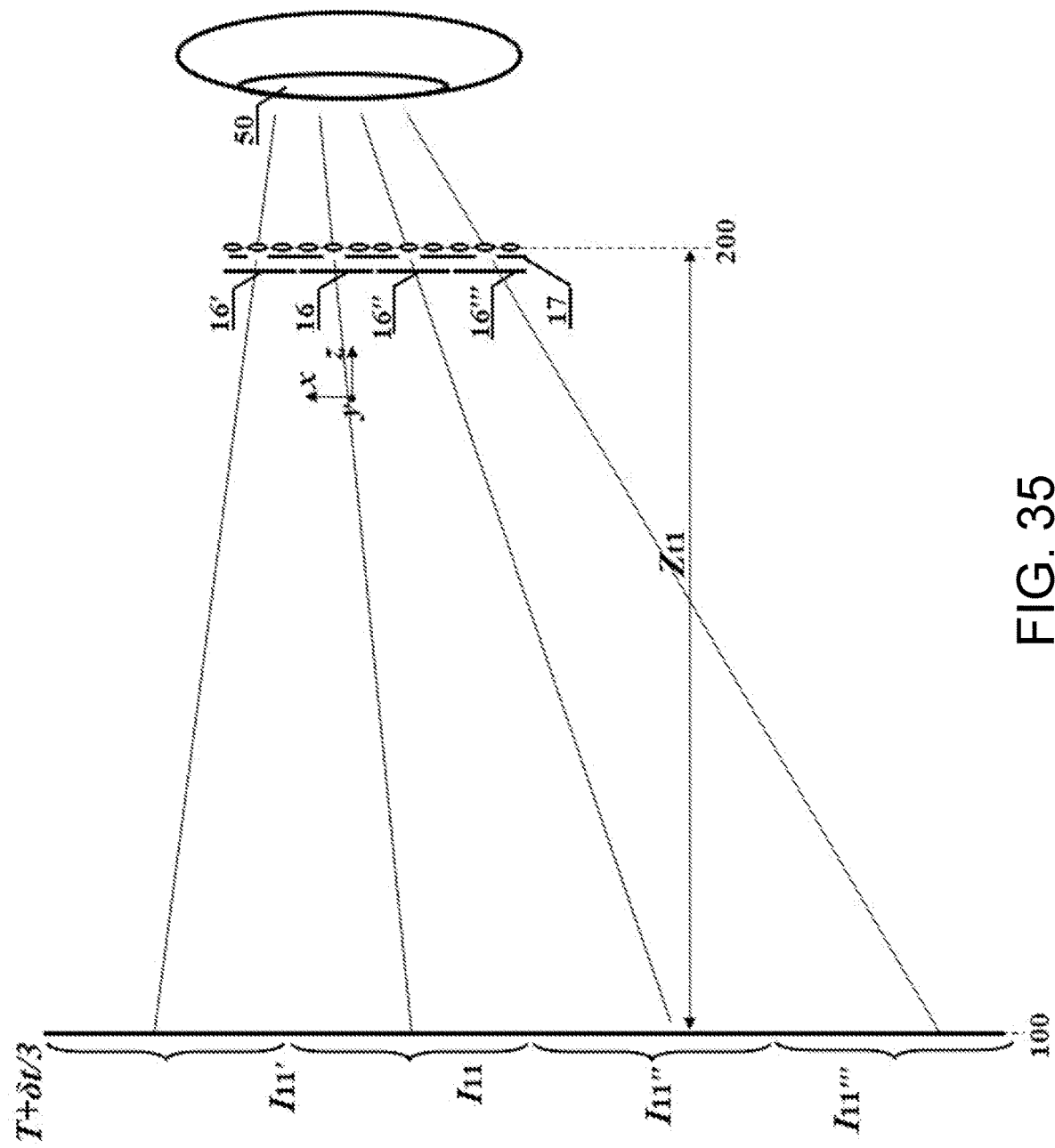
FIG. 35 shows another case of projecting another perspective view to another depth through another group of sub-apertures at another time-point.

FIGS. 32 and 33 show a one-pupil-multi-view display by the sequentially turning-on and turning-off of the sub-apertures. Here M=4 is taken as an example. At time-point T, light beams from M=4 pixel blocks pass through corresponding M=4 sub-apertures 12-1', 12-1, 12-1", 12-1''', respectively, and are perceived by the pupil 50. At the time-point T+t/3, light beams from M=4 pixel blocks pass through corresponding M=4 sub-apertures 12-2', 12-2, 12-2", 12-2''', respectively, and are perceived by the pupil 50. That is to say, at least at these two time-points, the pixel-array image works as two pixel-image sets, projecting two images to the pupil 50 for a one-pupil-multi-view display. With increasing of the sub-aperture interval in a pixel-block-aperture structure, a complete image can be perceived at two or more time-points. For each displayed point, at least two passing-through light beams being perceived by the pupil 50 in a time-period is the premise for one-pupil-multi-view display. When only partial displayed points have more than one passing-though light beams being perceived by the pupil 50, and the other displayed points have only one passing-though light beams being perceived by the pupil 50, the one-pupil-multi-view display and Maxwellian view display coexist. When all the displayed points have only one passing-though light beams being perceived by the pupil 50, Maxwellian view display gets implemented. In a display module with sub-apertures, the function of the projection device 20 also can be integrated to the sub-apertures. Such as a case shown by FIG. 34 and FIG. 35, a sub-aperture projects a corresponding pixel block to a corresponding depth. In these two figures, the virtual images of all pixel blocks are projected to a same depth at a time-point, but they can be projected to different depths. Of course, a sub-aperture can be designed with modulation function, for projecting an equivalent pixel block.

In above-mentioned figures, the pixel-block-aperture structures are arranged along one dimension (except FIG. 3) for illustration. Obviously, the pixel-block-aperture structures can be arranged along two dimensions. The concrete shape of an aperture or a sub-aperture is also not mandatory. For example, an aperture with a size small than $D_p$ along one direction can take a bar-shape. The apertures or sub-apertures can be arranged with gaps, or adjacent to each other without gaps, even partially overlapped.

Figure 36:
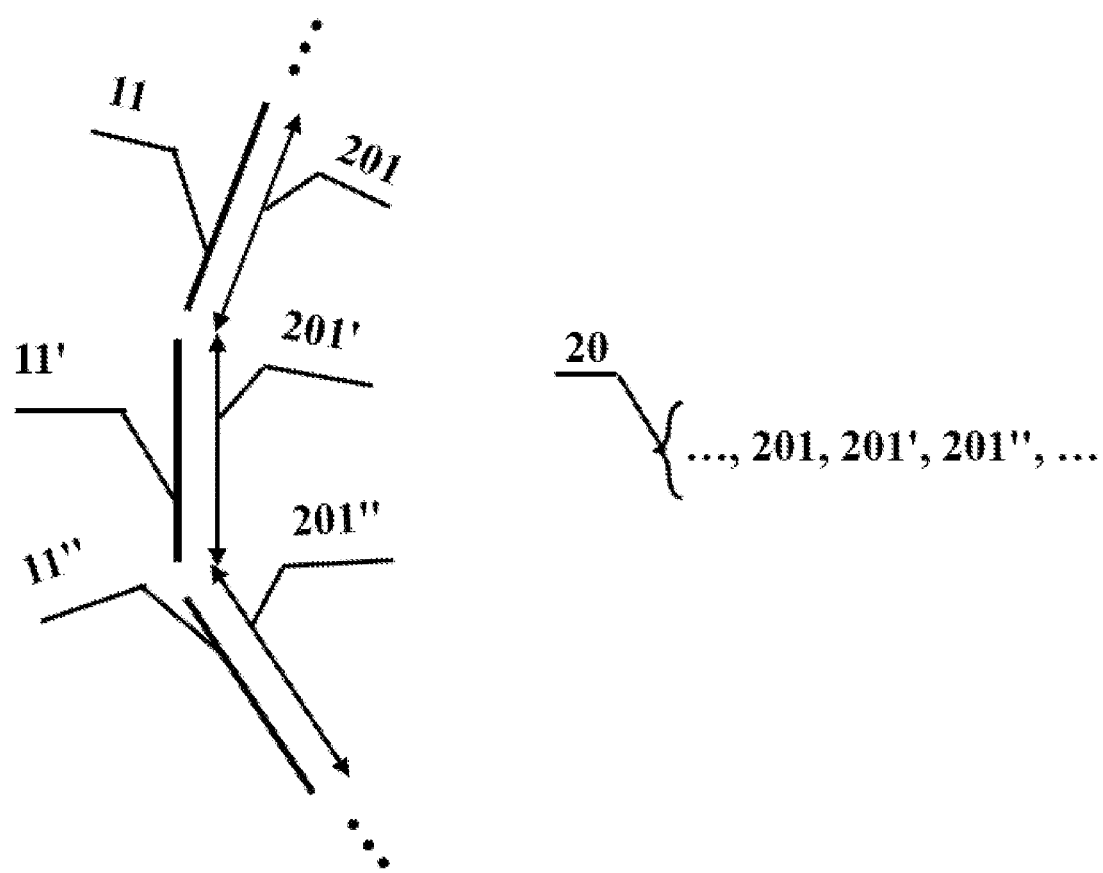
FIG. 36 shows the pixel blocks of pixel-block-aperture structures aligned along a curve.

In above-mentioned display modules or composite display modules, pixel-block-aperture structures are arranged on a plane surface. They can be aligned on a non-planar surface. Under this condition, the projection device 20 consists of multiple sub-projection elements, with a sub-projection element projecting the virtual image of its corresponding pixel block, such as FIG. 36. Only pixel blocks 11, 11' and 11" and sub-projection elements 201, 201' and 201" are shown in FIG. 36, with other components of the near-eye display module not drawn for simplicity. The sub-projection elements 201, 201' and 201" correspond to the pixel blocks 10, 10' and 10", respectively. Under this condition, a gap may exist between adjacent two pixel blocks. In a pixel-block-aperture structure 10, the sub-projection elements 201 can be placed between the corresponding pixel block 11 and aperture 12, or not.

Embodiment 4

Figure 37:
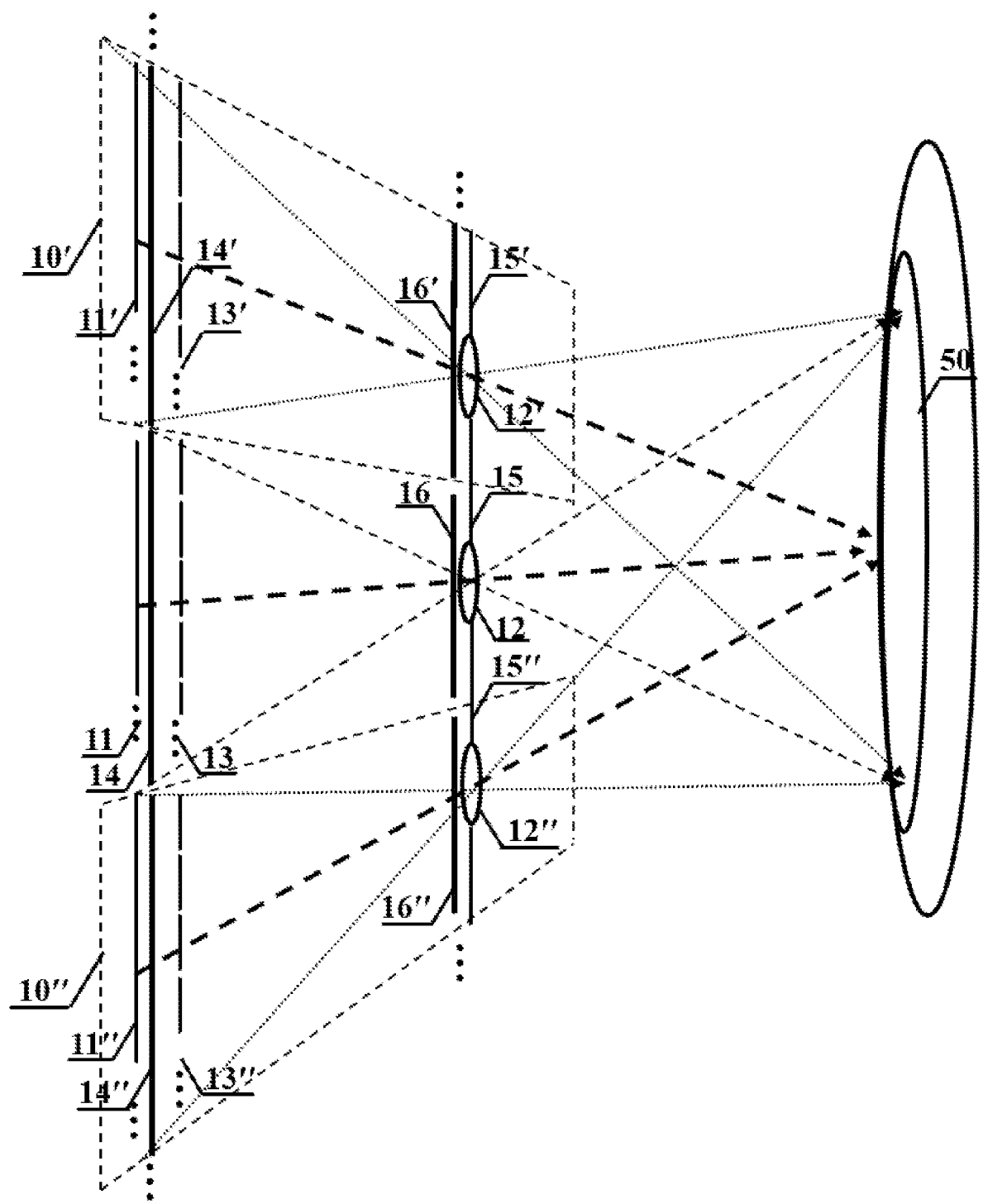
FIG. 37 shows the schematic diagram of a display module without a projection device.
Figure 38:
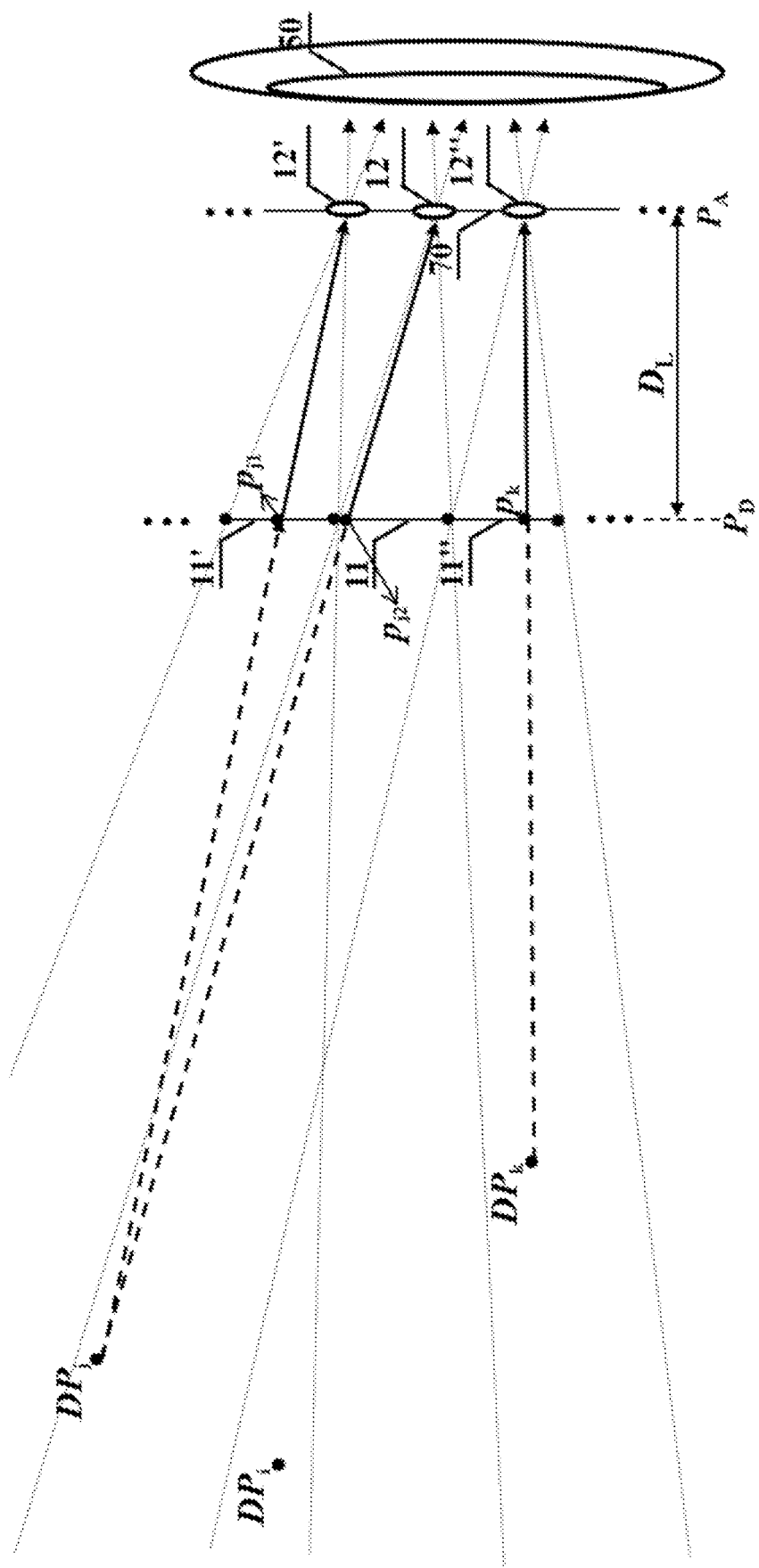
FIG. 38 shows the display principle of a display module without the projection device.

In above-mentioned display modules or composite display modules, a projection device 20 is used. Actually, a display module or composite display module can don't have a projection device 20. Under this condition, the structure shown in FIG. 2 functions as a near-eye display module for display, where only an aperture is assigned to a pixel block correspondingly. In FIG. 37, all light beams from a pixel block through corresponding aperture enter into the pupil 50. Under this condition, for a displayed point with a certain distance to the pixel blocks, such as the point $DP_j$ or the point $DP_i$ shown in FIG. 38, two or more passing-through light beams will be perceived by the pupil 50 for display. Concretely, taking the displayed point $DP_j$ as an example, the passing-through light beam $DP_jp_{j1}$ from the pixel $p_{j1}$ of the pixel block 11' and the passing-through light beam $DP_jp_{j2}$ from the pixel $p_{j2}$ of the pixel block 11 are perceived by the pupil 50.

Furthermore, in a display module or composite display module without a projection device 20, multiple apertures accompanied with a light splitting device 18 or multiple sub-apertures can also be designed in a pixel-block-aperture structure. The design goal of the display module or composite display module is guiding two or more light beams passing through a displayed point toward the corresponding pupil 50. On the premise of this goal achieved, when multiple apertures or sub-apertures are employed in a pixel-block-aperture structure, the pupil 50 may miss partial even all light beams passing through some of the apertures or sub-apertures.

Embodiment 5

Figure 39:
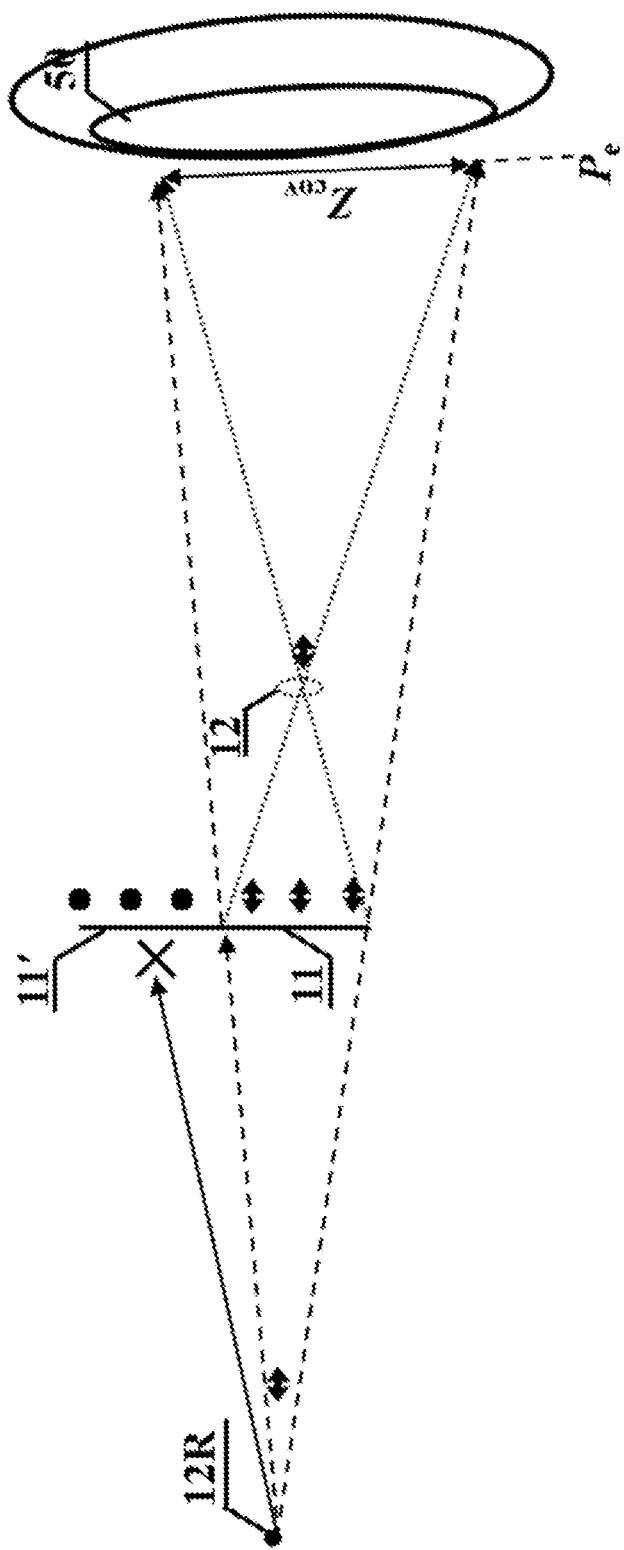
FIG. 39 shows the replaced aperture and an example of a backlight structure.

In above-mentioned display modules or composite display modules, an aperture or a sub-aperture can be replaced by a backlight structure 12R. The backlight structure 12R has two characteristics. Firstly, it projects light of orthogonal characteristic which can be modulated by the corresponding pixel block, but be blocked by the pixel blocks of orthogonal characteristics different to that of the corresponding pixel block. Secondly, on a plane near the pupil 50, the light from a backlight structure 12R covers a region same to the region covered by the light from the corresponding pixel block through the replaced aperture or sub-aperture. For example, FIG. 39 takes a point backlight as a backlight structure 12R to replace an aperture 12. In FIG. 39, the pixel block 11 is set with orthogonal characteristic "↔" as example. An adjacent pixel block 11 is with orthogonal characteristic "•". The backlight structure 12R takes the pixel block 11 as the corresponding pixel block, which also is the corresponding pixel block for the replaced aperture 12. The backlight structure 12R emits "↔" light, which is modulated by the corresponding pixel block 11 of orthogonal characteristic "↔", but blocked by the adjacent pixel block 11' of orthogonal characteristic "•". After passing through the corresponding pixel block 11, the modulated light covers a region $Z_{cov}$ on a plane $P_e$ near to or on the pupil 50. Correspondingly, if the replaced aperture 12 is in-service, light beams from the pixel block 11 will cover the same region $Z_{cov}$ after passing through the aperture 12. This replacement between a backlight structure and an aperture or a sub-aperture can be applied to all the apertures or sub-apertures.

Figure 40:
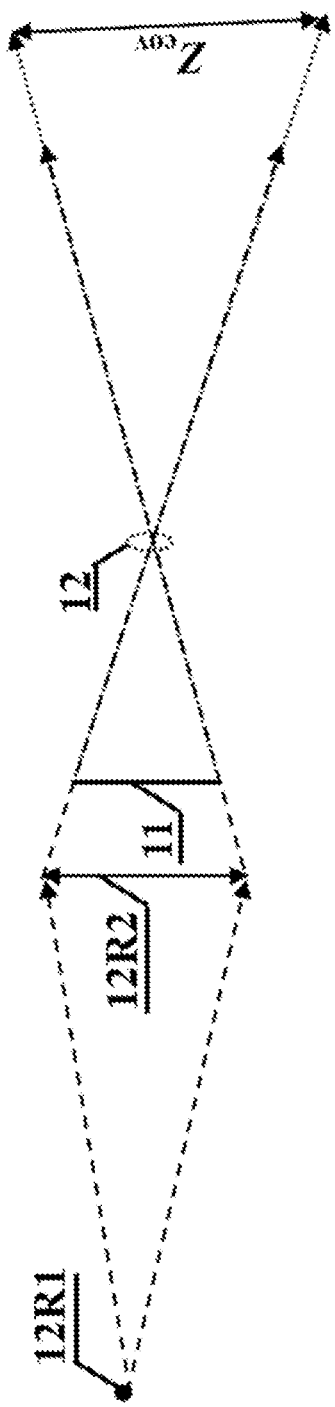
FIG. 40 shows another example of a backlight structure.
Figure 41:
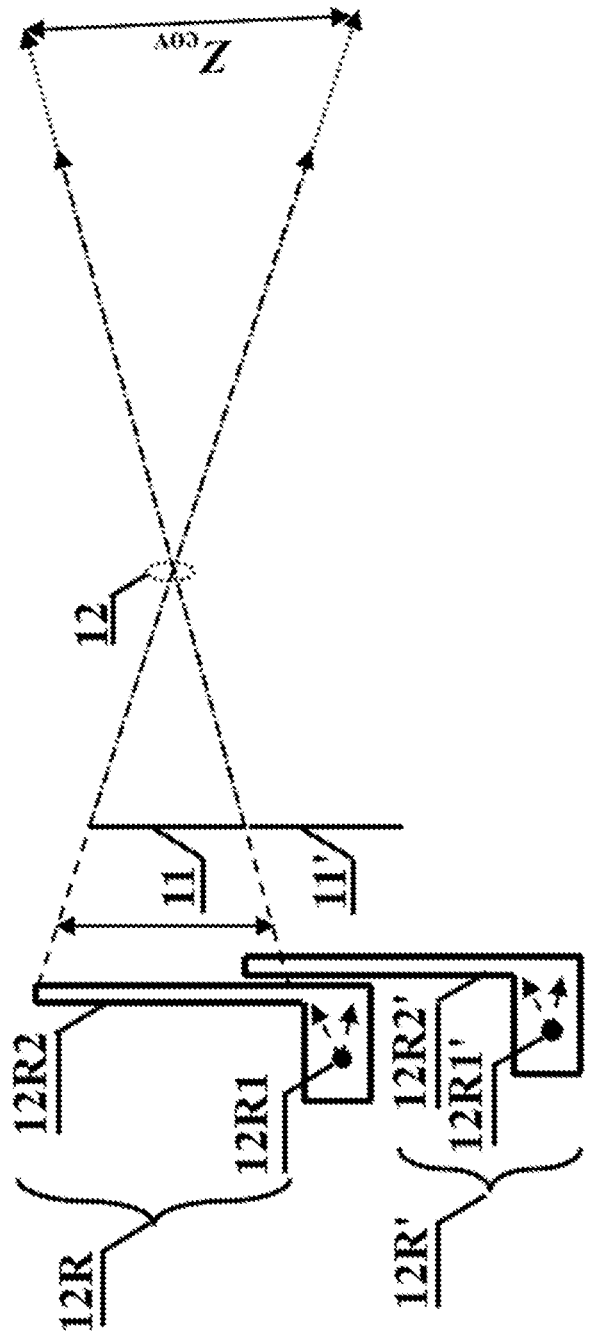
FIG. 41 shows a third example of a backlight structure.

FIG. 40 shows another kind backlight structure 12R, which consists of a point backlight 12R1 and a lens 12R2. In FIG. 41, the exampled backlight structure 12R includes a point backlight 12R1 and an optical wave-guide 12R2.

Obviously, the foregoing embodiments are merely examples for clearly explaining the present invention, and are not intended to limit the embodiments of the present invention. For those of ordinary skills in the art, other different forms with changes or modifications can be made on the basis of the above description. This is achievable. It is not possible to exhaust all implementations. For example, various optical wave-guide devices designed with different specific optical components can be used as the relay device 30 instead of the optical wave-guides mentioned in the present application. The projection device may be different kinds of phase modulation devices, including holographic devices, micro-structures, nano-structures. The optical structure of this patent can also be combined with methods described in other patents. For example, combination with U.S. patent Ser. No. 17/107,964 will result in a display module or a composite display module without modulation components. In fact, for any modification, equivalent replacement, and improvement made within the spirit and principle of the present invention should be included in the protection scope of the claims of the present invention, when the display is with the characteristic of "the divergence angle or/and propagation direction of the light beam from a pixel is specially modulated to miss non-corresponding apertures of the same kind, and the light beams from pixels of adjacent pixel block-aperture structures are endowed with different orthogonal characteristics for suppressing crosstalk between adjacent pixel block-aperture structures".

Some components may be omitted when the display can get implemented without them. For example, the modulation components may be omitted when orthogonal-characteristic designs can guarantee an acceptable observing zone for the pupil, or the orthogonal generating component and orthogonal detecting component may be omitted when the modulation component can make a light beam miss non-corresponding aperture or sub-aperture precisely.

What is claimed is:

1. A near-eye display module based on pixel-block-aperture structures, comprising:

M pixel-block-aperture structures, each of which being constructed by mutually corresponded a pixel block, an aperture, a modulation component, an orthogonality generating component and an orthogonality detecting component, wherein a positive integer M≥2;

wherein, the pixel block is composed of pixels for optical information loading, and a pixel array is composed of the pixels of all pixel blocks of the M pixel-block-aperture structures; an aperture array is composed of all apertures of M pixel-block-aperture structures on an aperture surface; the modulation component is composed of modulation elements, which correspond to pixels of a corresponding pixel block in a one-to-one manner, to guide the light beam from a pixel to a corresponding aperture with a confined diverging angle; the orthogonality detecting component is attached to a corresponding aperture, for only allowing light of corresponding orthogonal characteristic passable, but blocking light of other non-corresponding orthogonal characteristic; the orthogonality generating component of each block-aperture structures is attached to a corresponding pixel block, endowing pass-through light with orthogonal characteristic same to that of a corresponding orthogonality detecting component;

a control device, which loads optical information onto a pixel at a time-point, with the optical information being the projecting information of a 3D scene to be displayed at the time-point along a line connecting the pixel and its corresponding aperture;

said near-eye display module based on pixel-block-aperture structures is configured that the N orthogonality detecting components of adjacent N pixel-block-aperture structures are with N kinds of orthogonal characteristics respectively, with the apertures attached by the orthogonality generating components of a same orthogonal characteristic taken as apertures of a same kind, wherein an integer M≥N≥2, and the light beam from a pixel is modulated by a corresponding modulation element, to guarantee its light distribution covers the corresponding aperture, but misses the non-corresponding apertures of the same kind.

2. The near-eye display module based on the pixel-block-aperture structures according to claim 1, wherein the near-eye display module further comprises a projection device, which projects an enlarged virtual image of the pixel array to a projection surface, with the virtual image called as a pixel-array image;

wherein, optical information loaded onto a pixel at a time-point is the projecting information of a 3D scene to be displayed at the time-point along a line connecting the virtual image of the pixel and its corresponding aperture, with the virtual image of a pixel called as a pixel image, and light beam from a pixel can be equivalently seen as being from its virtual image on the projection surface.

3. The near-eye display module based on the pixel-block-aperture structures according to claim 1, wherein the pixel-block-aperture structure further comprises a baffle, which blocks the light in the non-aperture zone.

4. The near-eye display module based on the pixel-block-aperture structures according to claim 2, wherein the near-eye display module further comprises a relay device for guiding light from the pixel array to a corresponding pupil of a viewer;
wherein, the modulation element makes light from a corresponding pixel miss non-corresponding apertures of the same kind.

5. The near-eye display module based on the pixel-block-aperture structures according to claim 2, wherein the pixel-block-aperture structure further comprises a light splitting device, which is attached to the corresponding pixel block and guides light from G groups of pixels of the pixel block to G zones, respectively, wherein G≥2,
and, G apertures covered by a corresponding orthogonality detecting component are placed in the G zones, respectively, with a pixel taking the aperture to which the light from the pixel is guided as the corresponding aperture, and the other (G−1) apertures as the non-corresponding apertures of a same kind.

6. The near-eye display module based on the pixel-block-aperture structures according to claim 1, wherein a size of the aperture is smaller than that of a viewer's pupil.

7. The near-eye display module based on the pixel-block-aperture structures according to claim 5, wherein a viewer's pupil perceives light beams through at least 2M apertures, and a size of the aperture is smaller than that of the viewer's pupil along their arrangement direction.

8. The near-eye display module based on the pixel-block-aperture structures according to claim 1, wherein light beam from a pixel missing a non-corresponding aperture refers to that the transmission light intensity of the light beam through the non-corresponding aperture is less than 10% of that through the corresponding aperture.

9. The near-eye display module based on the pixel-block-aperture structures according to claim 1, wherein the aperture is transmission-type or reflection-type.

10. The near-eye display module based on the pixel-block-aperture structures according to claim 1, wherein the aperture has a phase modulation function for projecting an image of the corresponding pixel block which is named as an equivalent pixel block, and coverage angles of all the equivalent pixel blocks with respect to a point around the sub-apertures splice together seamlessly.

11. The near-eye display module based on the pixel-block-aperture structures according to claim 10, wherein all equivalent pixel blocks are divided into two or more groups, and for each group of equivalent pixel blocks, the coverage angles of the group of equivalent pixel blocks with respect to a point around the sub-apertures splice together seamlessly.

12. The near-eye display module based on the pixel-block-aperture structures according to claim 1, wherein the orthogonal characteristics are two linear polarizations with mutually perpendicular polarization directions, or two circular polarizations of left circular polarization and right left circular polarization, or timing characteristics being activated at different time-points, or combination of linear polarizations and timing characteristics, or combination of circular polarizations and timing characteristics;
wherein, timing characteristics get implemented by a light-valve array, whose light valves are attached to the apertures in a one-to-one manner, for activating the aperture by turning on a corresponding light valve,
and the function of the orthogonality generating device gets implemented by the control device, activating corresponding pixels by loading corresponding optical information when the aperture gets turned on.

13. The near-eye display module based on pixel-block-aperture structures according to claim 2, wherein the projection device is an optical device with adjustable focal length;
wherein, the projection device is driven by the control device to generate multiple projection surfaces to different depths sequentially, with a pixel getting refreshed by projection optical information of the 3D scene to be displayed along the line connecting its virtual image and corresponding aperture synchronously;
or, the convergence depth of the viewer is real-time tracked by an external auxiliary device, and the projection device projects the projection surface to the convergence depth driven under the control device synchronously, with a pixel getting refreshed by projection optical information of the 3D scene to be displayed along the line connecting its virtual image and corresponding aperture.

14. The near-eye display module based on the pixel-block-aperture structures according to claim 13, wherein the projection device is a liquid crystal lens with adjustable focal length, or an assembly of multiple liquid crystal sheets;
wherein, the assembly produces different focal lengths by activating different liquid crystal sheets or different combinations of the liquid crystal sheets.

15. The near-eye display module based on the pixel-block-aperture structures according to any claim 4, wherein the relay device is a light-deflection device, to deflect the propagation direction of incident light beams.

16. The near-eye display module based on the pixel-block-aperture structures according to claim 4, wherein the relay device is a beam-path-folding structure for a thin structure.

17. The near-eye display module based on the pixel-block-aperture structures according to claim 4, wherein the relay device is an optical wave-guide device.

18. The near-eye display module based on the pixel-block-aperture structures according to claim 17, further comprising a compensation device inserted between the relay device and the external environment, for neutralizing the impact of the relay device on the light from the external environment.

19. The near-eye display module based on the pixel-block-aperture structures according to claim 1, wherein each aperture is replaced by J sub-apertures respectively, wherein an integer J≥2;
said near-eye display module based on the pixel-block-aperture structures is configured that, at one time-point of J time-points in a time-period δt, only one sub-aperture corresponding to each replaced aperture is turned on, with a pixel taking the turned-on sub-aperture of its replaced corresponding aperture as the corresponding sub-aperture at the time-point, and at J time-points in a time-period, J sub-apertures of a replaced aperture are turned on sequentially;

wherein, at each time-point, a corresponding pixel gets refreshed by the projection information of the 3D scene to be displayed along the line connecting the virtual image of the pixel and its corresponding sub-aperture.

20. The near-eye display module based on the pixel-block-aperture structures according to claim 19, wherein a size of the sub-aperture is smaller than that of the viewer's pupil.

21. The near-eye display module based on the pixel-block-aperture structures according to claim 19, wherein the viewer's pupil perceives light beams through at least 2M sub-apertures, and a size of the sub-aperture is smaller than a diameter of the viewer's pupil along their arrangement direction.

22. The near-eye display module based on the pixel-block-aperture structures according to claim 19, wherein the sub-aperture has phase modulation function for projecting a virtual image of the corresponding pixel block, wherein the virtual image of the corresponding pixel block is named as equivalent pixel block, and at a time-point the coverage angles of equivalent pixel blocks with respect to a point around the sub-apertures splice together seamlessly.

23. The near-eye display module based on the pixel-block-aperture structures according to claim 19, wherein each sub-aperture of each pixel-block-aperture structure has phase modulation function to image corresponding pixel block to different depth positions.

24. An I-type composite display module based on pixel-block-aperture structures, comprising K near-eye display modules based on the pixel-block-aperture structures according to claim 17, with the K pixel-array images overlapped into a projection area on the projection surface, wherein an integer K≥2;

wherein, K near-eye display modules based on pixel-block-aperture structures function as K element modules.

25. The I-type composite display module based on the pixel-block-aperture structures according to claim 24, wherein a size of the aperture is smaller than that of the viewer's pupil.

26. The I-type composite display module based on the pixel-block-aperture structures according to claim 24, wherein a viewer's pupil perceives light beams through at least 2M apertures, and a size of the aperture is smaller than the diameter of the viewer's pupil along the arrangement direction of the apertures.

27. The I-type composite display module based on the pixel-block-aperture structures according to claim 24, wherein each aperture is replaced by J sub-apertures respectively, wherein an integer J≥2;

said I-type composite display module based on pixel-block-aperture structures is configured that, at one time-point of J time-points in a time-period δt, only one sub-aperture corresponding to each replaced aperture is turned on, with a pixel taking the turned-on sub-aperture of its replaced corresponding aperture as the corresponding sub-aperture at the time-point, and at J time-points of a time-period, J sub-apertures of a replaced aperture are turned on sequentially;

wherein, at each time-point, a corresponding pixel gets refreshed by the projection information of the 3D scene to be displayed along the line connecting the virtual image of the pixel and the corresponding sub-aperture.

28. The I-type composite display module based on the pixel-block-aperture structures according to claim 27, wherein each sub-aperture of each pixel-block-aperture structure has a phase modulation function for imaging a corresponding pixel block to a corresponding depth position.

29. An II-type composite display module based on pixel-block-aperture structures, comprising K near-eye display modules based on the pixel-block-aperture structures according to claim 17, with the K pixel-array images splicing together, wherein an integer K≥2;

wherein, K near-eye display modules based on the pixel-block-aperture structures function as K element modules.

30. The II-type composite display module based on the pixel-block-aperture structures according to claim 29, wherein an aperture is replaced by J sub-apertures, wherein an integer J≥2;

said II-type composite display module based on the pixel-block-aperture structures is configured that, at one time-point of J time-points in a time-period δt, only one sub-aperture corresponding to each replaced aperture is turned on, with the pixel taking the turned-on sub-aperture of the replaced corresponding aperture as corresponding sub-aperture at the time-point, and at J time-points in a time-period, J sub-aperture of a replaced aperture are turned on sequentially;

wherein, at each time-point, a corresponding pixel gets refreshed by the projection information of the 3D scene to be displayed along the line connecting the virtual image of the pixel and the corresponding sub-aperture.

31. An III-type composite display module based on pixel-block-aperture structures, which comprises K near-eye display modules based on the pixel-block-aperture structures according to claim 17, with the K pixel-array images positioning at different depths, respectively, where in an integer K≥2;

wherein, K near-eye display modules based on the pixel-block-aperture structures function as K element modules.

32. The III-type composite display module based on the pixel-block-aperture structures according to claim 31, wherein an aperture is replaced by J sub-apertures, wherein an integer J≥2;

said III-type composite display module based on pixel-block-aperture structures is configured that, at one time-point of J time-points in a time-period δt, only one sub-aperture of each replaced aperture is turned on, with a pixel taking the turned-on sub-aperture of its replaced corresponding aperture as the corresponding sub-aperture at the time-point, and at J time-points of a time-period, J sub-apertures of a replaced aperture are turned on sequentially;

wherein, at each time-point, a corresponding pixel gets refreshed by the projection information of the 3D scene to be displayed along the line connecting the virtual image of the pixel and the corresponding sub-aperture.

33. The near-eye display module based on the pixel-block-aperture structures according to claim 1, wherein an aperture is replaced by a backlight structure correspondingly;

wherein, the backlight structure projects light of orthogonal characteristic which can be modulated by the corresponding pixel block, but be blocked by the pixel blocks of orthogonal characteristics different to that of the corresponding pixel block, and on a plane near the pupil, the light from the backlight structure covers a region same to the region covered by the light from the corresponding pixel block through the replaced aperture.

34. The near-eye display module based on the pixel-block-aperture structures according to claim 19, wherein a sub-aperture is replaced by a backlight structure correspondingly;

wherein, the backlight structure projects light of orthogonal characteristic which can be modulated by the corresponding pixel block, but be blocked by the pixel blocks of orthogonal characteristics different to that of the corresponding pixel block, and on a plane near the pupil, the light from the backlight structure covers a region same to the region covered by the light from the corresponding pixel block through the replaced sub-aperture.

* * * * *